(12) United States Patent
Seoc et al.

(10) Patent No.: US 12,326,991 B2
(45) Date of Patent: Jun. 10, 2025

(54) ELECTRONIC DEVICE AND METHOD FOR DETECTING ATTACHMENT OF EXTERNAL ACCESSORY FOR DISPLAYING USER INTERFACE IN ELECTRONIC DEVICE

(71) Applicant: Samsung Electronics Co., Ltd., Suwon-si (KR)

(72) Inventors: Hoyoung Seoc, Suwon-si (KR); Iksang Kim, Suwon-si (KR); Jungwon Lee, Suwon-si (KR); Junghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/598,597

(22) Filed: Mar. 7, 2024

(65) Prior Publication Data

US 2024/0211060 A1 Jun. 27, 2024

Related U.S. Application Data

(63) Continuation of application No. PCT/KR2022/016251, filed on Oct. 24, 2022.

(30) Foreign Application Priority Data

Oct. 25, 2021 (KR) .................. 10-2021-0142397
Jan. 27, 2022 (KR) .................. 10-2022-0012746

(51) Int. Cl.
*G06F 3/039* (2013.01)
*G06F 3/044* (2006.01)
(Continued)

(52) U.S. Cl.
CPC ............ *G06F 3/0393* (2019.05); *G06F 3/044* (2013.01); *G06F 3/046* (2013.01); *G06F 3/04886* (2013.01); *G06F 2203/04803* (2013.01)

(58) Field of Classification Search
CPC ........ G06F 3/0393; G06F 3/044; G06F 3/046; G06F 3/04886; G06F 2203/04803;
(Continued)

(56) References Cited

U.S. PATENT DOCUMENTS

2005/0099403 A1 5/2005 Kraus et al.
2009/0005011 A1 1/2009 Christie et al.
(Continued)

FOREIGN PATENT DOCUMENTS

KR 10-1440708 B1 9/2014
KR 10-2016-0005895 A 1/2016
(Continued)

OTHER PUBLICATIONS

International Search Report with Written Opinion and English translation dated Jan. 31, 2023; International Appln. No. PCT/KR2022/016251.

*Primary Examiner* — Pegeman Karimi
(74) *Attorney, Agent, or Firm* — Jefferson IP Law, LLP

(57) ABSTRACT

An electronic device is provided. The electronic device includes a first housing, a second housing, a hinge configured to foldably connect one side of the first housing to one side of the second housing, a display including a first display area disposed in the first housing and a second display area disposed in the second housing, one or more processors, and memory storing instructions that, when executed by the one or more processors, cause the electronic device to, in case that attachment of an external accessory for displaying a user interface is detected in the second display area, display a user interface corresponding to a type of the external accessory in an area of the second display area to which the external accessory is attached.

20 Claims, 39 Drawing Sheets

(51) Int. Cl.
*G06F 3/046* (2006.01)
*G06F 3/04886* (2022.01)

(58) Field of Classification Search
CPC ........ G06F 1/16; G06F 3/0484; G06F 3/0488; G06F 3/14
See application file for complete search history.

(56) References Cited

U.S. PATENT DOCUMENTS

| | | |
|---|---|---|
| 2011/0248838 A1 | 10/2011 | Krahenbuhl et al. |
| 2012/0084699 A1 | 4/2012 | Sirpal et al. |
| 2012/0216139 A1 | 8/2012 | Ording et al. |
| 2013/0328825 A1* | 12/2013 | Brown .................. G01B 7/30 345/174 |
| 2014/0262715 A1 | 9/2014 | Lee et al. |
| 2016/0011738 A1* | 1/2016 | Bang .................. G06F 3/04886 345/173 |
| 2017/0235483 A1 | 8/2017 | Alonso Ruiz et al. |
| 2017/0338846 A1 | 11/2017 | Lee et al. |
| 2019/0073107 A1 | 3/2019 | Lee et al. |
| 2020/0042045 A1* | 2/2020 | Quinn .................. G06F 1/1624 |
| 2020/0110470 A1 | 4/2020 | Meyers et al. |
| 2020/0333852 A1 | 10/2020 | Smith et al. |
| 2021/0096741 A1* | 4/2021 | Klein .................. G06F 1/1647 |
| 2021/0173447 A1 | 6/2021 | Ku et al. |
| 2022/0206535 A1 | 6/2022 | Hyun et al. |

FOREIGN PATENT DOCUMENTS

| | | |
|---|---|---|
| KR | 10-2204151 B1 | 1/2021 |
| KR | 10-2236953 B1 | 4/2021 |

* cited by examiner

ELECTRONIC DEVICE AND METHOD FOR DETECTING ATTACHMENT OF EXTERNAL ACCESSORY FOR DISPLAYING USER INTERFACE IN ELECTRONIC DEVICE

CROSS-REFERENCE TO RELATED APPLICATION(S)

This application is a continuation application, claiming priority under § 365(c), of an International application No. PCT/KR2022/016251, filed on Oct. 24, 2022, which is based on and claims the benefit of a Korean patent application number 10-2021-0142397, filed on Oct. 25, 2021, in the Korean Intellectual Property Office, and of a Korean patent application number 10-2022-0012746, filed on Jan. 27, 2022, in the Korean Intellectual Property Office, the disclosure of each of which is incorporated by reference herein in its entirety.

BACKGROUND

1. Field

The disclosure relates to a method for detecting the attachment of an external accessory for displaying a user interface in an electronic device.

2. Description of Related Art

Various services and additional functions provided through electronic devices, for example, portable electronic devices such as smartphones, are gradually increasing. In order to increase the utility value of these electronic devices and satisfy the diverse needs of users, communication service providers or electronic device manufacturers are competitively developing electronic devices to provide various functions and differentiate themselves from other companies. As a result, the various functions provided through electronic devices are increasingly advanced.

In addition, in order to make electronic devices portable, displays (or the electronic devices equipped with the same) can be mounted on the electric devices in a foldable, bendable, or rollable form.

In an electronic device including a foldable or bendable display, input functions can be performed using an on-screen keyboard provided through a certain area of the display.

The above information is presented as background information only to assist with an understanding of the disclosure. No determination has been made, and no assertion is made, as to whether any of the above might be applicable as prior art with regard to the disclosure.

SUMMARY

In an electronic device that includes a foldable or bendable display, most of the front of the electronic device includes the display, making it difficult to accommodate a physical typeable keyboard.

Input functions can be performed using an on-screen keyboard provided in a certain area of the display of the electronic device, but the usability of the on-screen keyboard may be lower than that of a physical keyboard.

Aspects of the disclosure are to address at least the above-mentioned problems and/or disadvantages and to provide at least the advantages described below. Accordingly, an aspect of the disclosure is to provide a method for detecting the attachment of an external accessory for displaying a user interface in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing, a hinge configured to foldably connect one side of the first housing to one side of the second housing, a display including a first display area disposed in the first housing and a second display area disposed in the second housing, one or more processors, and memory storing instructions that, when executed by the one or more processors, cause the electronic device to, in case that attachment of an external accessory for displaying a user interface is detected in the second display area while the hinge is folded, display a user interface corresponding to a type of the external accessory in an area of the second display area to which the external accessory is attached.

In accordance with another aspect of the disclosure, a method performed by an electronic device for detecting attachment of an external accessory for displaying a user interface in the electronic device is provided. The method includes detecting, while a hinge configured to foldably connect one side of a first housing of the electronic device to one side of a second housing of the electronic device is folded, attachment of an external accessory for displaying a user interface from a second display area disposed in the second housing, and displaying a user interface corresponding to a type of the external accessory in an area of the second display area to which the external accessory is attached.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include detecting, while a hinge configured to foldably connect one side of a first housing of the electronic device to one side of a second housing of the electronic device is folded, attachment of an external accessory for displaying a user interface from a second display area disposed in the second housing, and displaying a user interface corresponding to a type of the external accessory in an area of the second display area to which the external accessory is attached.

According to various embodiments, depending on the type of external accessory which displays a user interface and is attached to an electronic device including a foldable or bendable display, a user interface corresponding to the type of the external accessory is provided via the display of the electronic device.

According to various embodiments, in an electronic device including a foldable or bendable display, a user interface displayed through the display is input in response to an input from an attached external accessory, thereby providing the same effect as input from a physical keyboard.

According to various embodiments, the external accessory is attached to input the user interface, thereby providing the same feeling as inputting with a physical keyboard.

According to various embodiments, at least one screen area having at least one function configured therein is provided based on the position of an external accessory which displays a user interface and is attached to an electronic device including a foldable or bendable display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
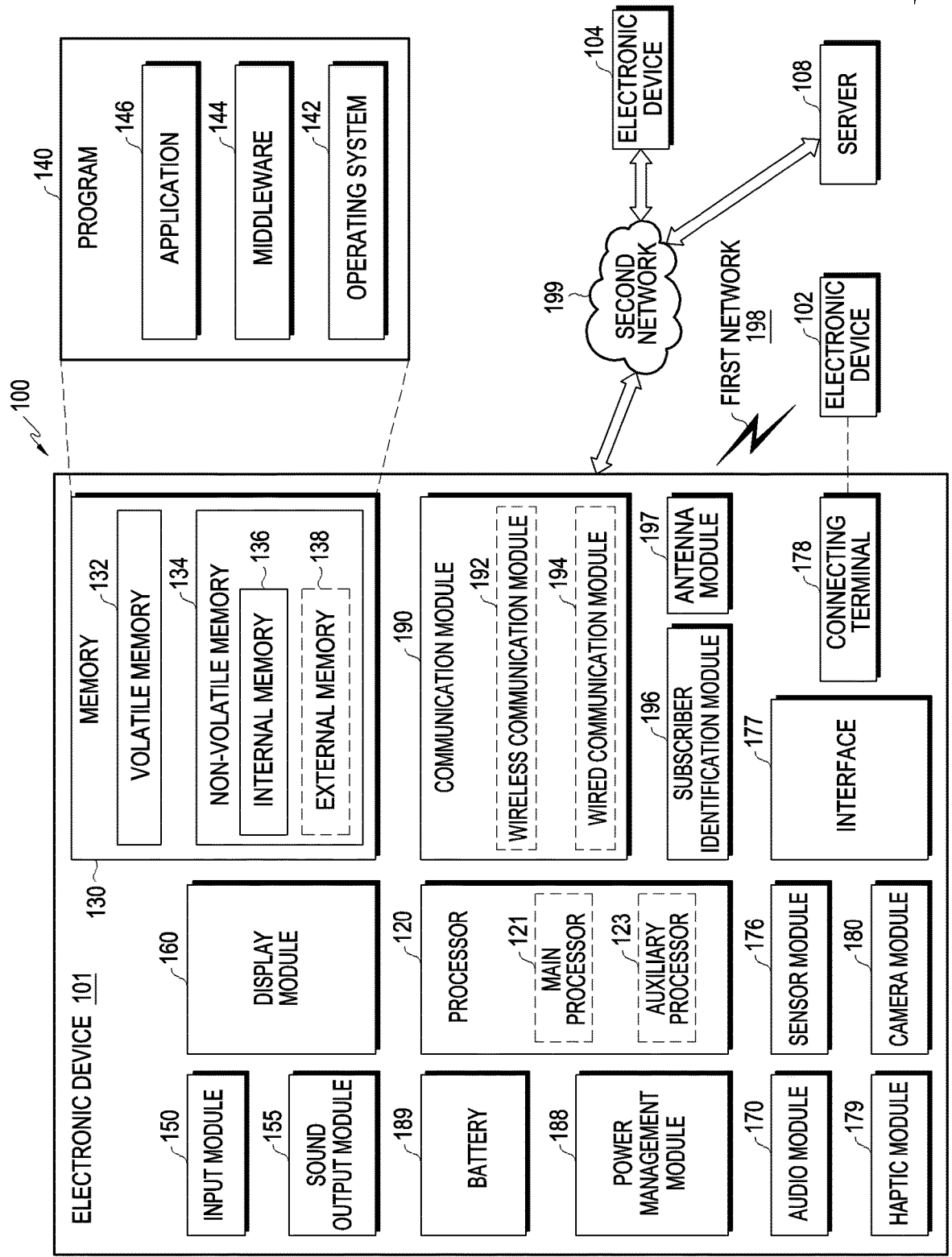
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
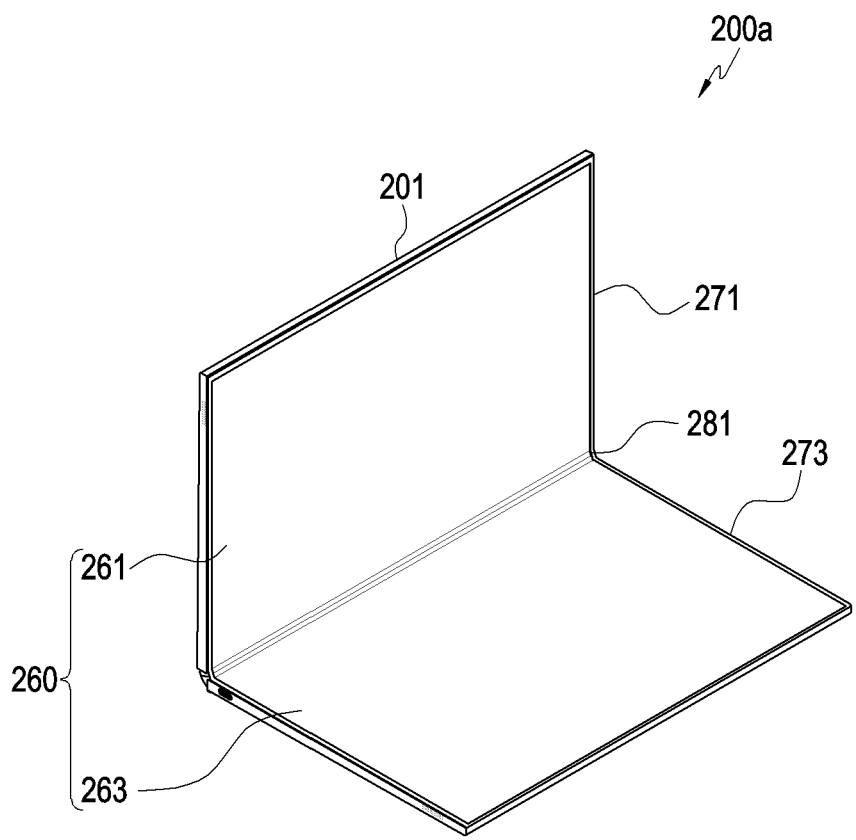
FIGS. 2A, 2B, and 2C illustrate the provision of a user interface using an external accessory in an electronic device according to various embodiments of the disclosure.
Figure 2B:
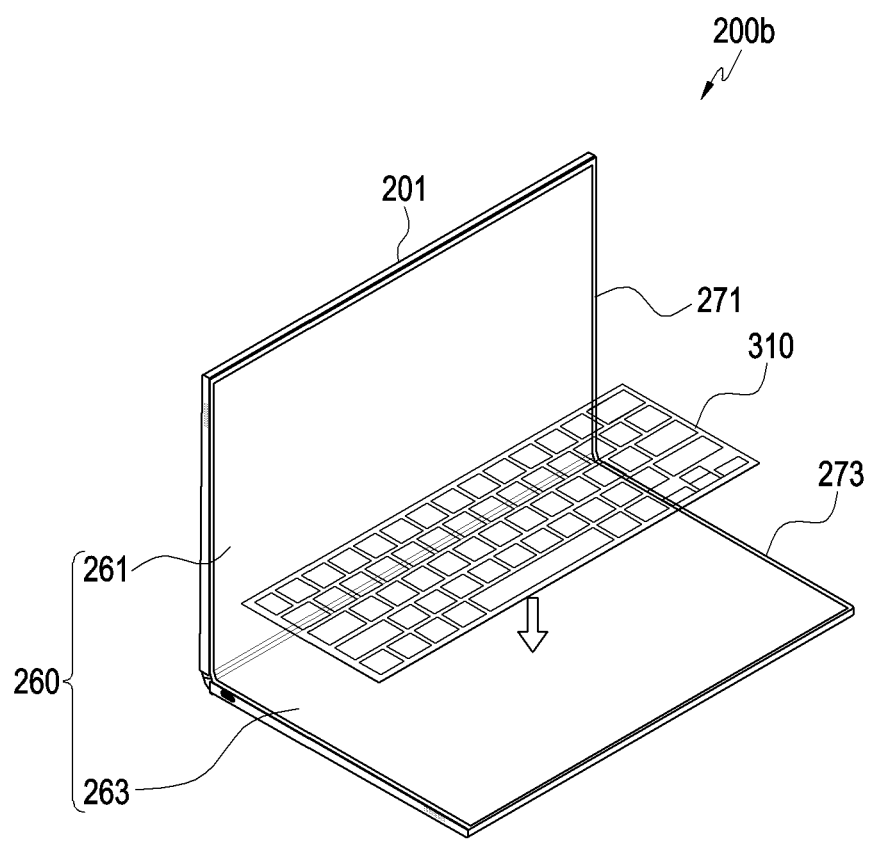
Figure 2C:
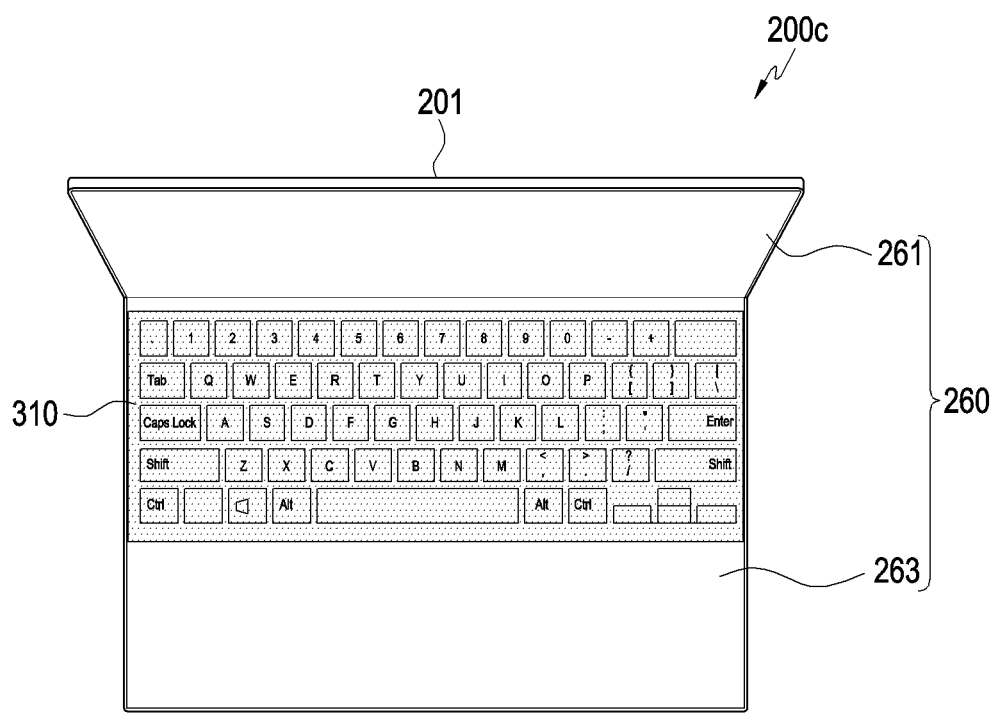

FIGS. 2A, 2B, and 2C are diagrams 200a, 200b and 200c illustrating the provision of a user interface using an external accessory in an electronic device according to various embodiments of the disclosure.

A display 260 of an electronic device 201 illustrated in FIGS. 2A, 2B and 2C may include a flexible display, wherein the area of the display is divided by the folding of a hinge 281 capable of connecting two housings in which the display is disposed. In the flexible display, when the electronic device includes an in-foldable hinge capable of connecting two housings, the display in an unfolded state may be folded inward by the folding of the in-foldable hinge, so that the area of the display is divided. In the flexible display, when the electronic device includes an out-foldable hinge capable of connecting two housings, wherein the display in an unfolded state may be folded outward by the folding of the out-foldable hinge, so that the area of the display may be divided. The electronic device may include a single hinge (e.g., an in-foldable hinge or a hinge capable of unfolding), or multiple hinges (e.g., an in-foldable hinge and a hinge capable of unfolding).

The unfolding may refer to a state (unfolded status) in which a first housing 271 and a second housing 273 are fully unfolded, and the folding may refer to a state (folded status) in which the first housing 271 and the second housing 273 are folded with a certain angle or a certain distance therebetween. The out-folding may refer to a state (folded status) in which the display 260 is folded at a certain angle or a certain distance outward from the front surface of the fully unfolded display 260. The in-folding may refer to a state (folded status) in which the display 260 is folded at a certain angle or a certain distance inward from the front surface of the fully unfolded display 260. FIGS. 2A to 2C illustrate the operation of the electronic device 201 including an in-foldable hinge as an example, but the same may be applied to an electronic device including an out-foldable hinge.

Referring to FIG. 2A, the electronic device 201 according to various embodiments may detect a folded state of the hinge 281 of the electronic device 201 by using sensor information received from a sensor module (e.g., at least one of an angle sensor, a tilt sensor, an acceleration sensor, a geomagnetic sensor, a gyro sensor, or a motion sensor) of the electronic device 201. When it is detected that the hinge 281 of the electronic device 201 is folded, the electronic device 201 may distinguish and display a first display area 261 disposed in the first housing 271 and a second display area 263 disposed in the second housing 273, which are included in the display 260 of the electronic device 201.

Referring to FIG. 2B, the electronic device 201 according to an embodiment may detect that an external accessory (e.g., a keyboard cover 310) for displaying a user interface is attached to a second display area 263 of display 260 of the electronic device 201. The electronic device 201 may detect the attachment of the external accessory to the second display area 263 and the type of the external accessory, based on a pattern of capacitance detected by at least one conductive object included in the external accessory (e.g., the keyboard cover 310) attached to the second display area 263. The electronic device 201 may determine a position in the second display area 263 in which the external accessory (e.g., the keyboard cover 310) is attached, based on at least one magnet which is included in the external accessory (e.g., the keyboard cover 310) attached to the second display area 263 and is in contact with one of multiple Hall sensors disposed in the second display area 263.

The electronic device 201 according to various embodiments may divide the display 260 into an upper area and a lower area when, after the electronic device 201 is placed on a floor in a fully folded state (folded status) in which the first housing 271 and the second housing 273 are in contact with each other, a transition to a folded status in which the first housing 271 and the second housing 273 are folded with a certain angle or a certain distance therebetween is detected based on the sensor module. When the second housing 273 is determined to be in contact with the floor by using sensor information received from the sensor module (e.g., at least one of a geomagnetic sensor, a gyro sensor, or a proximity sensor), the electronic device 201 may configure the upper area as the first display area 261, configure the lower area as the second display area 263, and determine a position in the second display area 263 where the external accessory (e.g., the keyboard cover 310) is attached. When the first housing 271 is determined to be in contact with the floor by using sensor information received from the sensor module (e.g., a geomagnetic sensor, a gyro sensor, or a proximity sensor), the electronic device 201 may configure the upper area to the second display area 263, configure the lower area to the first display area 261, and determine a position in the first display area 261 where the external accessory (e.g., the keyboard cover (310)) is attached.

Referring to FIG. 2C, the electronic device 201 according to an embodiment, when it is detected that an external accessory (e.g., the keyboard cover 310) for displaying a user interface to the second display area 263 of the display 260 of the electronic device, may display a user interface (e.g., a keyboard) corresponding to the type of external accessory (e.g., the keyboard cover 310) for displaying the user interface in an area of the second display area 263 to which the external accessory (e.g., a keyboard cover 310) for displaying the user interface is attached.

According to various embodiments, the external accessory (e.g., the keyboard cover 310) for displaying the user interface may be attached to the second display area 263 while the hinge of the electronic device is folded, so as to provide a function of displaying the user interface on the second display area 263.

According to an embodiment, the external accessory may include various types depending on the use. For example, the external accessory may include a keyboard cover for displaying a keyboard, a dial cover for displaying a dial, a calculator cover for displaying a calculator, and a gamepad cover for displaying a gamepad.

According to an embodiment, in order to enable the electronic device 201 to detect the attachment of the external accessory and the type of the external accessory when the external accessory is attached to the second display area 263 of the electronic device 201, the external accessory may have at least one conductive material (e.g., metal (e.g., silver, copper, gold, aluminum, tungsten, zinc, brass, tin, lead, or stainless steel) or a carbon allotrope (e.g., graphite or graphene)) disposed and included in at least one predetermined area inside the external accessory.

According to an embodiment, in order to enable the electronic device 201 to determine a position of the external accessory attached to the second display area 263 of the electronic device 201 when the external accessory is attached to the second display area 263, the external accessory may have at least one magnet disposed and included in at least one predetermined area in the external accessory.

According to an embodiment, the external accessory may be made of a transparent material to allow a user interface (e.g., a keyboard) displayed in the second display area 263 to be seen, and may be made of a thin elastic material that can be pressed for the touch of the user interface (e.g., the keyboard) and then restored.

Figure 3A:
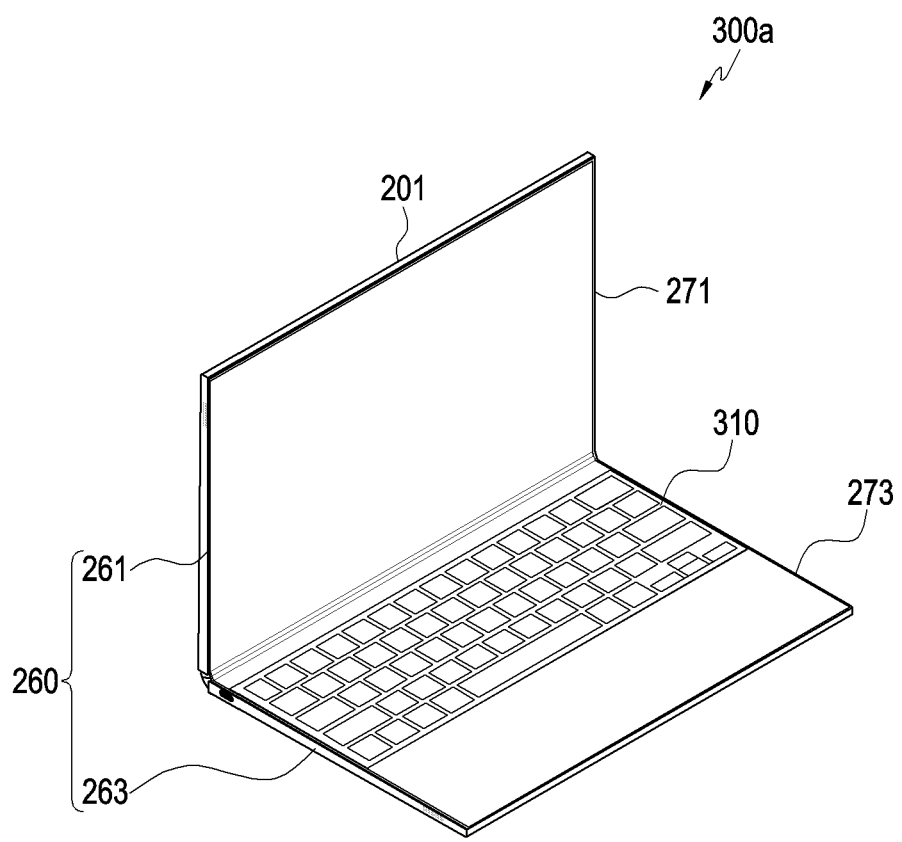
FIGS. 3A, 3B, and 3C illustrate an external accessory attached to a display in an electronic device according to various embodiments of the disclosure.
Figure 3B:
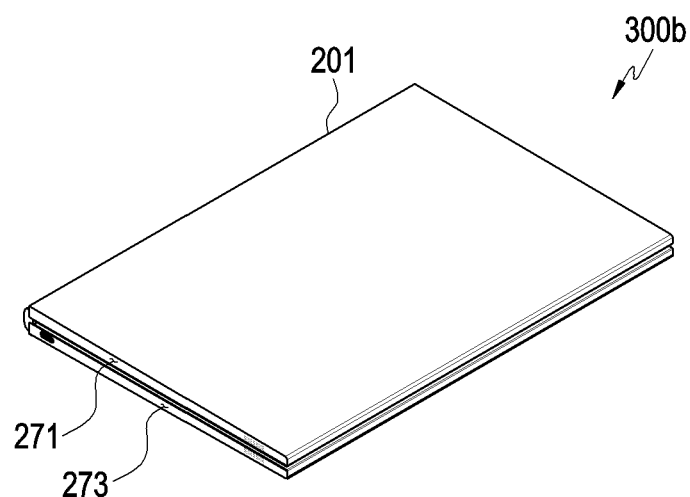
Figure 3C:
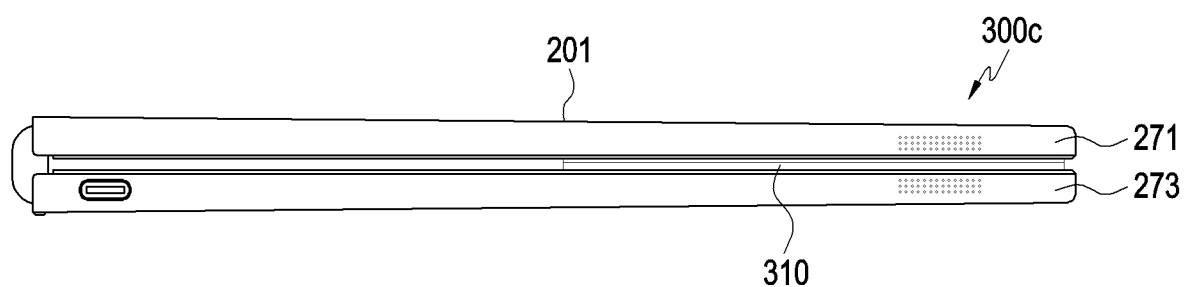

FIGS. 3A, 3B, and 3C are diagrams 300a, 300b and 300c illustrating an external accessory attached to a display in an electronic device according to various embodiments of the disclosure.

FIG. 3A illustrates a perspective view of an electronic device 201 according to an embodiment, wherein an external accessory (e.g., the keyboard cover 310) for displaying a user interface is attached to a second display area 263 of a display 260 while a hinge (e.g., the hinge 281 in FIG. 2A) of the electronic device 201 is in a folded state (e.g., a state in which a first housing 271 and a second housing 273 are folded with a certain angle or distance therebetween).

FIG. 3B illustrates a perspective view of an electronic device 201 according to an embodiment, wherein a hinge (e.g., the hinge 281 in FIG. 2A) of the electronic device 201 is in a fully folded state (e.g., a state in which a first housing 271 and a second housing 273 are in contact with each other) while an external accessory (e.g., the keyboard cover 310) for display of a user interface is attached to a second display area 263 of the electronic device 201.

FIG. 3C illustrates a side view of an electronic device 201 according to an embodiment, wherein a hinge of the electronic device 201 is in a fully folded state (e.g., a state in which a first housing 271 and a second housing 273 are in contact with each other) while an external accessory (e.g., the keyboard cover 310) for displaying a user interface is attached to a second display area 263 of the electronic device 201. The external accessory 310 is positioned in the space between the first housing 271 and the second housing 273 while the hinge of the electronic device 201 is in the fully folded state.

FIGS. 4A, 4B, 4C, and 4D are diagrams 400a to 400d illustrating the states of a display based on the position of an external accessory attached to the display in an electronic device according to various embodiments of the disclosure.

Figure 4A:
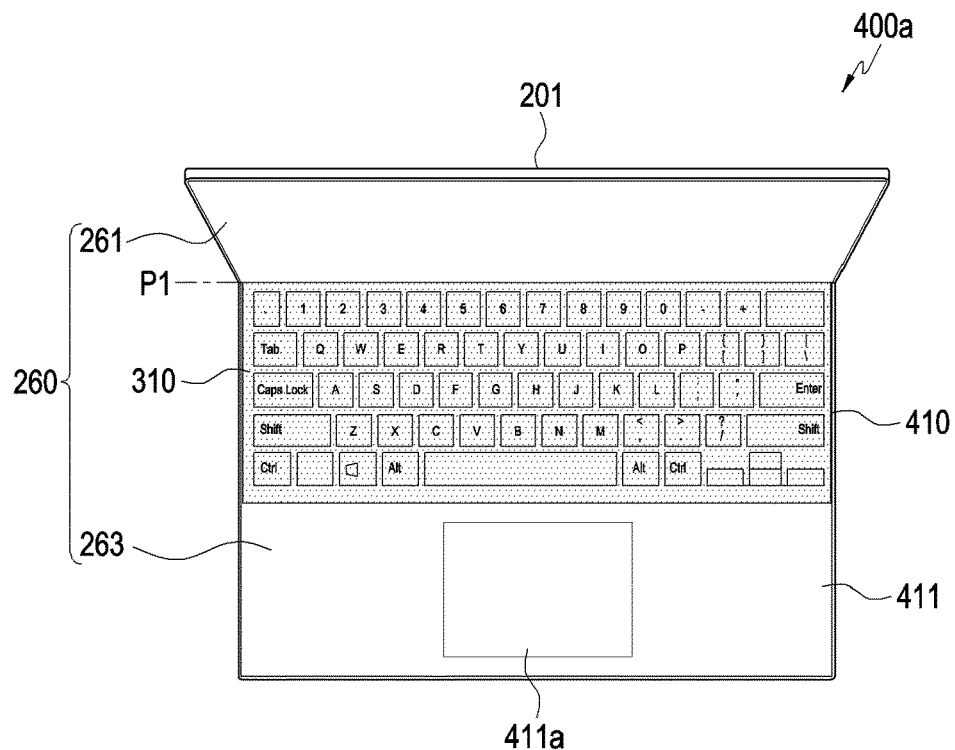
FIGS. 4A, 4B, 4C, and 4D illustrate the states of a display based on the position of an external accessory attached to the display in an electronic device according to various embodiments of the disclosure.

FIG. 4A illustrates a first state in which in an electronic device 201 according to an embodiment, a hinge (e.g., the hinge 281 in FIG. 2A) of the electronic device 201 is folded so that a display 260 is divided into a first display area 261 and a second display area 263, and an external accessory (e.g., the keyboard cover 310) for displaying a user interface is attached from a first position P1 corresponding to an upper side of the second display area 263. In the first state, when an external accessory (e.g., the keyboard cover 310) is attached to the second display area 263, the electronic device 201 may display a keyboard for text input on the second display area 263 to which the external accessory 310 is attached, and may be in a state in which typing can be performed using the keyboard.

In the first state, the electronic device 201 may determine, as a first screen area 411, an area below a first area 410 that is the remaining area in the second display area 263, other than the first area 410 to which the external accessory (e.g., the keyboard cover 310) is attached, and may provide a function set to the first screen area 411. The electronic device 201 may display a touchpad area 411a for providing a function set to the first screen area 411 located below the first area 410 to which the external accessory 312 is attached, for example, a touchpad function.

The electronic device 201 may adjust and display the size of the touchpad area based on the size of the first screen area 411 located below the first area 410 to which the external accessory 312 is attached.

Figure 4B:
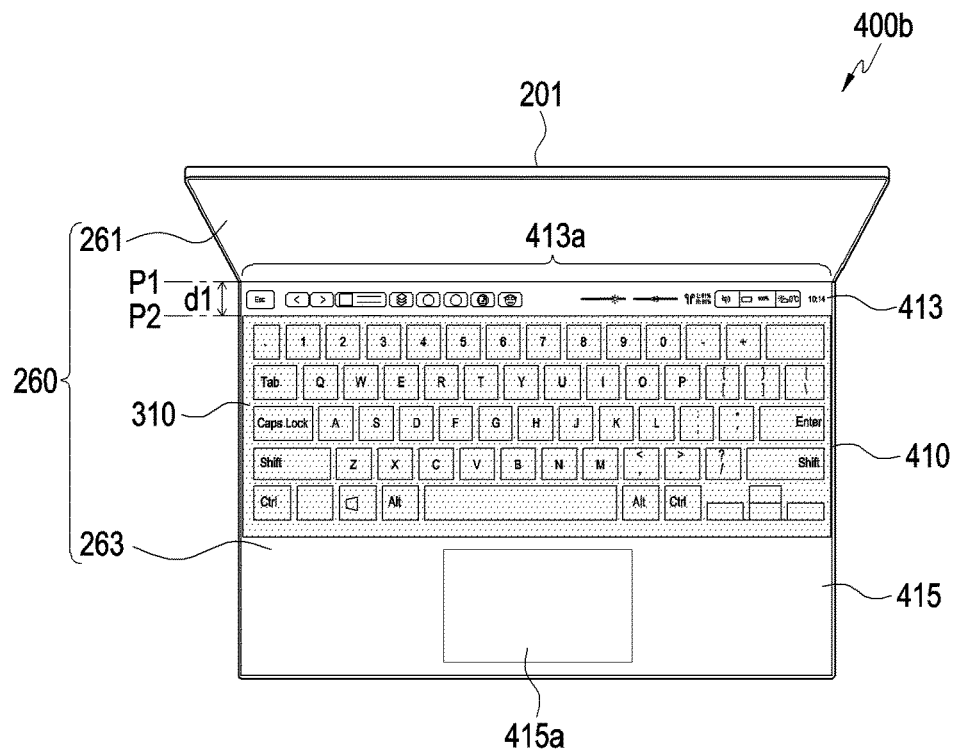

FIG. 4B illustrates a second state in which in an electronic device 201 according to an embodiment, a hinge (e.g., the hinge 281 in FIG. 2A) of the electronic device 201 is folded to divide a display 260 into a first display area 261 and a second display area 263, and an external accessory (e.g., the keyboard cover 310) for displaying a user interface is attached from a second position P2 that is at a first distance d1 away from a first position P1 corresponding to the upper side of the second display area 263. When an external accessory (e.g., the keyboard cover 310) is attached to the second display area 263 in the second state, the electronic device 201 may display a keyboard for text input in the second display area 263 to which the external accessory 310 is attached, and may be in a state in which typing can be performed using the keyboard.

In the second state, the electronic device 201 may determine, in the second display area 263, an area located above a first area 410 to which the external accessory (e.g., the keyboard cover 310) is attached and an area located below the first area 410 as a second screen area 413 and a third screen area 415, respectively, and may provide a function set to each of the second screen area 413 and the third screen area 415. The electronic device 201 may display a function set to the second screen area 413, for example, at least one function key (e.g., an Fn key) 413a of a keyboard. While displaying the at least one function key 413a of the keyboard in the second screen area 413, the electronic device 201 may change and display the type of function key displayed in the second screen area 413 based on an up-and-down scrolling motion detected in the second screen area 413 or input of a specific key. The electronic device 201 may display, for example, at least one of function keys for performing an operation related to an application displayed in the first display area 261, as the function set to the second screen area 413. The electronic device 201 may display, in the second screen area 413, a function related to an application running in the first display area 261 or other functions unrelated to the application running in the first display area 261. The electronic device 201 may display a touchpad area 415a for providing a function set to the third screen area 415, for example, a touchpad function. The electronic device 201 may adjust and display the size of the touchpad area 415a by scaling the touchpad area 415a based on the size of the third screen area 415 located below the first area 410 to which the external accessory 310 is attached.

Figure 4C:
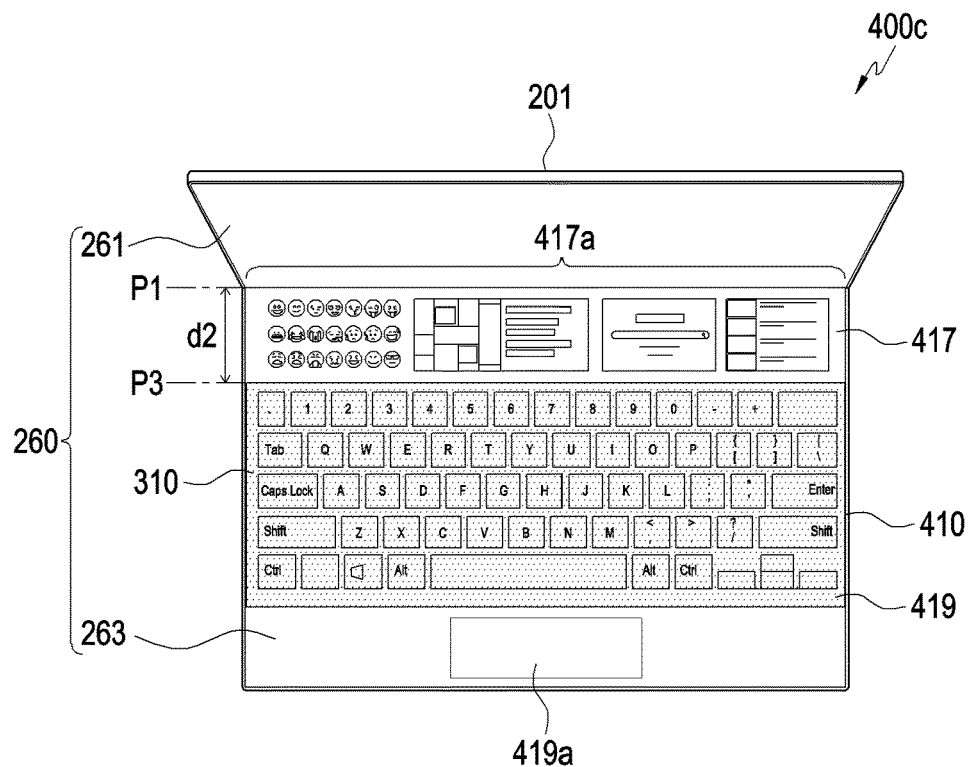

FIG. 4C illustrates a third state in which in an electronic device 201 according to an embodiment, a hinge (e.g., the hinge 281 in FIG. 2A) of the electronic device 201 is folded so that a display 260 is divided into a first display area 261 and a second display area 263, and an external accessory (e.g., the keyboard cover 310) for displaying a user interface is attached from a third position P3 that is at a second distance d2 longer than the first distance d1 of the second state in FIG. 4B and away from a first position P1 corresponding to the upper side of the second display area 263. In the third state, when an external accessory (e.g., the keyboard cover 310) is attached to the second display area 263, the electronic device 201 may display a keyboard for text input in the second display area 263 to which the external accessory 310 is attached, and may be in a state in which typing can be performed using the keyboard.

In the third state, the electronic device 201 may determine, in the second display area 263, an area located above a first area 410 to which the external accessory (e.g., the keyboard cover 310) is attached and an area located below the first area 410 as a fourth screen area 417 and a fifth screen area 419, respectively, and may provide a function set to each of the fourth screen area 417 and the fifth screen area 419. In the third state, the fourth screen area 417 may be configured to include an area having a larger size than the second screen area 413 in the second state in FIG. 4B, and the fifth screen area 419 may be configured to include an area having a smaller size than the third screen area 415 in the second state in FIG. 4B. The electronic device 201 may display a function set to the fourth screen area 417 located above the first area to which the external accessory 310 is attached. The electronic device 201 may display a function set to the fourth screen area 417, for example, a function key (e.g., an Fn key) of a keyboard or at least one of preview screens corresponding to frequently used applications. The electronic device 201 may display, in the fourth screen area 417 larger than the second screen area 413 in the second state, a function related to an application running on the first display area 26 or other functions unrelated to the application running on the first display area 26. The electronic device 201 may display a touchpad area 419a for providing a function set to the fifth screen area 419 located below the first area 410 to which the external accessory 310 is attached, for example, a touchpad function. The electronic device 201 may adjust and display the size of the touchpad area 419a based on the size of the fifth screen area 419 located below side of the first area 410 to which the external accessory 310 is attached.

Figure 4D:
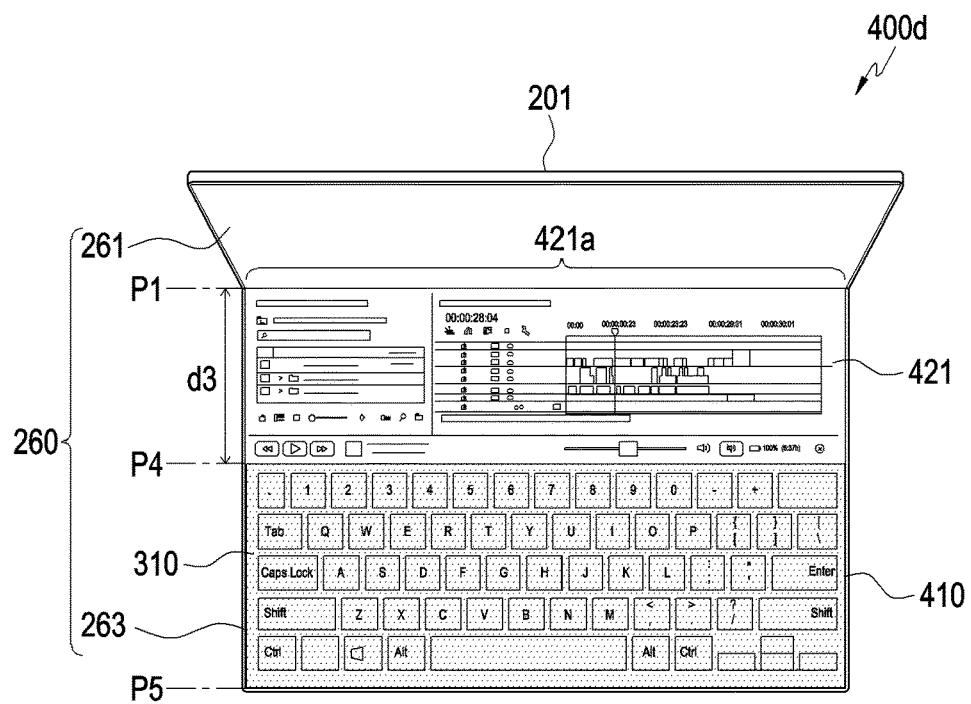

FIG. 4D illustrates a fourth state in which in an electronic device 201 according to an embodiment, a hinge (e.g., the hinge 281 in FIG. 2A) of the electronic device 201 is folded so that a display 260 is divided into a first display area 261 and a second display area 263, and an external accessory (e.g., the keyboard cover 310) for displaying a user interface is attached from a fourth position P4, which is at a third distance d3 longer than the second distance d2 in the third state in FIG. 4C and away from a first position P1 corresponding to the upper side of the second display area 263, to a fifth position P5 corresponding to the lower side of the second display area 263. In the fourth state, when an external accessory (e.g., the keyboard cover 310) is attached to the second display area 263, the electronic device 201 may display a keyboard for text input in the second display area 263 to which the external accessory 310 is attached, and may be in a state in which typing can be performed using the keyboard. In the fourth state, the electronic device 201 may configured an area in the second display area 263, located above a first area 410 to which the external accessory (e.g., the keyboard cover 310) is attached, as a sixth screen area 421, and may provide a function set to the sixth screen area 421.

The electronic device 201 may use a function set to the sixth screen area 421 located above the first area 410 to which the external accessory 310 is attached, for example, a multi-window function 421a. The electronic device 201 may display a function set to the sixth screen area 421, for example, at least one of a preview screen corresponding to a recently used application, a preview screen corresponding to a frequently used application, or a function window related to a running application displayed in the first display area 261. In the fourth state, the electronic device 201 may extend, based on a user's gesture, the sixth screen area 421 to the first area 410 to which the external accessory (e.g., the keyboard cover 310) is attached, and use the same.

According to various embodiments, in the first state to the fourth state, the electronic device 201 may display a keyboard displayed in the first area 410 to which the external accessory (e.g., the keyboard cover) 310 is attached in the second display area 263 as a type of keyboard selected by a user. In the first state to the fourth state, the electronic device 201 may configure at least one screen area (e.g., a first screen area in the first state, a second screen area and a third area in the second state, a fourth screen area and a fifth area in the third state, or a sixth area in the fourth state) in the second display area 263 based on the position (e.g., the first area 410) of the external accessory (e.g., the keyboard cover) 310 attached to the second display area 263, and may display a pre-associated UI in the at least one configured screen area.

Figure 5:
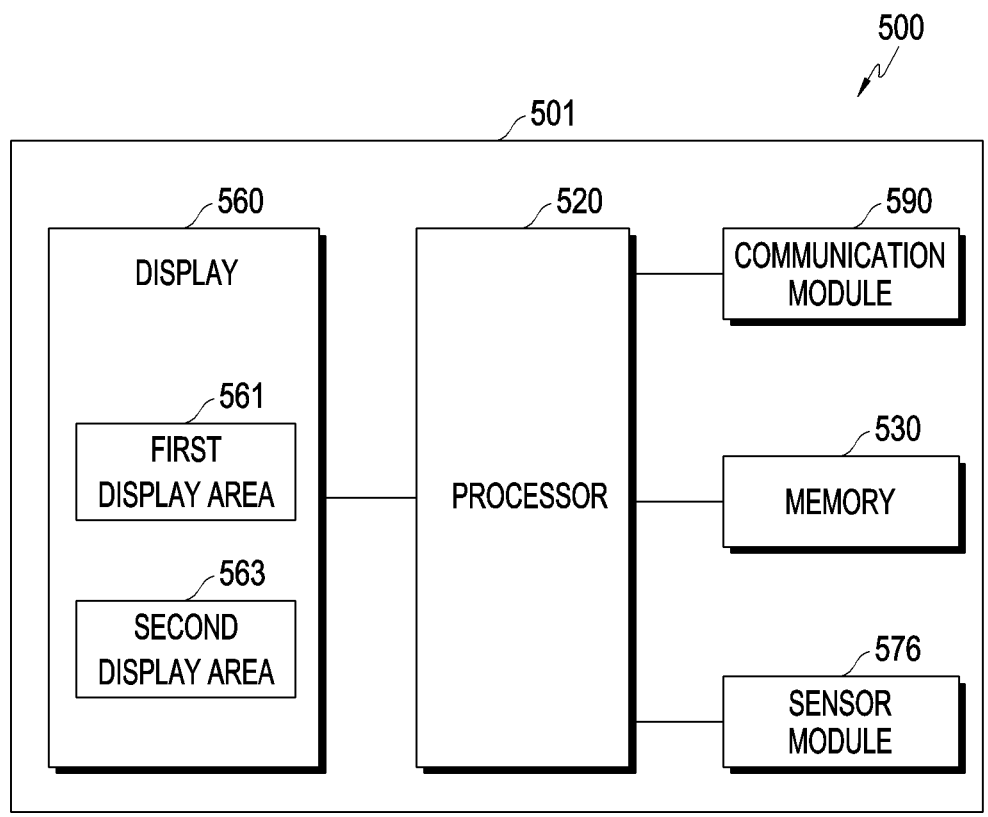
FIG. 5 is a block diagram of an electronic device according to an embodiment of the disclosure.

FIG. 5 is a block diagram 500 of an electronic device according to an embodiment of the disclosure.

Referring to FIG. 5, an electronic device 501 (e.g., the electronic device 101 in FIG. 1 and/or the electronic device 201 in FIGS. 2A to 2C, 3A to 3C and 4A to 4D) may include a processor 520, memory 530, a display 560, a sensor module 576, and a communication module 590.

According to various embodiments, the processor 520 may detect that, in a folded state of a hinge (e.g., the hinge 281 in FIG. 2A) of the electronic device 501 (e.g., the folded state of the electronic device 201 in FIG. 2A), an external accessory (e.g., the external accessory (e.g., the keyboard cover 310) in FIGS. 4A to 4D) for displaying a user interface is attached to a second display area 563 of the display 560 (e.g., the display 260 in FIGS. 2A to 2C, 3A to 3C and 4A to 4C) (e.g.: the second display area 263 in FIGS. 2A to 2C, 3A to 3C and 4A to 4C).

According to an embodiment, the processor 520 may detect the attachment of the external accessory to the second display area 563 and the type of the external accessory, based on a pattern of capacitance detected by at least one conductive object included in the external accessory attached to the second display area 563.

For example, when a pattern of first capacitance is detected through the second display area 563, the processor 520 may detect that a keyboard cover for displaying a keyboard is attached to the second display area 563. Alternatively, when a pattern of second capacitance is detected through the second display area 563, the processor 520 may detect that a dial cover for displaying a dial is attached to the second display area 563.

According to an embodiment, the processor 520 may include multiple Hall sensors capable of detecting at least one magnet included in the external accessory, and may determine the position of an area in the second display area 563 to which the external accessory is attached, based on a position in which a Hall sensor, among the multiple Hall sensors, which detects a magnetic field caused by the at least one magnet included in the external accessory, is disposed.

According to an embodiment, when sensing signal information about a magnetic field is received from a first Hall sensor among the multiple Hall sensors, the processor 520 may detect that the external accessory is in a first state (e.g., the first state in FIG. 4A) in which the external accessory is attached from a first position corresponding to the upper side of the second display area 563.

According to an embodiment, when sensing signal information about a magnetic field is received from a second Hall sensor among the multiple Hall sensors, the processor 520 may detect that the external accessory is in a second state (e.g., the second state in FIG. 4B) in which the external accessory is attached from a second position that is at a first distance away from the first position corresponding to the upper side of the second display area 563.

According to an embodiment, when sensing signal information about a magnetic field is received from a third Hall sensor among the multiple Hall sensors, the processor 520 may detect that the external accessory is in a third state (e.g., the third state in FIG. 4C) in which the external accessory is attached from a third position that is at a second distance away from the first position corresponding to the upper side of the second display area 563 and longer than the first distance in the second state (e.g., the second state in FIG. 4B).

According to an embodiment, when sensing signal information about a magnetic field is received from a fourth Hall sensor among the multiple Hall sensors, the processor 520 may detect that the external accessory is in a fourth state (e.g., the fourth state in FIG. 4D) in which the external accessory is attached from a fourth position that is at a third distance away from the first position corresponding to the upper side of the second display area 563 and longer than the second distance of the third state (e.g., the third state in FIG. 4C).

According to an embodiment, when a first condition is satisfied based on Equation 1 below, the processor 520 may detect that the external accessory is in a first state (e.g., the first state in FIG. 4A) in which the external accessory is attached from a first position corresponding to the upper side of the second display area 563. When a second condition is satisfied based on Equation 1 below, the processor 520 may detect that the external accessory is in a second state (e.g., the second state in FIG. 4B) in which the external accessory is attached from a second position that is at a first distance away from the first position corresponding to the upper side of the second display area 563, or in a third state (e.g., the third state in FIG. 4C) in which the external accessory is attached from a third position that is at a second distance away from the first position corresponding to the upper side of the second display area 563 and longer than the first distance in the second state (e.g., the second state in FIG. 4B). When a third condition is satisfied based on Equation 1 below, the processor 520 may detect that the external accessory is in a fourth state (e.g., the fourth state in FIG. 4D) in which the external accessory is attached from a fourth position that is at a third distance away from the first position corresponding to the upper side of the second display area 563 and longer than the second distance of the third state (e.g., the third state in FIG. 4C).

First condition: $KA(y) - SA(y) < \alpha$     Equation 1

Second condition: $KA(y) - SA(y) < (SY - KY) - \alpha$

Third condition: $KA(y) - SA(y) > (SY - KY) - \alpha$

SA(y): The top coordinate y-value of the second display area

KA(y): The top coordinate y-value of the external accessory attached to the second display area BA(y): The bottom coordinate y-value of the external accessory attached to the second display area SY: The y-direction size value of the second display area KY: The y-direction size value of the external accessory α: Threshold value for recognizing a screen area to be displayed in the second display area According to an embodiment, when the second condition is satisfied based on Equation 1 above, and thus the second state (e.g., the second state in FIG. 4B) and the third state (e.g., the third state in FIG. 4C) are detected, the processor 520 may distinguish and detect the second state or the third state based on a position in which a Hall sensor (e.g., the second Hall sensor or the third Hall sensor), which receives sensing signal information about a magnetic field, among the multiple Hall sensors provided in the electronic device 201, is disposed.

According to various embodiments, the processor 520 may display, in a folded state of a hinge (e.g., the hinge 281 in FIG. 2A) of the electronic device 501 (e.g., a folded state of the electronic device 201 in FIG. 2A), a user interface corresponding to the type of external accessory for displaying a user interface (e.g., the external accessory (e.g., the keyboard cover 310) in FIGS. 4A to 4D) in a first area (e.g., the first area 410 in FIGS. 4A to 4D) of the second display area 563 (e.g., the second display area 263 in FIGS. 2A to 2C, 3A to 3C and 4A to 4C) to which the external accessory for displaying the user interface is attached.

According to an embodiment, when the attachment and type of the external accessory attached to the second display area 563 are detected, the processor 520 may determine size information and/or shape information of the external accessory based on external accessory information stored in the memory 530.

According to an embodiment, the processor 520 may display a user interface corresponding to the type and/or shape of the external accessory in the first area (e.g., the first area 410 in FIGS. 4A to 4D) of the second display area 563 to which the external accessory is attached.

According to an embodiment, the processor 520 may display, based on a user selection, another user interface corresponding to the type and/or shape of the external accessory on the first area (e.g., the first area 410 in FIGS. 4A to 4D) of the second display area 563 to which the external accessory is attached. For example, while displaying a keyboard as a user interface in the first area (e.g., the first area 410 in FIGS. 4A to 4D), to which a keyboard cover for displaying a keyboard is attached, in the second display area 563, the processor 520 may change text on the keyboard based on a user selection.

According to an embodiment, while displaying a user interface corresponding to the type and/or shape of the external accessory in the first area (e.g., the first area 410 in FIGS. 4A to 4D) of the second display area 563 to which the external accessory is attached, the processor 520 may detect a touch input to a predetermined area of the user interface displayed in the first area of the second display area 563 to which the external accessory is attached by pressing of a predetermined area of the external accessory. The processor 520 may perform a function corresponding to the predetermined area of the user interface in which the touch input is detected.

According to an embodiment, the processor 520 may remove the display of the user interface on the second display area 563 when the external accessory is removed in a state in which the external accessory is attached to the second display area 563.

According to various embodiments, in a folded state of the hinge (e.g., the hinge 281 in FIG. 2A) of the electronic device 501 (e.g., the folded state of the electronic device 201 in FIG. 2A), the processor 520 may configure, based on the position of a first area (e.g., the first area 410 in FIG. 4A to FIG. 4D) of the second display area 563 (e.g., the second display area 263 in FIGS. 2A to 2C, 3A to 3C and 4A to 4C) to which an external accessory is attached for display of a user interface, at least one remaining area in the second display area, other than the first area to which the external accessory is attached, as at least one screen area, and may provide a function set to the at least one screen area.

According to an embodiment, when it is detected that the external accessory is in a first state (e.g., the first state in FIGS. 4A to 4D) in which the external accessory is attached from a first position corresponding to the upper side of the second display area 563, the processor 520 may determine a remaining area in the second display area 563, other than a first area (e.g., 410 in FIG. 4A) to which the external accessory is attached, as a first screen area (e.g., the first screen area 411 in FIG. 4A). The processor 520 may display a GUI for providing a function set to the first screen area located below the first area to which the external accessory is attached, for example, a touchpad function.

According to an embodiment, when it is detected that the external accessory is in a second state (e.g., the second state in FIG. 4B) in which the external accessory is attached from a second position which is at a first distance away from the first position corresponding to the upper side of the second display area 563, the processor 520 may determine the remaining areas in the second display area 563, other than a first area (e.g., 410 in FIG. 4B) to which the external accessory is attached, as a second screen area (e.g., the second screen area 413 in FIG. 4B) and a third screen area (e.g., the third screen area 415 in FIG. 4B). The processor 520 may display a function set to the second screen area located above the first area to which the external accessory is attached, for example, at least one of a function key (e.g., an Fn key) of a keyboard or a function key for performing an operation related to an application displayed on a first display area 561. The processor 520 may display a GUI capable of providing a function set to the third screen area located below the first area to which the external accessory is attached, for example, a touchpad function. The processor 520 may display a GUI capable of providing a touchpad function in the third screen area that has a smaller size than the first screen area in which a GUI capable of providing a touchpad function is displayed in the first state. For example, while displaying a function key of a keyboard in the second screen area, the processor 520 may change and display the type of function key displayed in the second screen area, based on an up-and-down scrolling motion detected in the second screen area or input of certain keys.

According to an embodiment, when it is detected that the external accessory is in a third state (e.g., the third state in FIG. 4C) in which the external accessory is attached from a third position which is at a second distance away from the first location corresponding to the upper side of the second display area 563 and longer than the first distance in the second state, the processor 520 may determine the remaining areas in the second display area 563, other than a first area (e.g., 410 in FIG. 4C) to which the external accessory is attached, as a fourth screen area (e.g., the fourth screen area 417 in FIG. 4C) and a fifth screen area (e.g., the fifth screen area 419 in FIG. 4C). The processor 520 may display a function set to the fourth screen area located above the first area to which the external accessory is attached, for example, at least one of a function key (e.g., an Fn key) of a keyboard, a preview screen corresponding to a recently used application, or a preview screen corresponding to a frequently used application. The processor 520 may display a GUI capable of providing a function set to the fifth screen area located below the first area to which the external accessory is attached, for example, a touchpad function. The processor 520 may display a GUI capable of providing the touchpad function on the fifth screen area that has a smaller size than the third screen area for displaying a GUI capable of providing a touchpad function in the second state.

For example, while a function key of a keyboard and at least one preview screen are respectively displayed in two subareas included in the fourth screen area, when a swipe-out motion is detected in the subarea displaying the function key, the processor 520 may enlarge and display the at least one preview screen in the fourth screen area including the two subareas without displaying the function key in the fourth screen area.

According to an embodiment, when it is detected that the external accessory is in a fourth state (e.g., the fourth state in FIG. 4D) in which the external accessory is attached from a fourth position which is at a third distance away from the first position corresponding to the upper side of the second display area 563 and longer than the second distance in the third state, the processor 520 may determine the remaining area in the second display area 563, other than a first area (e.g., 410 in FIG. 4D) to which the external accessory is attached, as a sixth screen area (e.g., the sixth screen area 421 in FIG. 4D). The processor 520 may display a function set to the sixth screen area located above the first area to which the external accessory is attached, for example, a preview screen corresponding to a recently used application, a preview screen corresponding to a frequently used application, or a function window related to a running application being displayed in the first display area 561.

For example, when an up-and-down scrolling motion is detected in one of multiple subareas included in the sixth screen area while multiple preview screens are displayed in the multiple subareas, the processor 520 may sequentially display other preview screens, which are not displayed to be correspond to the up-and-down scrolling motion, in the subarea in which the up-and-down scrolling motion has been detected.

According to an embodiment, in the fourth state, when a downward dragging motion is detected at the boundary of the first display area 561 and the second display area 563, the processor 520 may extend an image screen displayed in the first display area 561 to the sixth screen area of the second display area 563 for display. When a long touch is detected at the boundary between the image screen and a first area, in which the user interface is displayed, in the second display area 563 while the image screen is displayed including the first display area 561 and the sixth screen area 421 of the second display area 563, the processor 520 may display the image screen throughout the first display area 561 and the second display area 563. The processor 520 may adjust the transparency of the first area in the second display area 563 to display a user interface displayed in the first area, thereby overlapping and displaying the user Interface and a portion of the image screen.

According to various embodiments, the memory 530 may be implemented to be substantially the same as or similar to the memory 130 in FIG. 1.

According to an embodiment, the memory 530 may store information (e.g., type information, size information, and shape information) about an external accessory for displaying in a user interface.

According to various embodiments, the display 560 (e.g., the display 260 in FIGS. 4A to 4D) may include a first display area 561 (e.g., the first display area 261 in FIGS. 4A to 4D) and a second display area 563 (e.g., the second display area 263 in FIGS. 4A to 4D). The position of the first display area 561 may be changed at a certain angle in response to folding of a hinge (e.g., the hinge 281 in FIG. 2A).

According to an embodiment, in the second display area 563, a user interface corresponding to the type of external accessory area (e.g., the external accessory 310 in FIGS. 4A to 4D) for displaying an interface may be displayed in a first area to which the external accessory is attached.

According to an embodiment, when at least one remaining area in the second display area 563, other than the first area to which the external accessory is attached, is configured as at least one screen area, the processor 520 may be provide a function set to the at least one screen.

According to various embodiments, the display 560 may be identical to the display module 160 in FIG. 1, or may perform at least one function or operation performed by the display module 160.

According to various embodiments, the sensor module 576 may be implemented to be substantially the same as or similar to the sensor module 176 in FIG. 1.

According to an embodiment, the sensor module 576 may include various sensors capable of detecting an unfolding state of the electronic device, a folding state of the electronic device, a posture state (or mounting state) of the electronic device, and a rotation state of the electronic device.

According to an embodiment, the sensor module 576 may include an angle sensor, a tilt sensor, an acceleration sensor, a geomagnetic sensor, a gyro sensor, a motion sensor, a gravity sensor, and a proximity sensor. For example, the sensor module 576 may use sensor information received from at least one of an angle sensor, a tilt sensor, an acceleration sensor, a geomagnetic sensor, a gyro sensor, or a motion sensor to transmit sensor information corresponding to an unfolding state of the electronic device, a folding state of the electronic device, a posture state (or mounting state) of the electronic device, and a rotation state of the electronic device to the processor 520.

According to an embodiment, the sensor module 576 may include multiple Hall sensors, and may transmit sensor information received from a Hall sensor, among the multiple Hall sensors, which detects a magnetic field caused by at least one magnet included in an external accessory for displaying a user interface, to a processor 520 such that the processor 520 may determine the position of an area in the second display area 563, to which the external accessory is attached, based on the position of the Hall sensor that transmitted the sensor information.

According to various embodiments, the communication module 590 may be implemented to be substantially the same as or similar to the communication module 190 in FIG. 1, and may include multiple communication circuits using different communication technologies.

According to various embodiments, the communication module 590 may include at least one of a wireless LAN module (not shown) and a short-range communication module (not shown), wherein the short-range communication module (not shown) may include an ultra-wide band (UWB) communication module, a Wi-Fi communication module, an NFC communication module, a Bluetooth legacy communication module, and/or a BLE communication module.

Figure 6A:
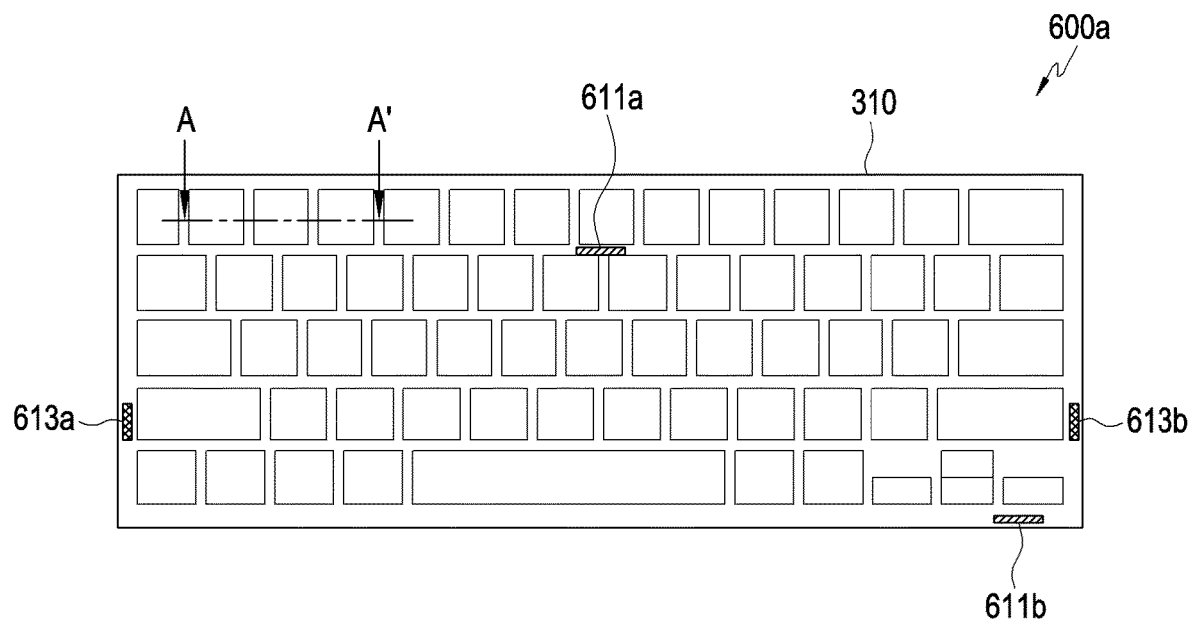
FIG. 6A illustrates an external accessory to be attached to a display of an electronic device according to an embodiment of the disclosure.

FIG. 6A is a diagram 600a illustrating an external accessory to be attached to a display of an electronic device according to an embodiment of the disclosure.

Figure 6B:
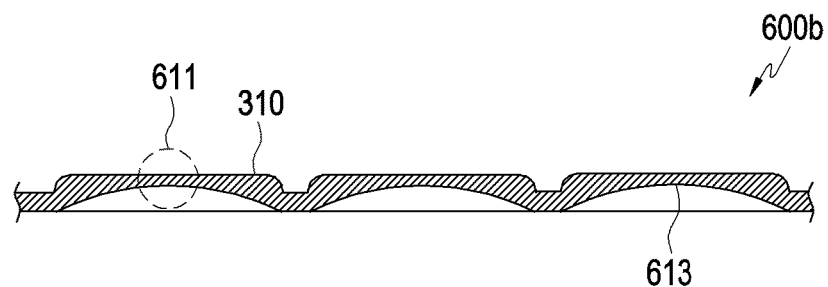
FIG. 6B is a cross-sectional view taken along A-A' in FIG. 6A according to an embodiment of the disclosure.

FIG. 6B is a cross-sectional view 600b taken along A-A' in FIG. 6A according to an embodiment of the disclosure.

FIGS. 6A and 6B illustrate the external accessory as a keyboard cover (or keyboard skin), but the same may be applied to other external accessories.

Referring to FIG. 6A, a keyboard cover (or keyboard skin) 310 for displaying a keyboard, among external accessories for displaying a user interface, may include conductive material 611a and 611b (e.g., metal (e.g., silver, copper, gold, aluminum, tungsten, zinc, brass, tin, lead, or stainless steel) or a carbon allotrope (e.g., graphite or graphene)) disposed in predetermined areas in the keyboard cover (or the keyboard skin) 310 such that, when the keyboard cover (or the keyboard skin) 310 is attached to a second display area (e.g., the second display area 263 in FIGS. 2A to 2C, 3A to 3C, and 4A to 4D and/or the second display area 563 in FIG. 5) of an electronic device (e.g., the electronic device 201 in FIGS. 2A to 2C, 3A to 3C, and 4A to 4D and/or the electronic device 501 in FIG. 5), the electronic device is capable of detecting the attachment of the keyboard cover (or the keyboard skin) 310 and the type of the keyboard cover (or the keyboard skin) 310. The keyboard cover (or keyboard skin) 310 may include magnets 613a and 613b disposed at two ends of the inside of the keyboard cover 310, respectively, such that when the keyboard cover 310 is attached to the second display area, the electronic device determines the position of the keyboard cover 310 attached to the second display area and the keyboard cover 310 attached to the second display area is prevented from being detached. The magnets 613a and 613b disposed at the two ends of the inside of the keyboard cover 310, respectively, may be in contact with one of multiple magnets disposed in the second display area of the electronic device when the keyboard cover 310 is attached to the second display area.

Although FIG. 6A illustrates the placement of one magnet 613A or 613B at each of the two ends of the inside of the keyboard cover 310, multiple magnets may be arranged and displayed at regular intervals at each of the two ends of the inside of the keyboard cover 310. FIG. 6A illustrates the keyboard cover (or the keyboard skin) 310 being attached to a second display area of the display. However, the keyboard cover (or the keyboard skin) 310 may be attached to a first display area of the display, and the first display area to which the keyboard cover (or keyboard skin) 310 is attached may operate in the same manner as the second display area with the keyboard cover (or keyboard skin) 310 attached.

Referring to FIG. 6B, which shows a cross-sectional view taken along A-A' in FIG. 6A, the keyboard cover 310 is shown to be a keyboard, which is a user's interface displayed on the second display area of the electronic device, and the keyboard cover 310 may be made of a transparent, thin, and elastic material so as to be pressed by the user for touching of the keyboard and then restored. Multiple key covers included in the keyboard cover 310 may recognize a touch of the keyboard displayed on the second display area of the electronic device when respective central portions 611, which have a thin thickness of key material, are pressed. To allow the multiple key covers included in the keyboard cover 310 to be restored after being pressed, the inner side of each of the multiple key covers may be formed in a dome shape 613. A conductive material may be inserted into the keyboard cover 310 to increase touch recognition of the keyboard. To increase touch recognition of the keyboard, a conductive material may be inserted into the keyboard cover 310. Alternatively, in the keyboard cover 310 into which no conductive material is inserted, the pattern of the keyboard cover may be recognized to recognize the touch of the keyboard and to recognize changes in the position of the keyboard.

Figure 7A:
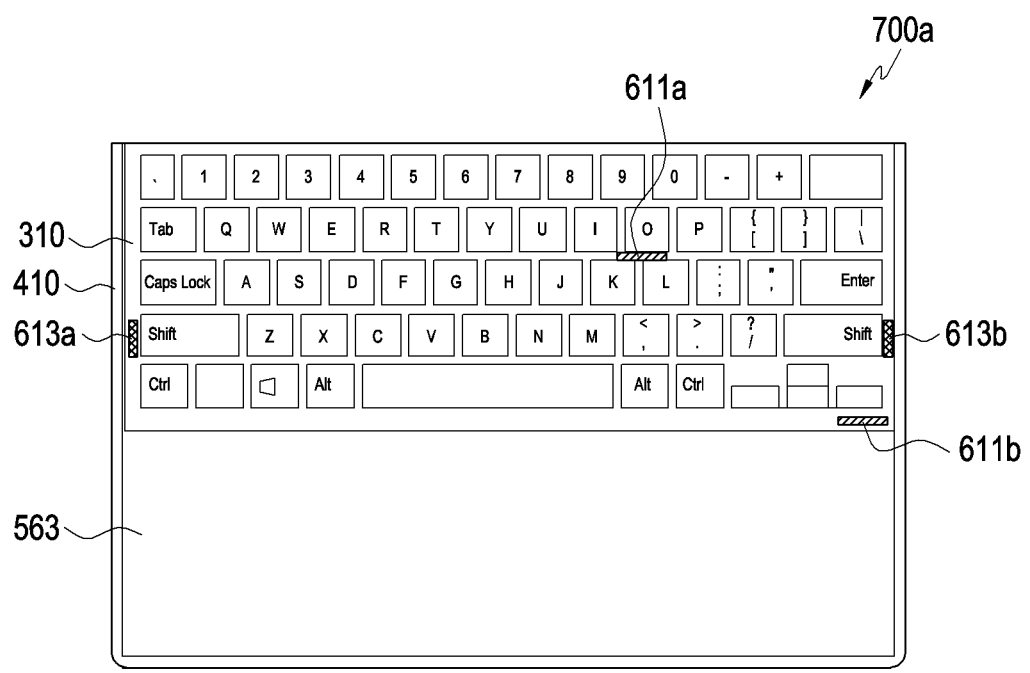
FIGS. 7A, 7B, and 7C illustrate an operation of detecting the attachment of an external accessory to a display of an electronic device according to various embodiments of the disclosure.
Figure 7B:
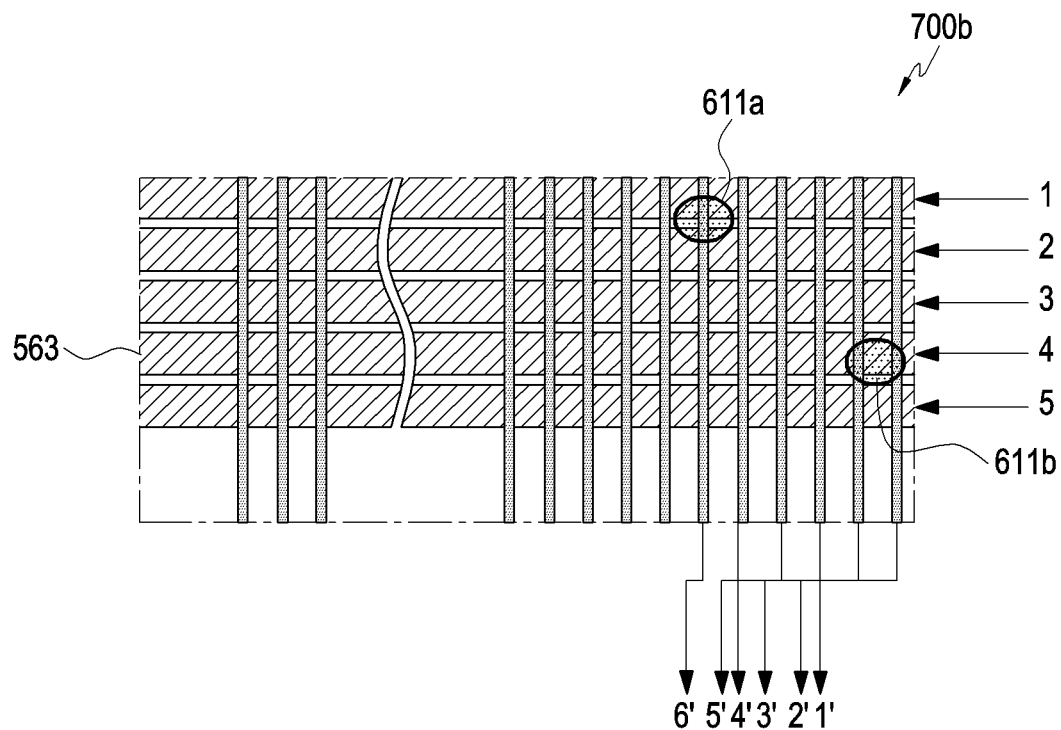
Figure 7C:
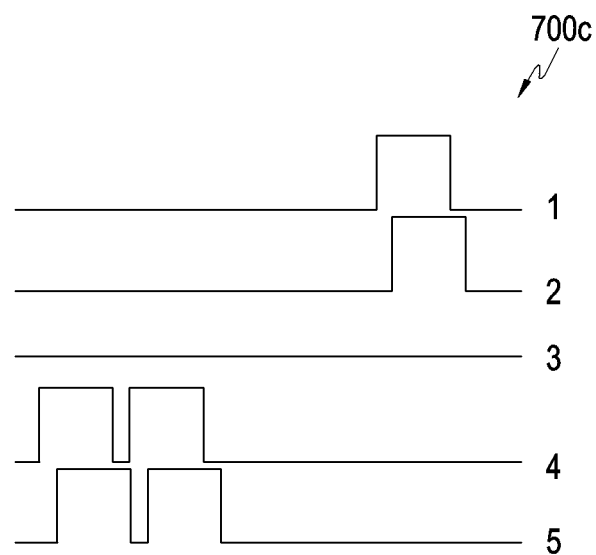

FIGS. 7A, 7B, and 7C are diagrams 700a, 700b and 700c illustrating an operation of detecting the attachment of an external accessory to a display of an electronic device according to various embodiments of the disclosure.

FIGS. 7A to 7C illustrate an external accessory as a keyboard cover (or a keyboard skin), but the same may be applied to other external accessories.

Referring to FIGS. 7A, 7B, and 7C, in a state in which a hinge (e.g., the hinge 281 in FIG. 2A) of an electronic device (e.g., the electronic device 201 in FIGS. 2A to 2C, 3A to 3C, and 4A to 4D and/or the electronic device 501 in FIG. 5) is folded as illustrated in FIGS. 7A and 7B, when a keyboard cover (or a keyboard skin) 310 (e.g., the keyboard cover 310 in FIGS. 6A and 6B) for displaying a keyboard is attached to a second display area 563 (e.g., the second display area 263 in FIGS. 2A to 2C, 3A to 3C, and 4A to 4D), the electronic device may detect a change in a capacitance pattern due to contact of conductive materials 611a are 611b, included in the keyboard cover 310, with the second display area 563. The conductive materials 611a and 611b included in the keyboard cover (or the keyboard skin) 310 may be used to recognize the position of the keyboard cover (or the keyboard skin) 310 and recognize a change in position of the keyboard cover (or the keyboard skin) 310.

According to various embodiments, magnets 613a, 613b disposed at two ends of the inside of the keyboard cover 310, respectively, may be in contact with one of multiple magnets disposed in the second display area when the keyboard cover 310 is attached to the second display area of the electronic device, and thus may be used to maintain the attachment of the keyboard cover 310 to the second display area and to prevent detachment of the keyboard cover 310.

Referring to FIG. 7C, when a pattern of first capacitance is detected in the second display area 563, the electronic device may detect that an external accessory for displaying a user interface has been attached to the second display area 563 and that the type of the attached external accessory is the keyboard cover 310 for displaying a keyboard. When it is detected that the keyboard cover 310 has been attached to the second display area 563, the electronic device may display a keyboard including multiple keys as a user interface in a first area 410 of the second display area 563 to which the keyboard cover 310 is attached.

According to various embodiments, when a keyboard cover having multiple conductive materials (e.g., the conductive materials 611a and 611b) disposed in a particular pattern in the keyboard cover is attached to a second display area, and when multiple touches in a predetermined pattern are detected, the electronic device may import, based on the multiple detected touches, information stored in the electronic device and including a relative position value based on a keyboard size and pattern to identify the position of the attached keyboard cover in the second display area.

According to various embodiments, to increase touch recognition of the keyboard, a conductive material may be inserted into the keyboard cover 310. Alternatively, in the keyboard cover 310 into which no conductive material is inserted, a pattern within key caps of the keyboard cover may be recognized to recognize the touch of the keyboard and recognize a change in position of the keyboard.

FIGS. 8A, 8B, 8C, and 8D are diagrams 800a, 800b, 800c and 800d illustrating operations of detecting the position of an external accessory attached to a display of an electronic device according to various embodiments of the disclosure. FIGS. 8A to 8D illustrate an external accessory as a keyboard cover (or a keyboard skin), but the same may be applied to other external accessories.

FIGS. 8A, 8B, 8C, and 8D are cross-sectional views wherein in a state in which a hinge (e.g., the hinge 281 in FIG. 2A) of an electronic device (e.g., the electronic device 201 in FIGS. 2A to 2C, 3A to 3C, and 4A to 4D, and/or the electronic device 501 in FIG. 5) is folded, and in which a keyboard cover (or a keyboard skin) 310 (e.g., the keyboard cover 310 in FIGS. 6A and 6B) for displaying a keyboard is attached to a second display area 563 (e.g., the second display area 263 in FIGS. 2A to 2C, 3A to 3C, and 4A to 4D), the side surface of the second display area 563 is cut. Magnets (e.g., the magnets 613a and 613b in FIG. 7A) may be disposed at two ends of the inside of the keyboard cover 310, and multiple magnets may be disposed at two ends of the second display area 563 in multiple positions so as to be brought into contact with the magnets (e.g., the magnets 613a and 613b in FIG. 7A) disposed at the two ends of the inside of the keyboard cover 310.

Figures 8A, 8B:
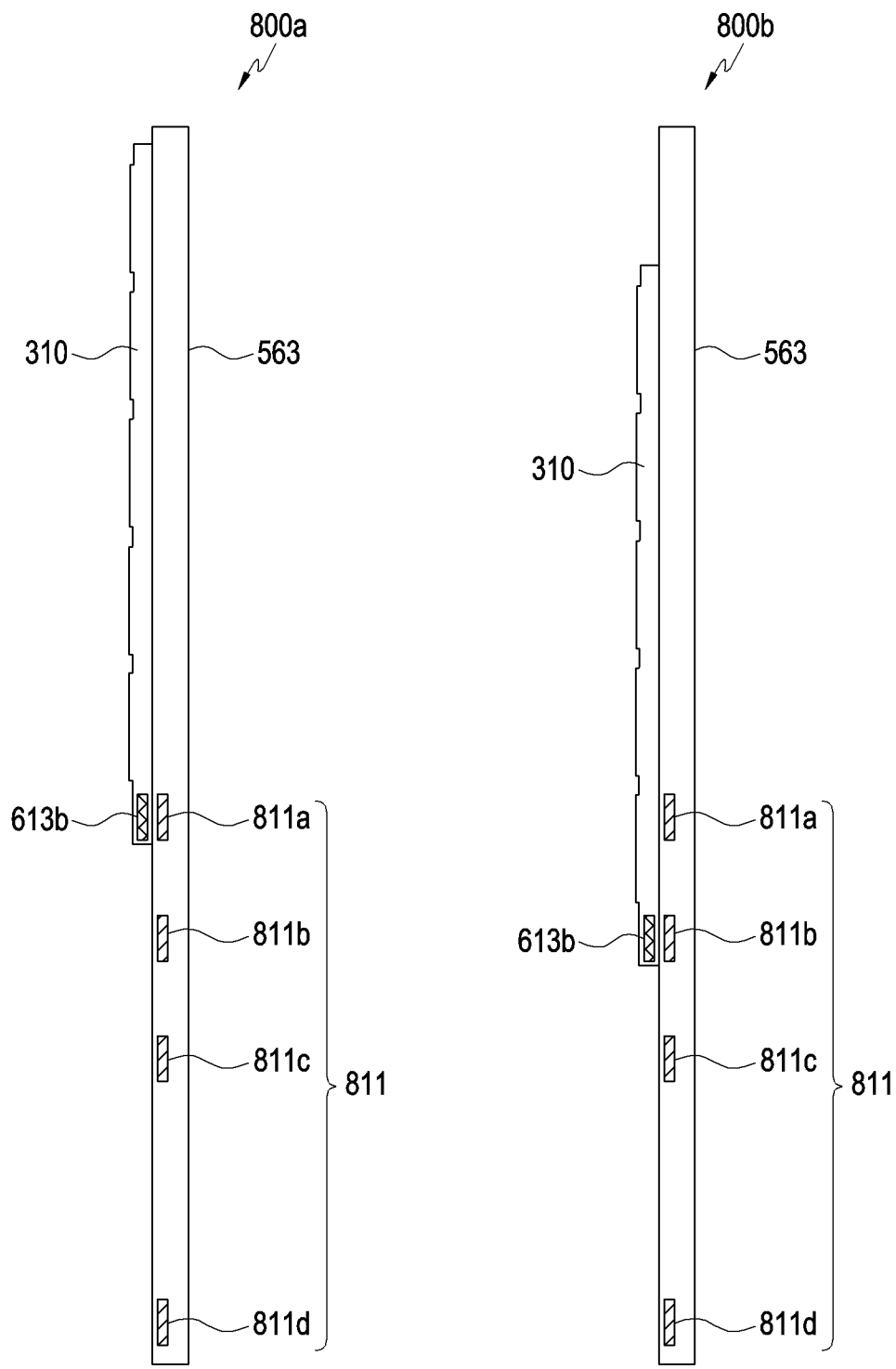
FIGS. 8A, 8B, 8C, and 8D illustrate operations of detecting the position of an external accessory attached to a display of an electronic device according to various embodiments of the disclosure.

Referring to FIG. 8A, when the keyboard cover 310 is attached to the second display area 563, a magnet 613b of the keyboard cover 310 is in contact with a first magnet 811a among multiple magnets 811 disposed in the second display area 563, and thus the electronic device may detect that the keyboard cover 310 is in a first state (e.g., the first state in FIG. 4A) in which the keyboard cover 310 is attached from a first position corresponding to the upper side of the second display area 563.

Referring to FIG. 8B, when the keyboard cover 310 is attached to the second display area 563, the magnet 613b of the keyboard cover 310 is in contact with a second magnet 811b of the multiple magnets 811 disposed in the second display area 563, and thus the electronic device may detect that the keyboard cover 310 is in a second state (e.g., the second state in FIG. 4B). in which the keyboard cover 310 is attached from a second position which is at a first distance away from the first position corresponding to the upper side of the second display area 563.

Figure 8C:
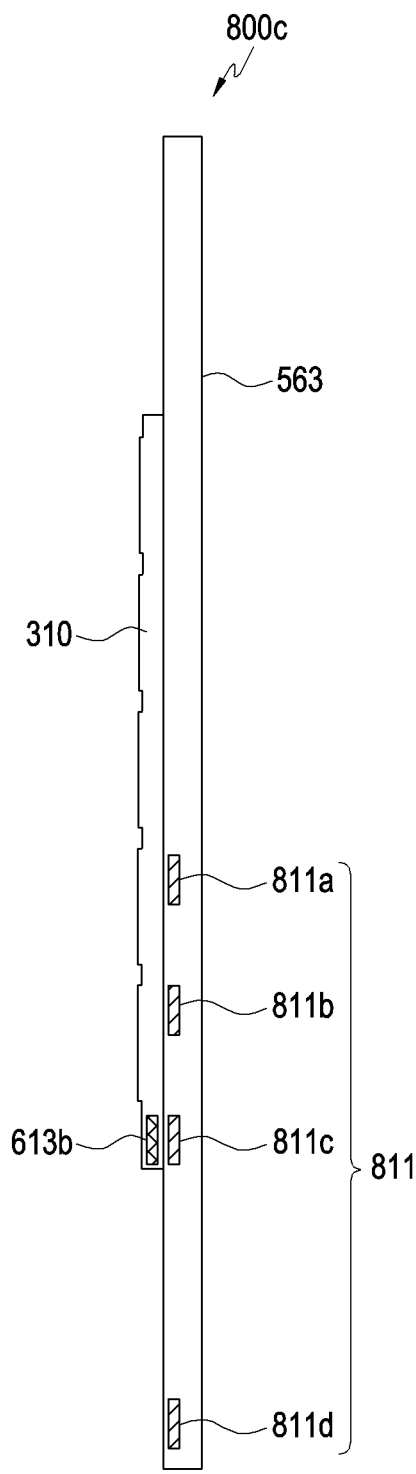

Referring to FIG. 8C, when the keyboard cover 310 is attached to the second display area 563, the magnet 613b of the keyboard cover 310 is in contact with a third magnet 811c of the multiple magnets 811 disposed in the second display area 563, and thus the electronic device may detect that the keyboard cover 310 is in a third state (e.g., the third state in FIG. 4C) in which the keyboard cover 310 is attached from a third position which is at a second distance away from the first position corresponding to the upper side of the second display area 563 and longer than the first distance in the second state (e.g., the second state in FIG. 4B).

Figure 8D:
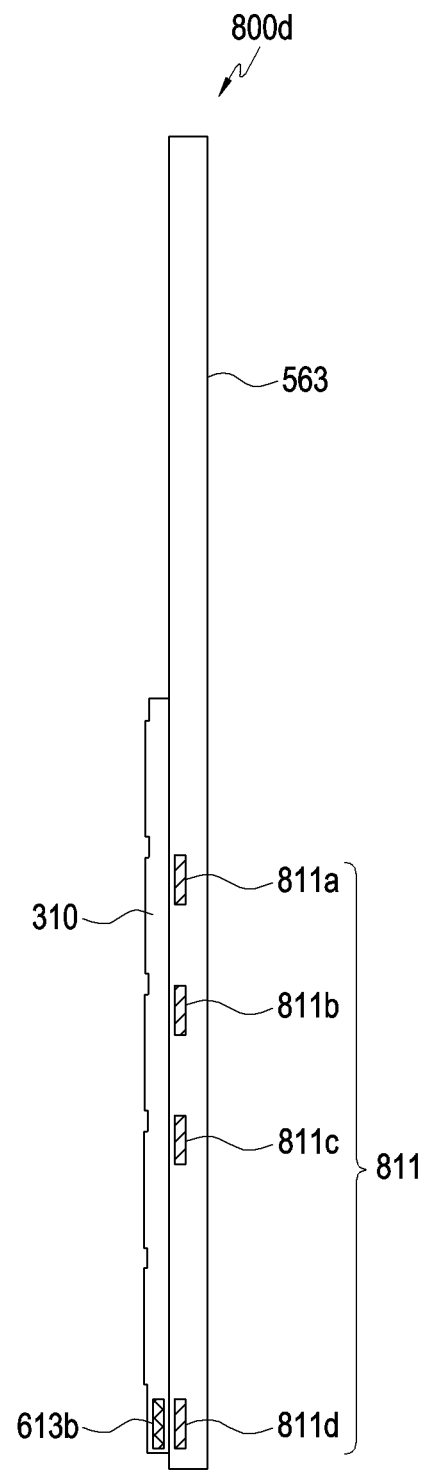

Referring to FIG. 8D, when the keyboard cover 310 is attached to the second display area 563, the magnet 613b of the keyboard cover 310 is in contact with a fourth magnet 811d of the multiple magnets 811 disposed on the second display area 563, the electronic device may detect that the keyboard cover 310 is in a fourth state (e.g., the fourth state in FIG. 4D) in which the keyboard cover 310 is attached from a fourth position which is at a third distance away from the first position corresponding to the upper side of the second display area 563 and longer than the second distance in the third state (e.g., the third state in FIG. 4C).

When the second display area 563 includes multiple Hall sensors, the electronic device may determine an attachment state (e.g., the first state, the second state, the third state, or the state) of the keyboard cover 310 attached to the second display area 563, based on sensing signal information that is output from a Hall sensor, among the multiple Hall sensors, which is in contact with a magnet of the keyboard cover 310.

Figure 9:
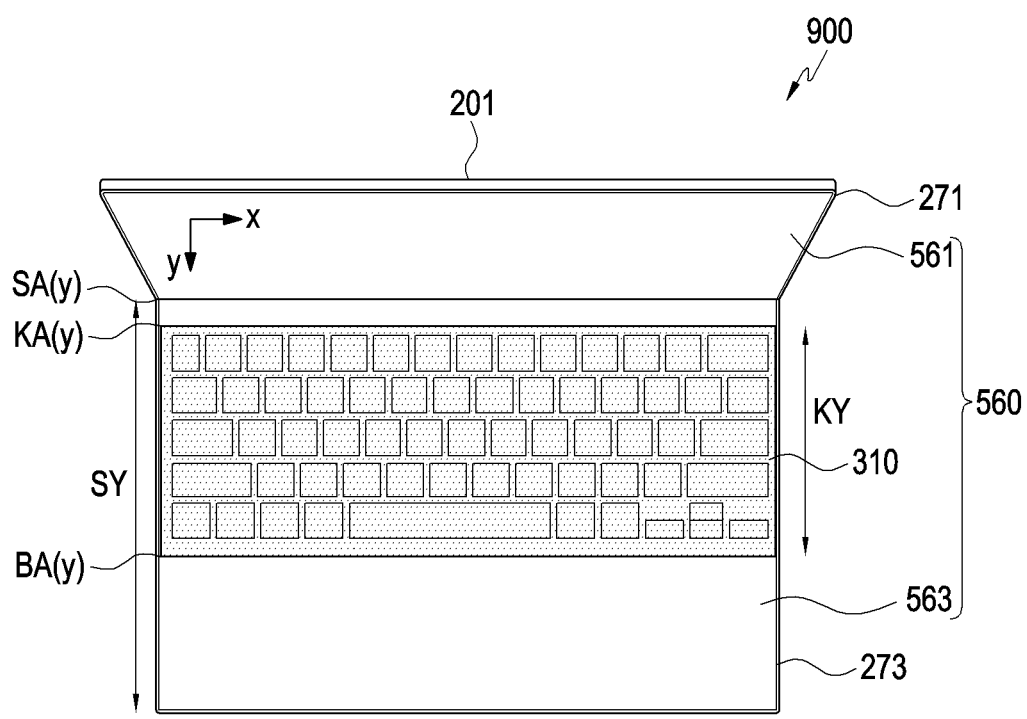
FIG. 9 illustrates an operation of detecting the position of an external accessory attached to a display of an electronic device according to an embodiment of the disclosure.

FIG. 9 is a diagram 900 illustrating an operation of detecting the position of an external accessory attached to a display of an electronic device according to an embodiment of the disclosure. FIG. 9 illustrates an external accessory as a keyboard cover (or a keyboard skin), but the same may be applied to other external accessories.

Referring to FIG. 9, in a state in which a hinge (e.g., the hinge 281 in FIG. 2A) of an electronic device (e.g., the electronic device 201 in FIGS. 2A to 2C, 3A to 3C, and 4A to 4D, and/or the electronic device 501 in FIG. 5) is folded, when a keyboard cover 310 for displaying a keyboard is attached to a second display area 563 (e.g., the second display area 263 in FIGS. 2A to 2C, 3A to 3C, and 4A to 4D), the electronic device may detect a position in the second display area 563 where the keyboard cover 310 is attached, and may determine size information and/or shape information of the keyboard cover 310 based on information of the keyboard cover 310 stored in memory (e.g., the memory 530 in FIG. 5).

When the electronic device 201 is placed on the floor in a fully folded state (folded status) in which the first housing 271 and the second housing 273 are in contact with each other, and then a transition to a state (folded status) in which the first housing 271 and the second housing 273 are folded with a certain angle or a certain distance therebetween is detected based on the sensor module of the electronic device 201, the electronic device 201 may divide the display 560 into an upper area and a lower area. When the second housing 273 is in contact with the floor, the electronic device 201 may configure the upper area as a first display area 561, may configure the lower area as a second display area 563, and when the external accessory (e.g., the keyboard cover 310) is attached to the second display area 263, may identify a top coordinate y-value SA(y) of the second display area and a y-direction size value SY of the second display area based on size information of the second display area 563 stored in the memory. The electronic device 201 may detect, in the memory, position information of the keyboard cover 310 attached to the second display area 563 and size information of the keyboard cover 310. When a capacitance pattern position is recognized based on a conductive material disposed inside the keyboard cover 310, the electronic device 201 may determine coordinates of the recognized position. The electronic device 201 may detect a top coordinate y-value KA(y) of the keyboard cover 310 attached to the second display area 563, a bottom coordinate y-value BA(y) of the keyboard cover 310 attached to the second display area 563, and a y-direction size value KY of the keyboard cover 310 by using the position information of the keyboard cover 310, the size information of the keyboard cover 310, and the coordinates of the recognized capacitance pattern position.

When the first condition (KA(y)−SA(y)<α) is satisfied based on Equation 1 which uses the top coordinate y-value SA(y) of the second display area, the y-direction size value SY of the second display area, the top coordinate y-value KA(y) of the keyboard cover 310 attached to the second display area 563, the bottom coordinate y-value BA(y) of the keyboard cover 310 attached to the second display area 563, the y-direction size value KY of the keyboard cover 310, and a threshold value a for recognizing a screen area to be displayed in the second display area, the electronic device 201 may identify that the keyboard cover 310 is placed and attached to the second display area 563 in a first state (e.g., the first state in FIG. 4A). The electronic device 201, in the first state (e.g., the first state in FIG. 4A), may determine, as a first screen area, an area below a first area, which is the remaining area in the second display area 563 other than the first area to which the keyboard cover 310 is attached, and may provide a function set (e.g., displaying a touchpad area) to the first screen area. When the second condition (KA(y)−SA(y)<(SY−KY)−α) is satisfied based on Equation 1, the electronic device may identify that the keyboard cover 310 is placed and attached to the second display area 563 in a second state (e.g., the second state in FIG. 4B) or a third state (e.g., the third state in FIG. 4C).

The electronic device 201 may distinguish the second state from the third state based on a length between the top coordinate y-value SA(y) of the second display area and the top coordinate y-value KA(y) of the keyboard cover 310 attached to the second display area 563. The electronic device may identify the second state when the length is equal to the vertical length of a second screen area (e.g., the second screen area 413 in FIG. 4B) in the second state, and may identify the third state when the length is equal to the vertical length of a fourth screen area (e.g., the fourth screen area 417 in FIG. 4C) in the third state.

In the second state, when in the second display area 563, an area located above a first area to which the keyboard cover 310 is attached and an area located below the first area are determined to be a second screen area and a third screen area, respectively, the electronic device 201 may provide a function set (e.g., displaying at least one function key of the keyboard) to the second screen area, and may provide a function set (e.g., displaying a touchpad area) to the third screen area.

In the third state, when in the second display area 563, an area located above a first area to which the keyboard cover 310 is attached and an area located below the first area are determined to be a fourth screen area and a fifth screen area, respectively, the electronic device 201 may provide a function set (e.g., displaying at least one preview screen corresponding to a recently used application) to the fourth screen area, and may provide a function set (e.g., displaying a touchpad area) to the fifth screen area. In the third state, the fourth screen area may be configured to include an area having a larger size than the second screen area in the second state, and the fifth screen area may be configured to include an area having a smaller size than the third screen area in the second state.

When the third condition (KA(y)−SA(y)>(SY−KY)−α) is satisfied based on Equation 1, the electronic device may identify that the keyboard cover 310 is placed and attached to the second display area 563 in a fourth state (e.g., the fourth state in FIG. 4D). In the fourth state, the electronic device 201 may configure, as a sixth screen area, an area located above a first area to which the keyboard cover 310 is attached in the second display area 563, and may provide a function set to the sixth screen area (e.g., displaying at least one of a preview screen corresponding to a recently used application, a preview screen corresponding to a frequently used application, or a function window related to a running application being displayed in the first display area 561).

Figure 10:
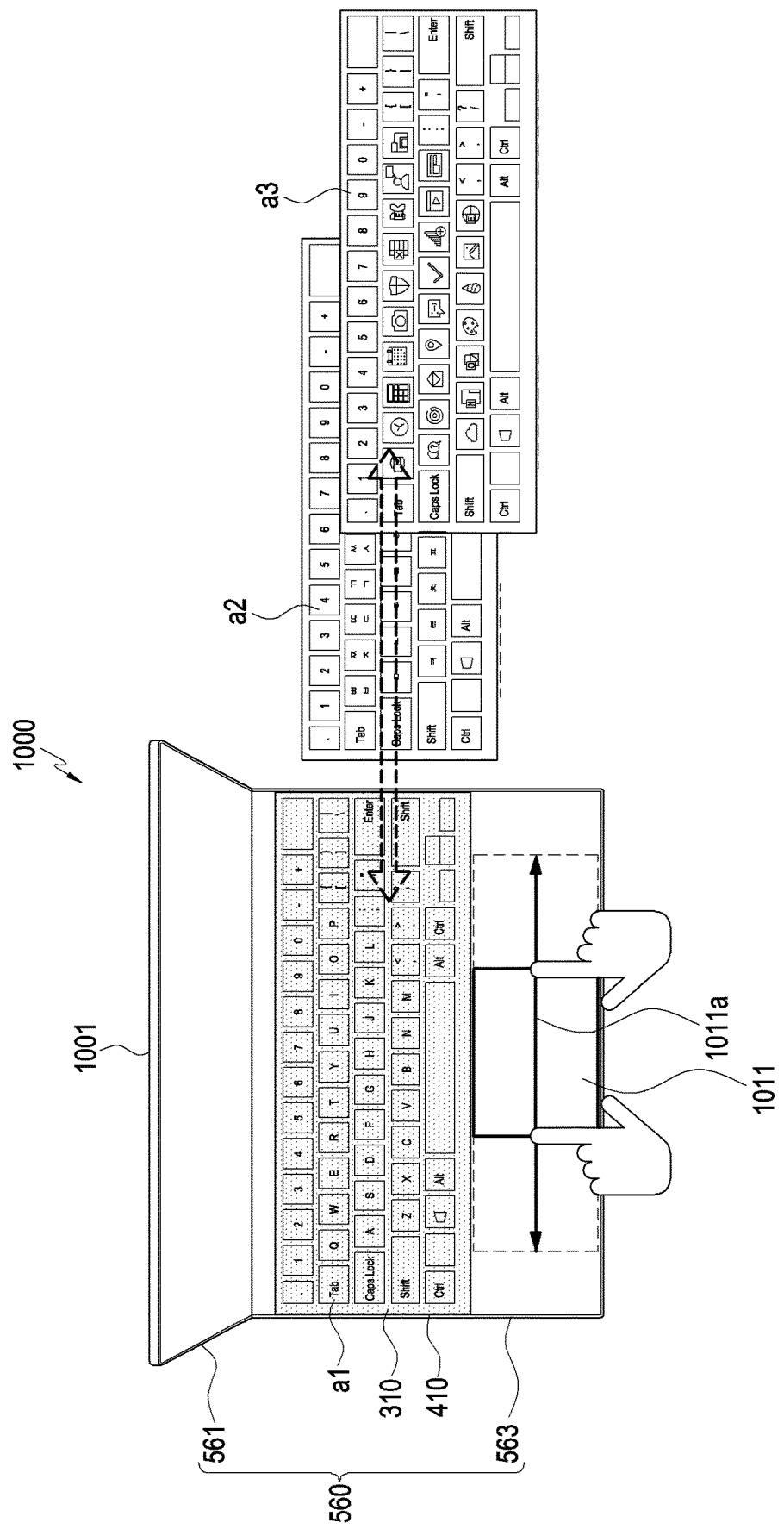
FIG. 10 illustrates a function provided to a screen area when an external accessory is placed in a first state on a display of an electronic device according to an embodiment of the disclosure.

FIG. 10 is a diagram 1000 illustrating a function provided to a screen area when an external accessory is placed in a first state on a display of an electronic device according to an embodiment of the disclosure. FIG. 10 illustrates an external accessory as a keyboard cover (or a keyboard skin), but the same may be applied to other external accessories.

Referring to FIG. 10, in a state in which a hinge (e.g., the hinge 281 in FIG. 2A) of an electronic device 1001 (e.g., the electronic device 201 in FIGS. 2A to 2C, 3A to 3C, and 4A to 4D, and/or the electronic device 501 in FIG. 5) is folded, when a keyboard cover 310 for displaying a keyboard is attached to a second display area 563 (e.g., the second display area 263 in FIGS. 2A to 2C, 3A to 3C, and 4A to 4D) in a first state (e.g., the first state in FIG. 4A), the electronic device 1001 may provide, as a GUI, a touchpad area 1011 for providing a touchpad function to a first screen area 411, which is the remaining area of the second display area 563 other than an area to which the keyboard cover 310 is attached. When a side-to-side dragging motion 1011a is detected at a left or right boundary of the touchpad area 1011, the electronic device 1001 may adjust the size of the touchpad area 1011 in response to the side-to-side dragging motion 1011a. The electronic device 1001 may configure a palm rejection with respect to the remaining area of the first screen area 411 other than the touchpad area 1011 function so that no touch is detected.

While a keyboard is displayed in a first area 410 of the second display area 563, to which the keyboard cover 310 is attached in the first state, the electronic device 1001 may change text on the keyboard based on a user selection (e.g., selection of a specific key in the keyboard). The electronic device 1001 may, for example, change English text a1 on the keyboard to Korean text a2, and may display, on the keyboard, a designated icon or emoticon along with the Korean text. The electronic device 1001 may, for example, change the English text a1 or Korean text a2 on the keyboard to special character text a3, and may display, on the keyboard, a designated icon or emoticon along with the special character text.

FIGS. 11A, 11B, 11C, and 11D are diagrams 1100a, 1100b, 1100c, and 1100d each illustrating a function provided to a screen area when an external accessory is placed in a second state on a display of an electronic device according to various embodiments of the disclosure. FIGS. 11A to 11D illustrate an external accessory as a keyboard cover (or a keyboard skin), but the same may be applied to other external accessories.

Figure 11A:
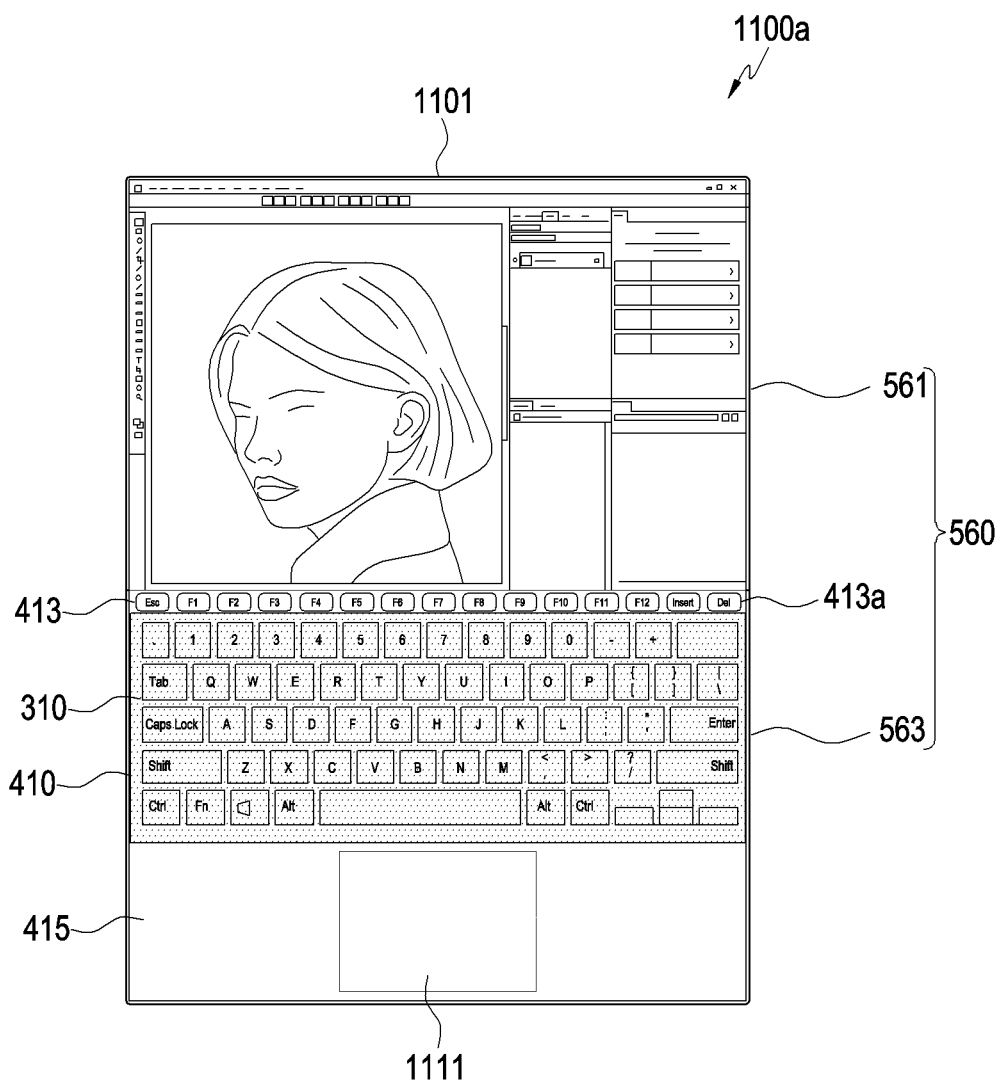
FIGS. 11A, 11B, 11C, and 11D illustrate a function provided to a screen area when an external accessory is placed in a second state on a display of an electronic device according to various embodiments of the disclosure.

Referring to FIG. 11A, in a state in which a hinge (e.g., the hinge 281 in FIG. 2A) of an electronic device 1101 (e.g., the electronic device 201 in FIGS. 2A to 2C, 3A to 3C, and 4A to 4D, and/or the electronic device 501 in FIG. 5) is folded, when a keyboard cover 310 for displaying a keyboard is attached to a second display area 563 (e.g., the second display area 263 in FIGS. 2A to 2C, 3A to 3C, and 4A to 4D) in a second state (e.g., the second state in FIG. 4B), the electronic device 1101 may display a first function key 413a (e.g., an Fn key) of the keyboard in a second screen area 413, and may provide a touchpad area 1111 for providing a touchpad function to the third screen area 415. The electronic device 1101 may display, in the second screen area 413, not only the first function key 413a (e.g., the Fn key) but also a function related to an application running in a first display area 561 or other functions unrelated to an application running in the first display area 561. The electronic device 1101 may display a keyboard in an area of the second display area 563 where the keyboard cover 310 is placed. When the remaining area of the second display area 563, other than the area in which the keyboard cover 310 is placed, is configured as a third screen area 415, the electronic device 1101 may adjust and display the touchpad area 1111 so as to correspond to the third screen area.

Figure 11B:
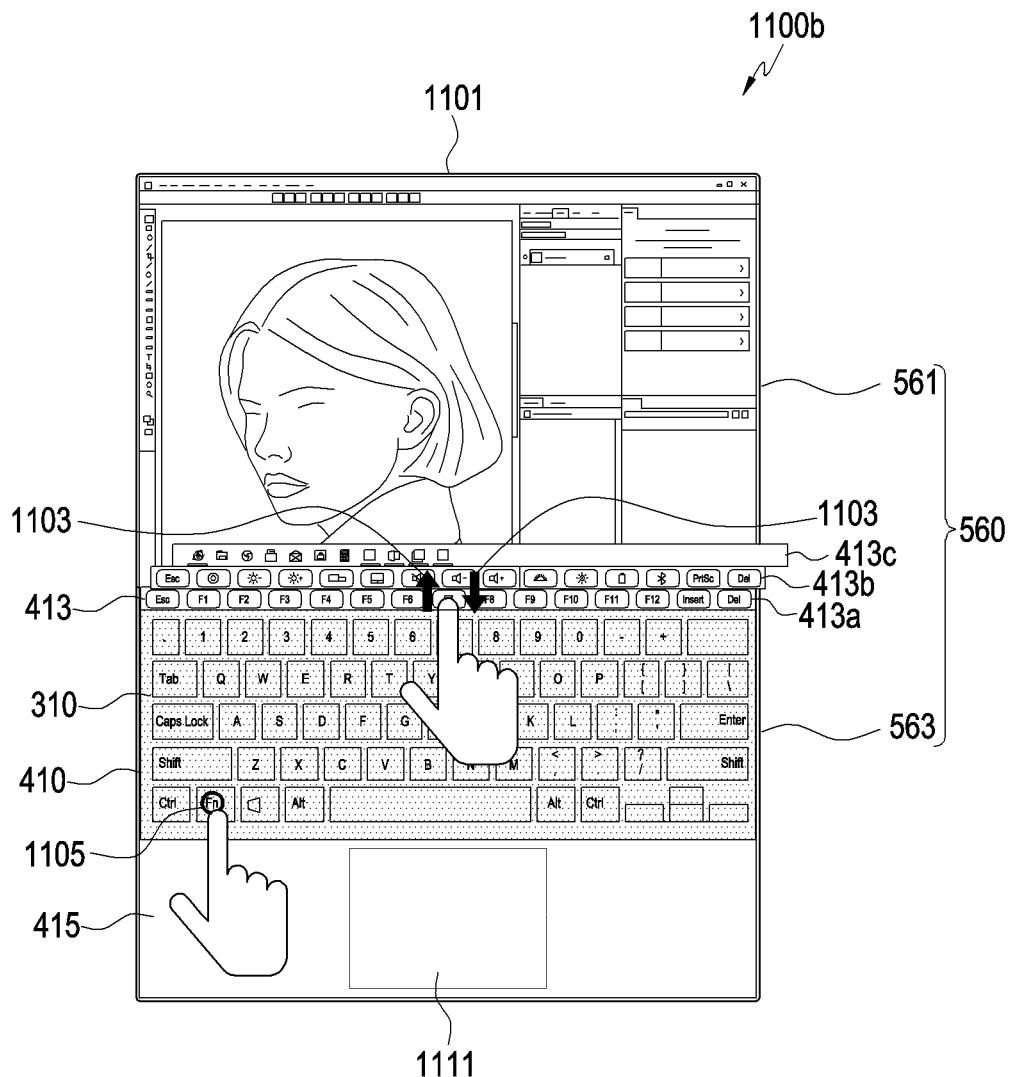

Referring to FIG. 11B, when an up-and-down scrolling motion 1103 or a specific key input 1105 is detected in the second screen area 413 while the first function key 413a of the keyboard is displayed in the second screen area 413 as illustrated in FIG. 11A, the electronic device 1101 may change the type of function key displayed in the second screen area 413, based on the detection of the up-and-down scrolling motion 1103 or the specific key input 1105. For example, the electronic device 1101 may display a second function key 413b of the keyboard or a third function key 413c of the keyboard in the second screen area 413 instead of the first function key 413a of the keyboard, based on the up-and-down scrolling motion 1103 or the specific key input 1105.

Figure 11C:
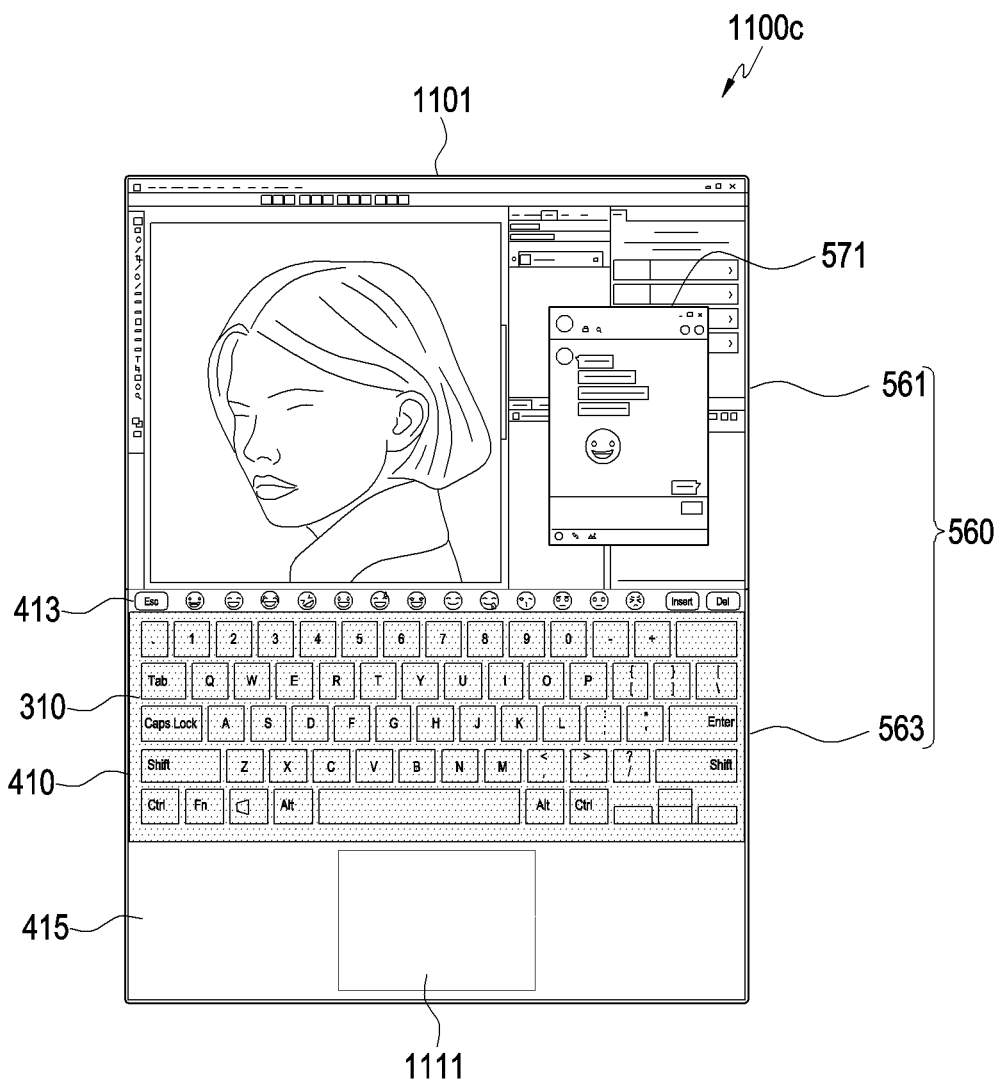

Referring to FIG. 11C, in a state in which the hinge (e.g., the hinge 281 in FIG. 2A) of the electronic device 1101 is folded, when a keyboard cover 310 for displaying the keyboard is attached to the second display area 563 (e.g., the second display area 263 in FIGS. 2A to 4D) in a second state (e.g., the second state in FIG. 4B), and when a running application (e.g., a messenger application) is displayed in a certain area 571 of the first display area 561, the electronic device 1101 may display, in the second screen area 413, a function key for performing an operation related to the application (e.g., the messenger application) being displayed in the first display area 561 (e.g., a function key for selecting an emoticon), and may provide the touchpad area 1111 for providing a touchpad function to the third screen area 415.

Figure 11D:
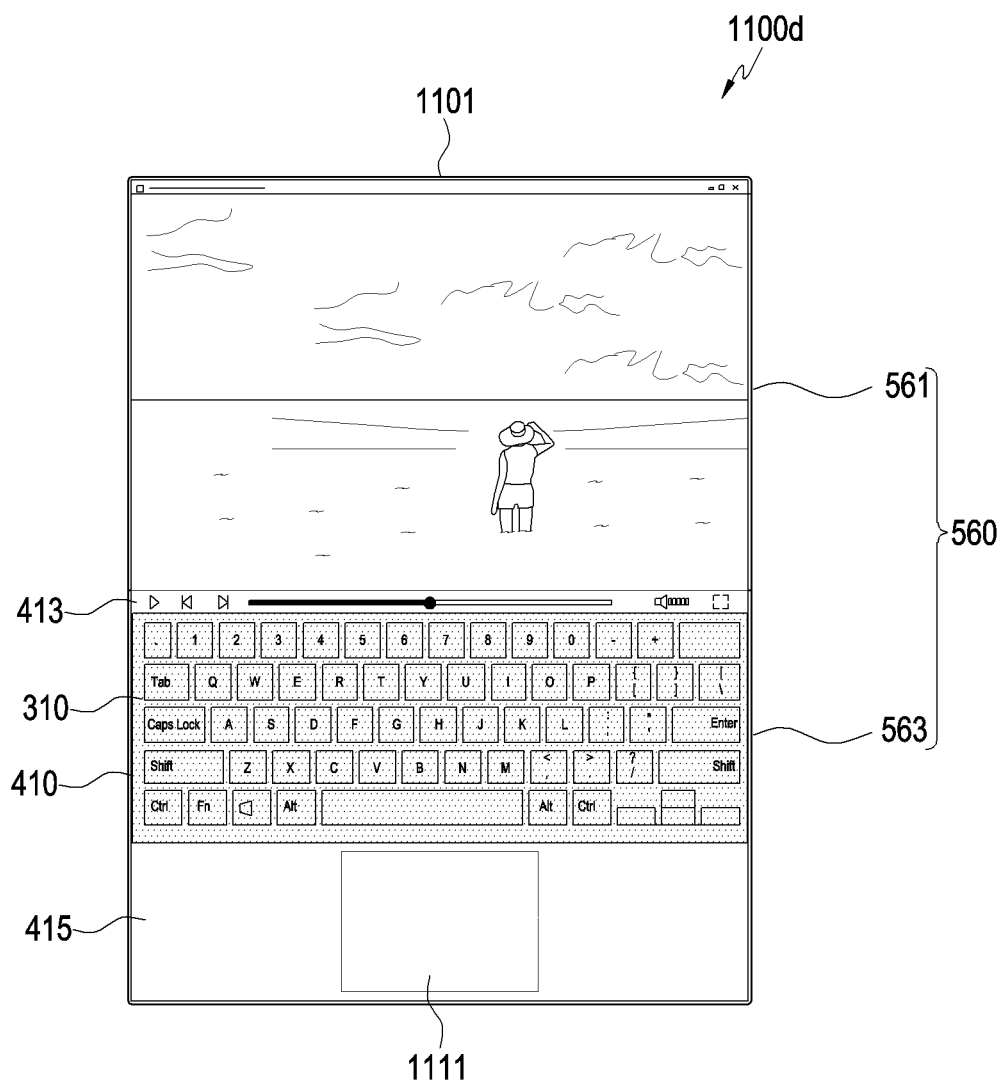

Referring to FIG. 11D, in a state in which the hinge (e.g., the hinge 281 in FIG. 2A) of the electronic device 1101 is folded, when the keyboard cover 310 for displaying a keyboard is attached to the second display area 563 (e.g., the second display area 263 in FIGS. 2A to 2C, 3A to 3C, and 4A to 4D) in a second state (e.g., the second state in FIG. 4B), and when a video being played is displayed in the first display area 561, the electronic device 1101 may display, in the second screen area 413, a function key for performing an operation related to the video being displayed in the first display area 561 (e.g., a function key for controlling the video), and may provide the touchpad area 1111 for providing a touchpad function to the third screen area 415.

Figure 12A:
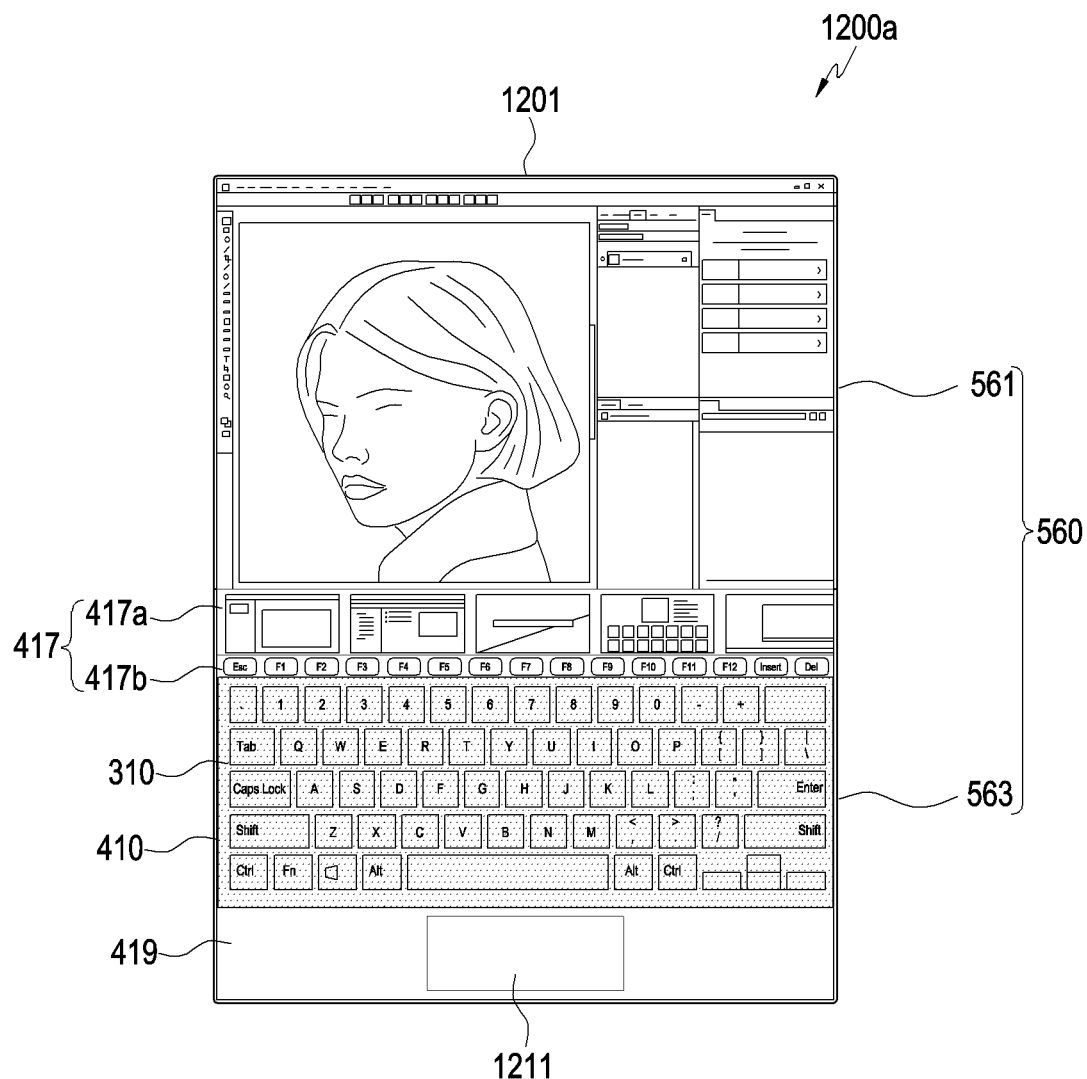
FIGS. 12A and 12B illustrate a function provided to a screen area when an external accessory is placed in a third state on a display of an electronic device according to various embodiments of the disclosure.
Figure 12B:
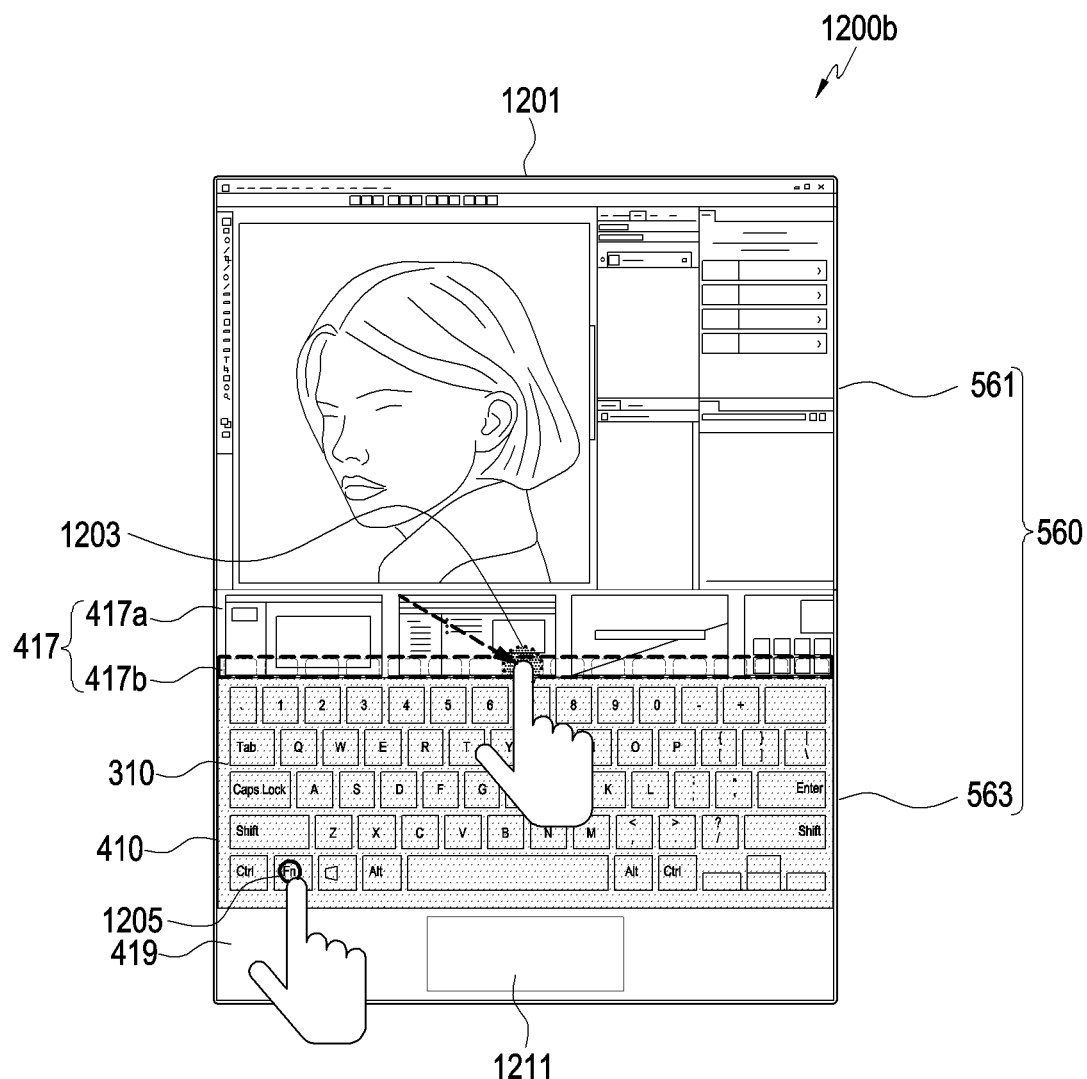

FIGS. 12A and 12B are diagrams 1200a to 1200b illustrating a function provided to a screen area when an external accessory is placed in a third state on a display of an electronic device according to various embodiments of the disclosure. FIGS. 12A and 12B illustrate an external accessory as a keyboard cover (or a keyboard skin), but the same may be applied to other external accessories.

Referring to FIG. 12A, an electronic device 1201 (e.g., the electronic device 201 in FIGS. 2A to 2C, 3A to 3C, and 4A to 4D, and/or the electronic device 501 in FIG. 5), when a keyboard cover 310 for displaying a keyboard is attached to a second display area 563 (e.g., the second display area 263 in FIGS. 2A to 2C, 3A to 3C, and 4A to 4D) in a third state (e.g., the third state in FIG. 4C) while a hinge (e.g., the hinge 281 in FIG. 2A) of the electronic device 1201 is folded, may display multiple preview screens corresponding to recently used applications in a first subarea 417a of a fourth screen area 417 that is larger than the second screen area 413 in the second state (e.g., the second state in FIG. 4B) of the keyboard cover, may display a function key (e.g., an Fn key) of the keyboard in a second subarea 417b, and may provide a touchpad area 1211 for providing a touchpad function to a fifth screen area 419.

Referring to FIG. 12B, in a state in which, as illustrated in FIG. 12A, multiple preview screens corresponding to recently used applications are displayed in the first subarea 417a of the fourth screen area 417 and a function key (e.g., an Fn key) of a keyboard is displayed in the second subarea 417b, when a swipe-out motion 1203 is detected while the function key (e.g., the Fn key) of the keyboard displayed in the second subarea 417b is clicked, or while a specific key 1205 (e.g., an Fn key) is input, the electronic device 1201 may remove the display of the function key that was displayed in the second subarea 417b of the fourth screen area 417, and may enlarge and display the multiple preview screens corresponding to the recently used applications in the fourth screen area 417 in which the first subarea 417a and the second subarea 417b is integrated into one area.

In a state in which the multiple preview screens corresponding to the recently used applications are enlarged and displayed in the fourth screen area 417 which integrates the first subarea 417a and the second subarea 417b into one area, when a swipe-up motion is detected at the bottom of the fourth screen area 417, or when an input of the specific key (e.g., the Fn key) 1205 is detected, the electronic device 1201 may reduce and display the multiple preview screens corresponding to the recently used applications in the first subarea 417a of the fourth screen area 417, as illustrated in FIG. 12A, and may re-display the function key (e.g., the Fn key) of the keyboard in the second subarea 417b.

FIGS. 13A, 13B, 13C, 13D, 13E, 13F, 13G, 13H, 13I, and 13J are diagrams 1300a to 1300j illustrating a function provided to a screen area when an external accessory is placed in a fourth state on a display of an electronic device according to various embodiments of the disclosure. FIGS. 13A to 13J illustrate an external accessory as a keyboard cover (or a keyboard skin), but the same may be applied to other external accessories.

Figure 13A:
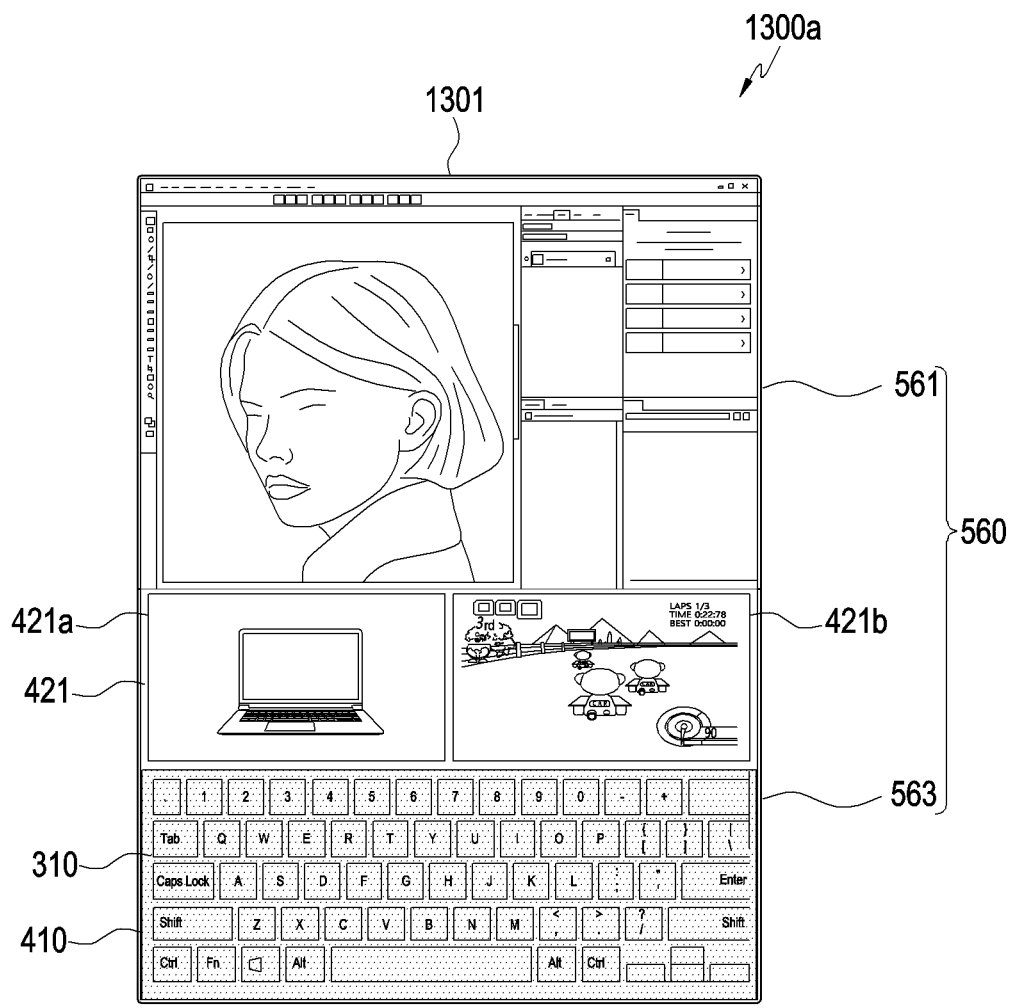
FIGS. 13A, 13B, 13C, 13D, 13E, 13F, 13G, 13H, 13I, and 13J illustrate a function provided to a screen area when an external accessory is placed in a fourth state on a display of an electronic device according to various embodiments of the disclosure.

Referring to FIG. 13A, an electronic device 1301 (e.g., the electronic device 201 in FIGS. 2A to 2C, 3A to 3C, and 4A to 4D and/or the electronic device 501 in FIG. 5), when a keyboard cover 310 for displaying a keyboard is attached to a second display area 563 (e.g., the second display area 263 in FIGS. 2A to 2C, 3A to 3C, and 4A to 4D) in a fourth state (e.g., the fourth state in FIG. 4D) while a hinge (e.g., the hinge 281 in FIG. 2A) of the electronic device 1301 is folded, may enlarge and display multiple preview screens corresponding to recently used applications in each of multiple subareas 421a and 421b included in a sixth screen area 421 that is larger than the second screen area 413 in the second state (e.g., the second state in FIG. 4B) of the keyboard cover or the fourth screen area 417 in the third state (e.g., the third state in FIG. 4C) of the keyboard cover. When the keyboard cover 310 for displaying the keyboard is attached to on the second display area 563 in the fourth state (e.g., the fourth state in FIG. 4D), the electronic device 1301 does not display the touchpad area that was displayed in the third screen area 415 in the second state (e.g., the second state in FIG. 4B) of the keyboard cover or the fifth screen area 419 in the third state cover (e.g., the third state in FIG. 4C) of the keyboard.

When a preview screen displayed in any one of the multiple subareas 421a, 421b is selected while the multiple preview screens corresponding to recently used applications are displayed in each of the multiple subareas 421a and 421b included in the sixth screen area 421, the electronic device 1301 may execute an application corresponding to the selected preview screen and display the application in a first display area 561.

Figure 13B:
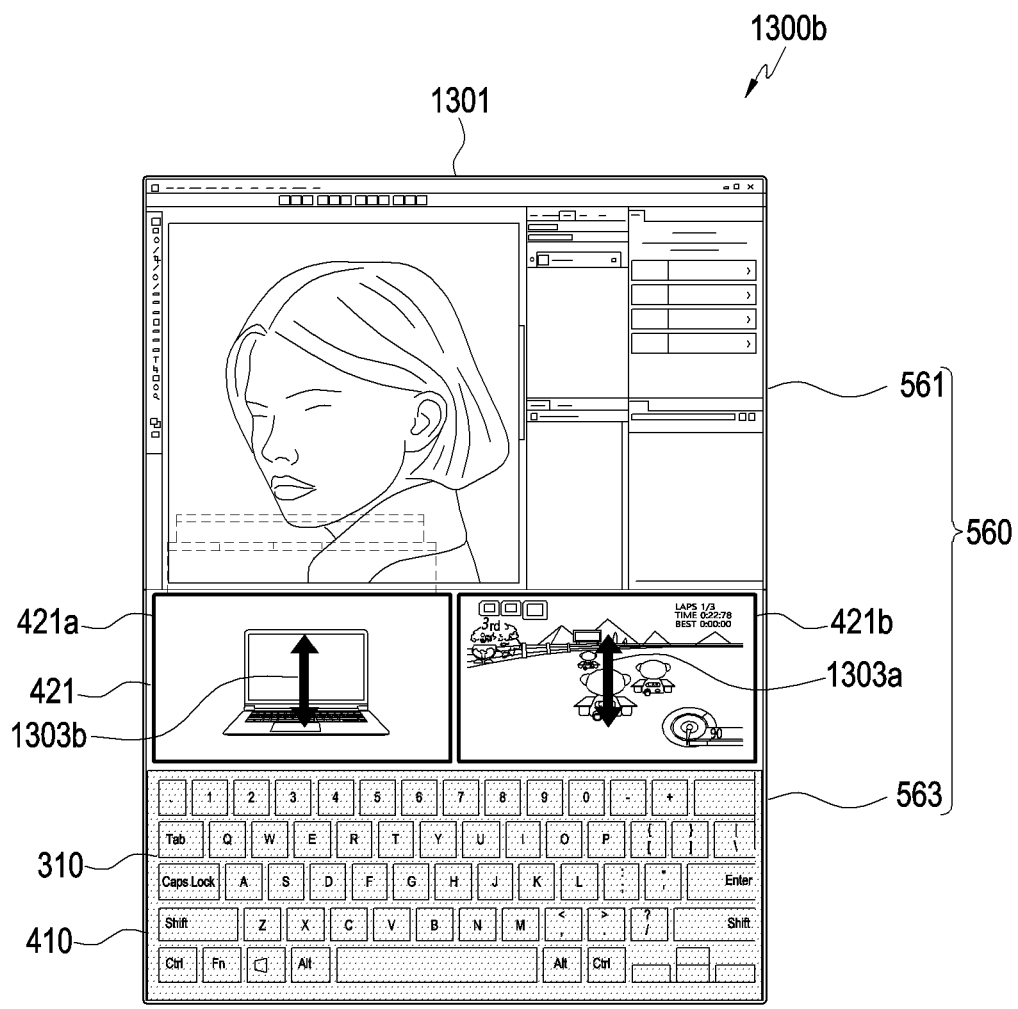

Referring to FIG. 13B, in a state in which multiple preview screens corresponding to recently used applications are displayed in each of multiple subareas 421a and 421b included in a sixth screen area 421 as illustrated in FIG. 13A, when an up-and-down scrolling motion 1303a or 1303b is detected in one subarea 421a or 421b of the multiple subareas 421a and 421b, the electronic device 1301 may, in response to the up-and-down scrolling motion, sequentially display other preview screens that are not displayed in the subarea 421a or 421b in which the up-and-down scrolling motion was detected, and may display the other preview screens in one subarea 421a or 421b of the multiple subareas 421a and 421b.

Figure 13C:
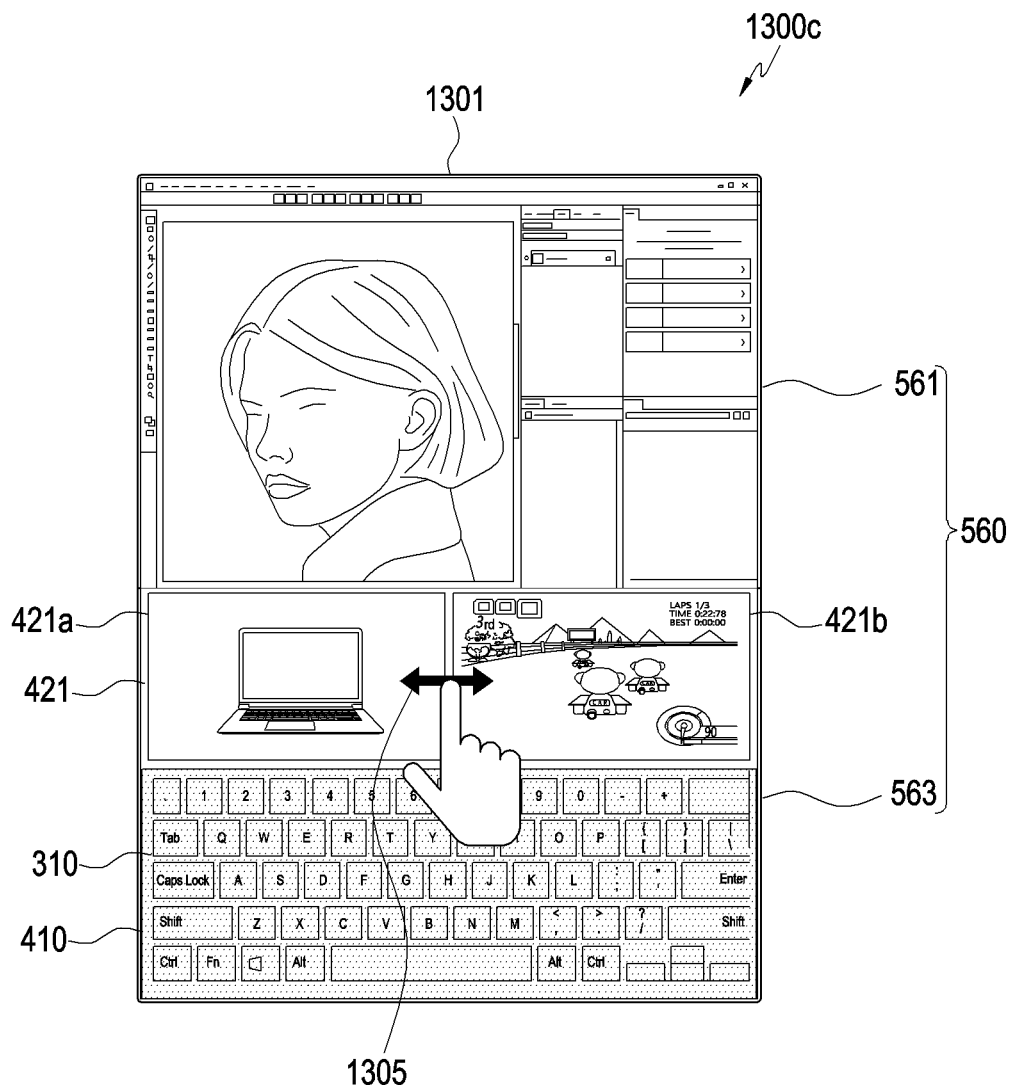

Referring to FIG. 13C, while multiple preview screens corresponding to recently used applications are displayed in each of multiple subareas 421a and 421b included in a sixth screen area 421 as illustrated in FIG. 13A, the electronic device 1301 may detect a side-to-side scrolling motion at a boundary of the subarea 421a and the second subarea 421b, and change the size of the first subarea 421a and the second subarea 421b in response to the side-to-side scrolling motion.

Figure 13D:
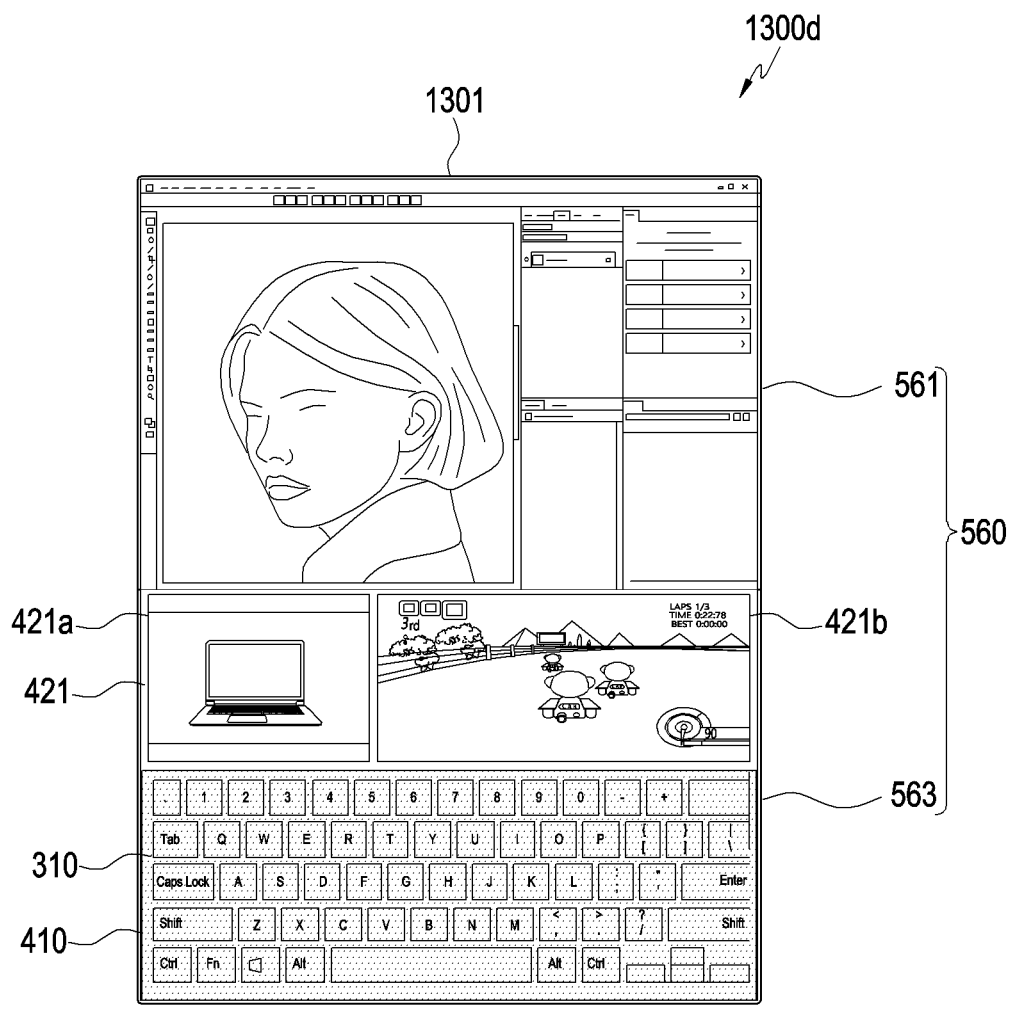

Referring to FIG. 13D, the electronic device 1301 may detect a left scrolling motion at a boundary between a first subarea 421a and a second subarea 421b, as illustrated in FIG. 13C, and may determine an expansion of the size of the second subarea 421b based on the left scrolling motion. The electronic device 1301 may reduce the size of the first subarea 421a and expand the size of the second subarea 421b in response to the left scrolling motion, thereby displaying a preview screen corresponding to each of the reduced-size first subarea 421a and the expanded-size second subarea 421b.

Figure 13E:
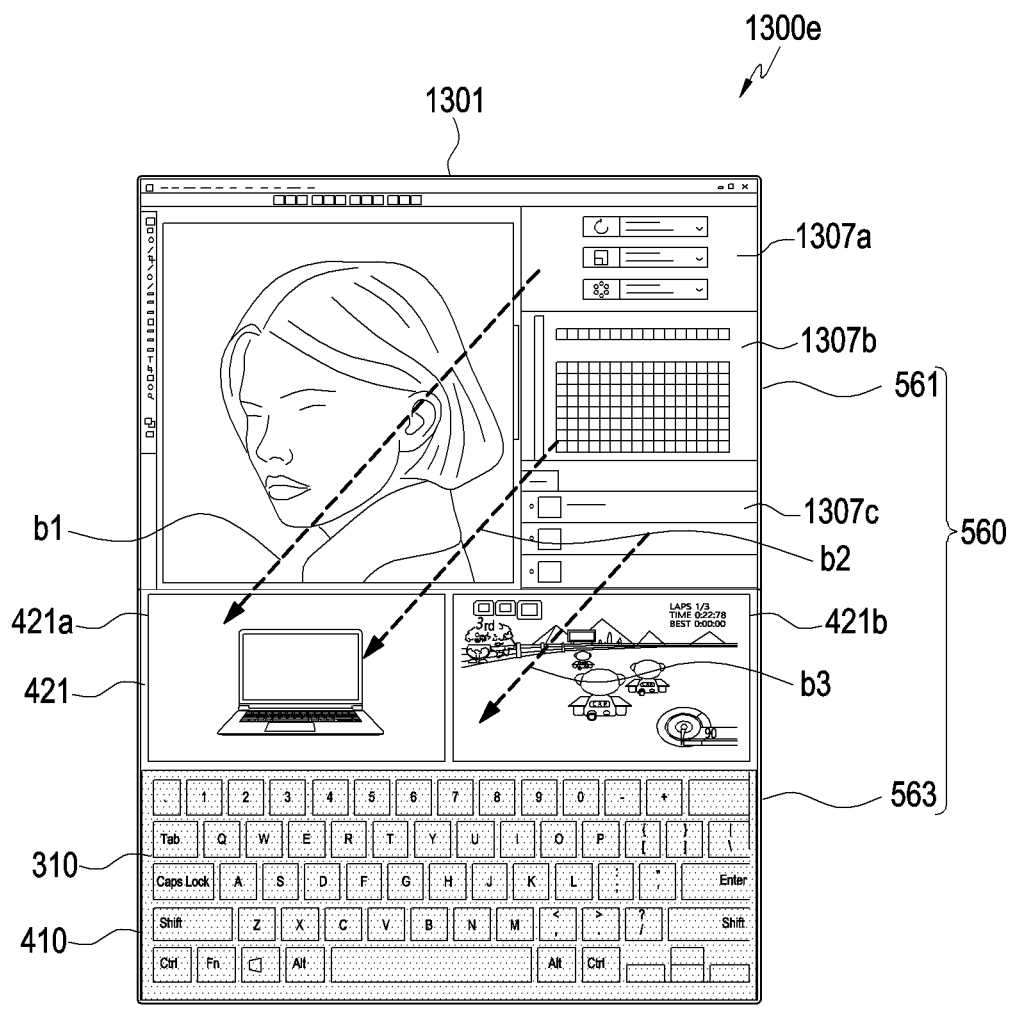
Figure 13F:
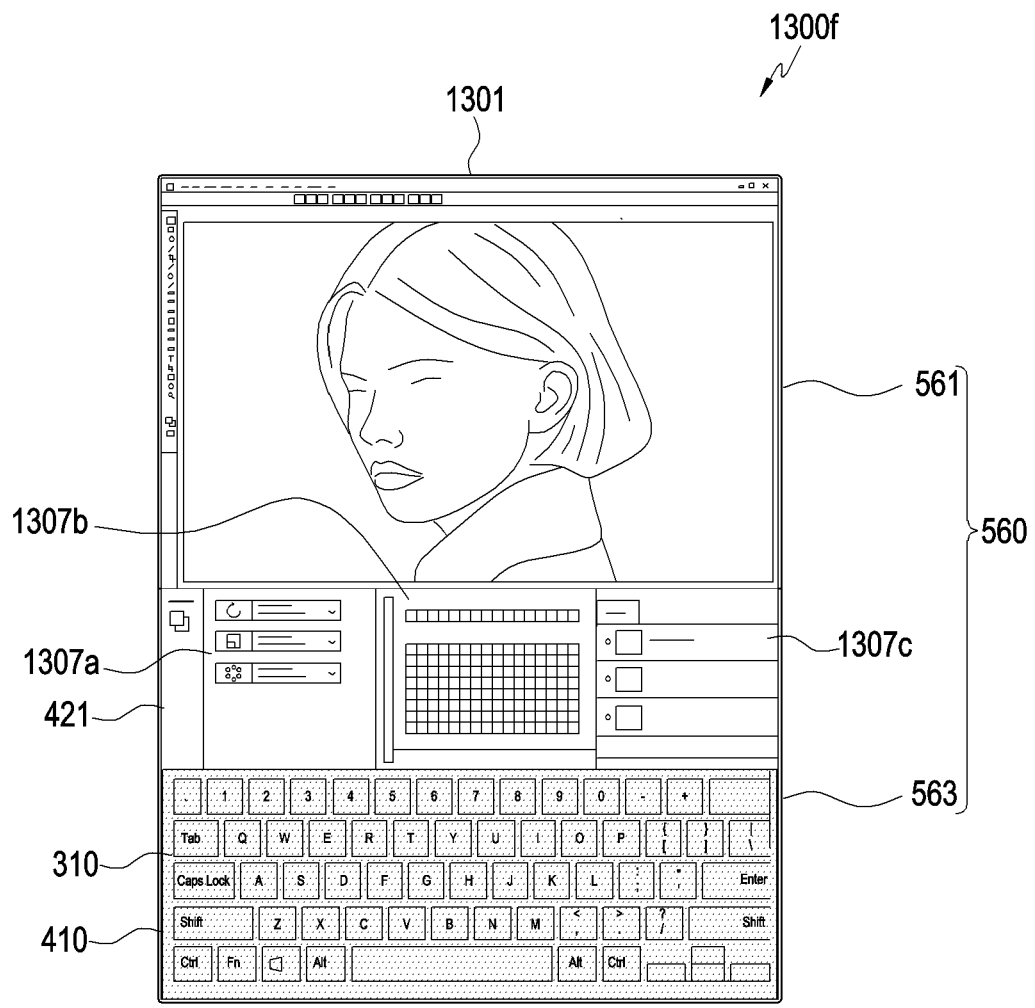

Referring to FIGS. 13E and 13F, as illustrated in FIG. 13E, an electronic device 1301 (e.g., the electronic device 201 in FIGS. 2A to 2C, 3A to 3C, and 4A to 4D, and/or the electronic device 501 in FIG. 5) may display multiple preview screens corresponding to recently used applications in each of multiple subareas included in a sixth screen area 421 when a keyboard cover 310 for displaying a keyboard is attached to a second display area 563 (e.g., the second display area 263 in FIGS. 2A to 2C, 3A to 3C, and 4A to 4D) in a fourth state (e.g., the fourth state in FIG. 4D) while a hinge (e.g., the hinge 281 in FIG. 2A) of the electronic device 1301 is folded. As illustrated in FIG. 13E, when the electronic device 1301 detects dragging motion B1, B2, and B3 that respectively move multiple function windows 1307A, 1307B, and 1307C displayed in partial areas in the first display area 561 to the sixth screen area 421, the electronic device 1301 may divide the sixth screen area 421 into multiple subareas for displaying the multiple function windows, and display the multiple subareas as the multiple function windows 1307a, 1307b, and 1307c in the sixth screen area 421.

Figure 13G:
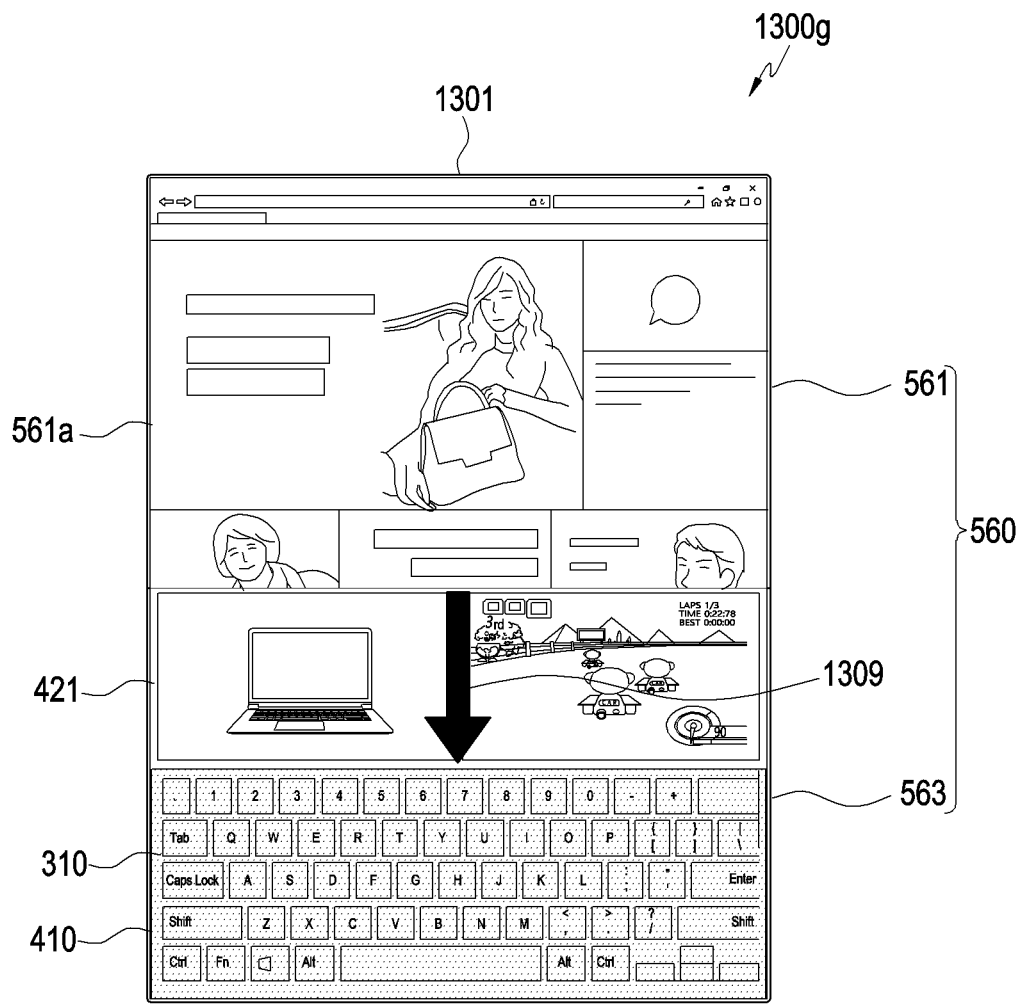
Figure 13H:
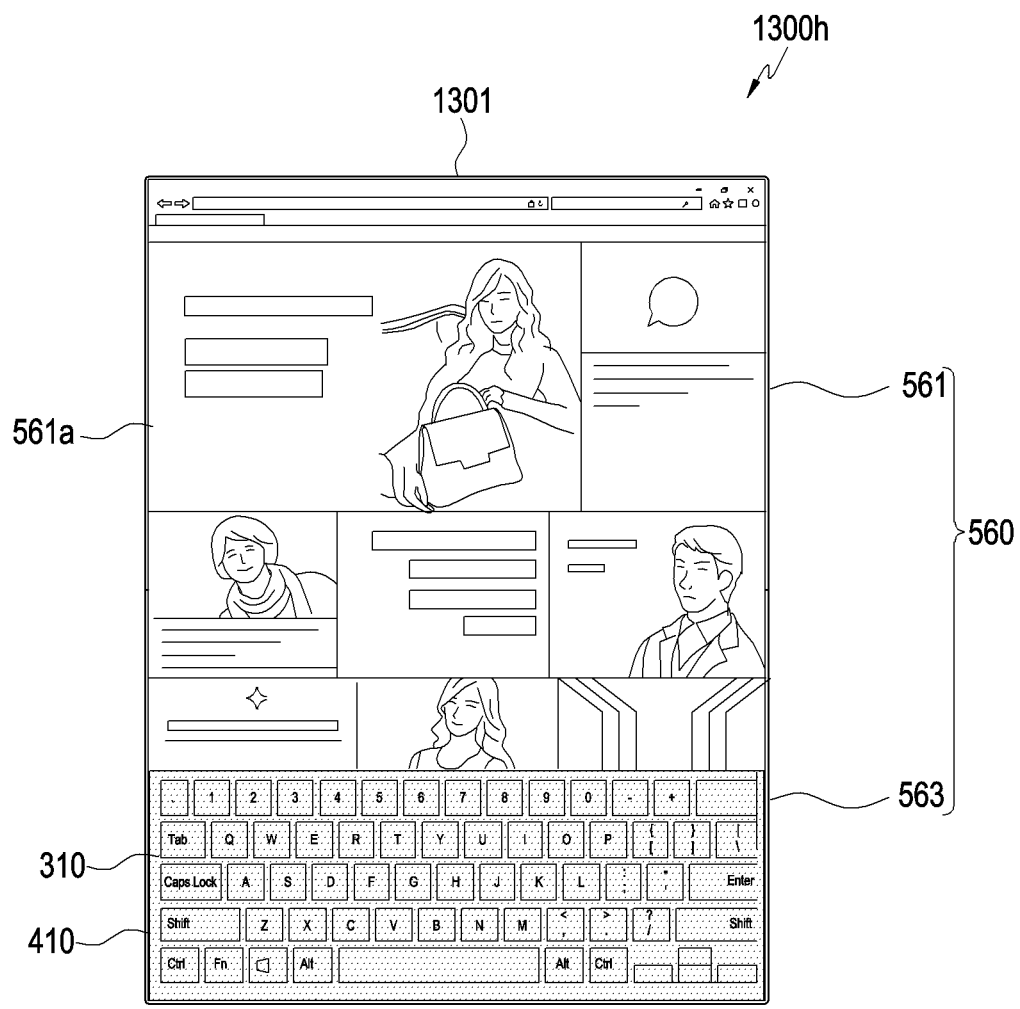

Referring to FIGS. 13G and 13H, as illustrated in FIG. 13G, an electronic device 1301 (e.g., the electronic device 201 in FIGS. 2A to 2C, 3A to 3C, and 4A to 4D, and/or the electronic device 501 in FIG. 5) may display multiple preview screens corresponding to recently used applications in each of multiple subareas included in a sixth screen area 421 when a keyboard cover 310 for displaying a keyboard is attached to a second display area 563 (e.g., the second display area 263 in FIGS. 2A to 2C, 3A to 3C, and 4A to 4D) in a fourth state (e.g., the fourth state in FIG. 4D) while a hinge (e.g., the hinge 281 in FIG. 2A) of the electronic device 1301 is folded. The electronic device 1301 may display multiple preview screens corresponding to recently used applications in each of multiple subareas included in a sixth screen area 421 when a keyboard cover 310 for displaying a keyboard is attached to a second display area 563 in a fourth state (e.g., the fourth state in FIG. 4D) while a hinge (e.g., the hinge 281 in FIG. 2A) of the electronic device 1301 is unfolded. When a downward dragging motion 1309 is detected at the boundary of the first display area 561 and the second display area 563 while an image screen 561a is displayed in the first display area 561, the electronic device may extend and display the image screen 561a to the sixth screen area 421 of the second display area 563, as illustrated in FIG. 13H.

Figure 13I:
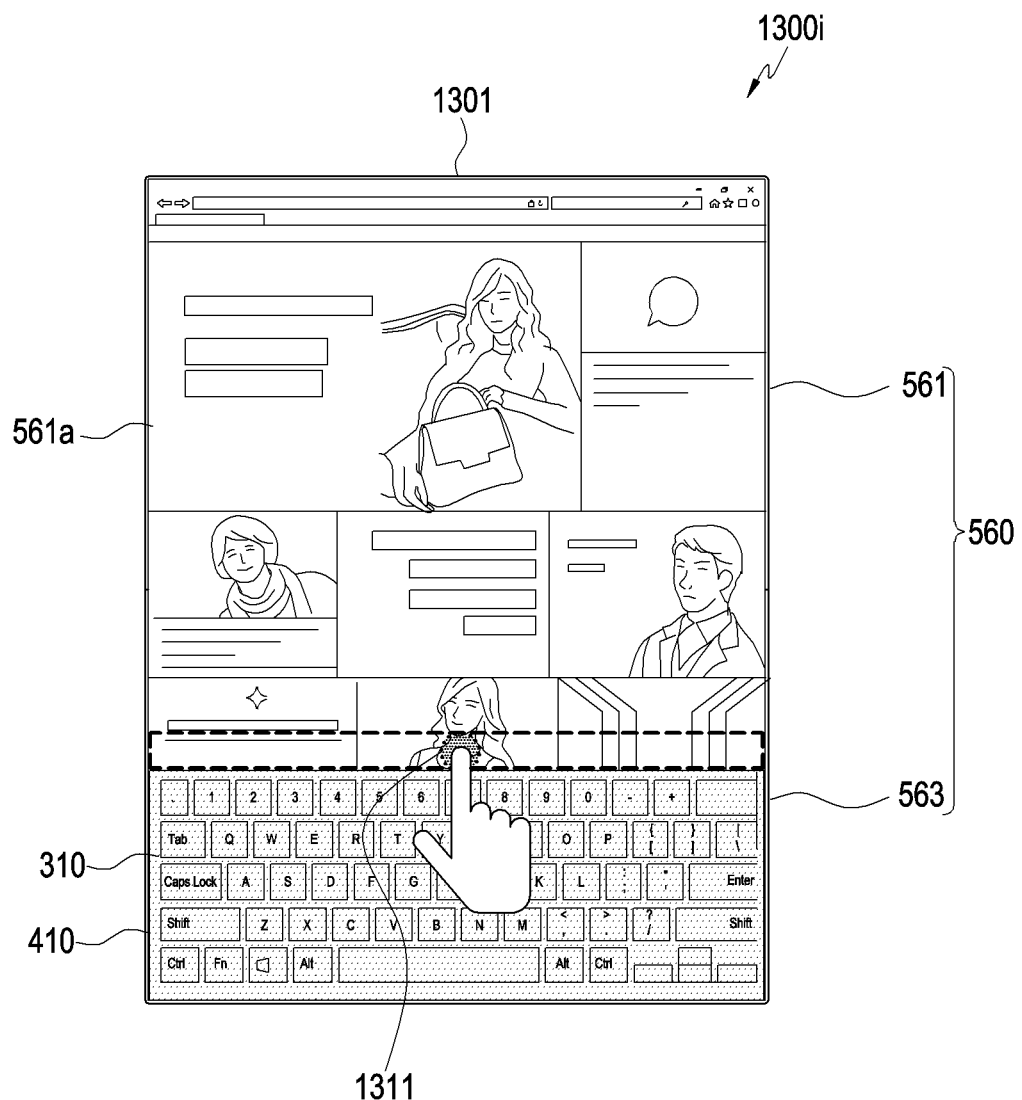
Figure 13J:
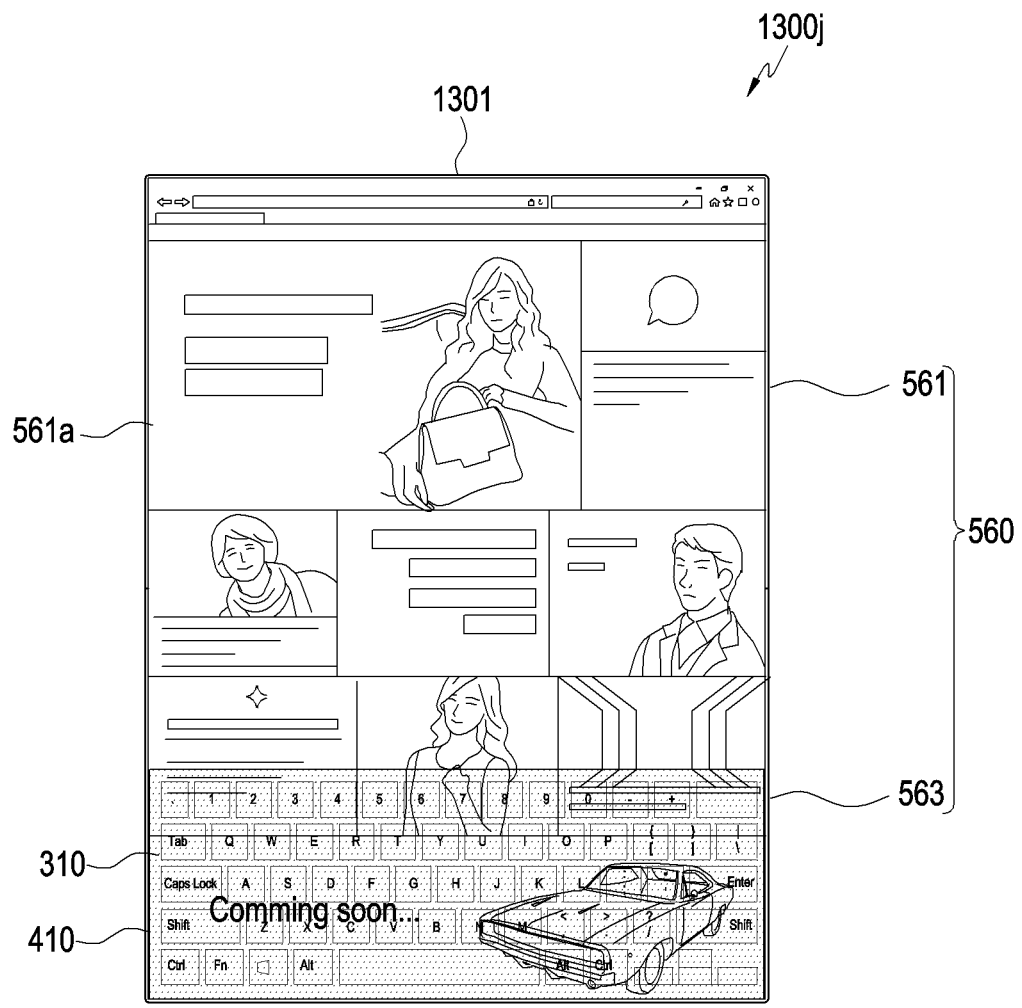

Referring to FIGS. 13I and 13J, when a long touch 1311 is detected at the boundary between the image screen 561a and a first area 410 of the first display area 561, in which a keyboard is displayed, while the image screen 561a is displayed including the first display area 561 and the sixth screen area 421 of the second display area 563 as illustrated in FIG. 13I, the electronic device 1301 may display the image screen 561a throughout the first display area 561 and the second display area 563 as illustrated in FIG. 13J. The electronic device 1301 may adjust the transparency of the first area 410 of the second display area 563 to display the keyboard, thereby overlapping and displaying the keyboard and a portion of the image screen 561a.

Figure 14:
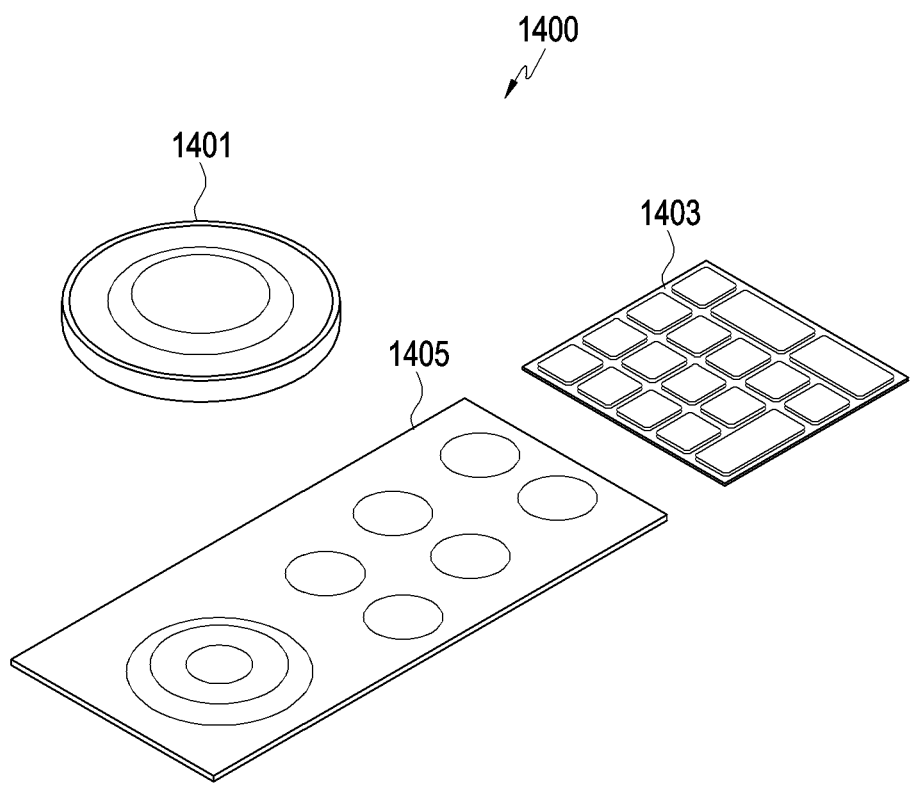
FIG. 14 illustrates types of external accessories to be attached to a display of an electronic device according to an embodiment of the disclosure.

FIG. 14 is a diagram 1400 illustrating types of external accessories to be attached to a display of an electronic device according to an embodiment of the disclosure.

Referring to FIG. 14, external accessories for displaying a user interface may include a various types of external accessories depending on the purpose of use, and may include, for example, in addition to a keyboard cover (or a keyboard skin) (e.g., the keyboard cover 310 in FIGS. 11A to 11D, 12A, 12B, and 13A to 13J) for displaying a keyboard, a dial cover (or a dial skin) 1401 for displaying a dial, a calculator cover (or a calculator skin) 1403 for displaying a calculator, and a gamepad cover (or a gamepad skin) 1405 for displaying a gamepad.

Figure 15A:
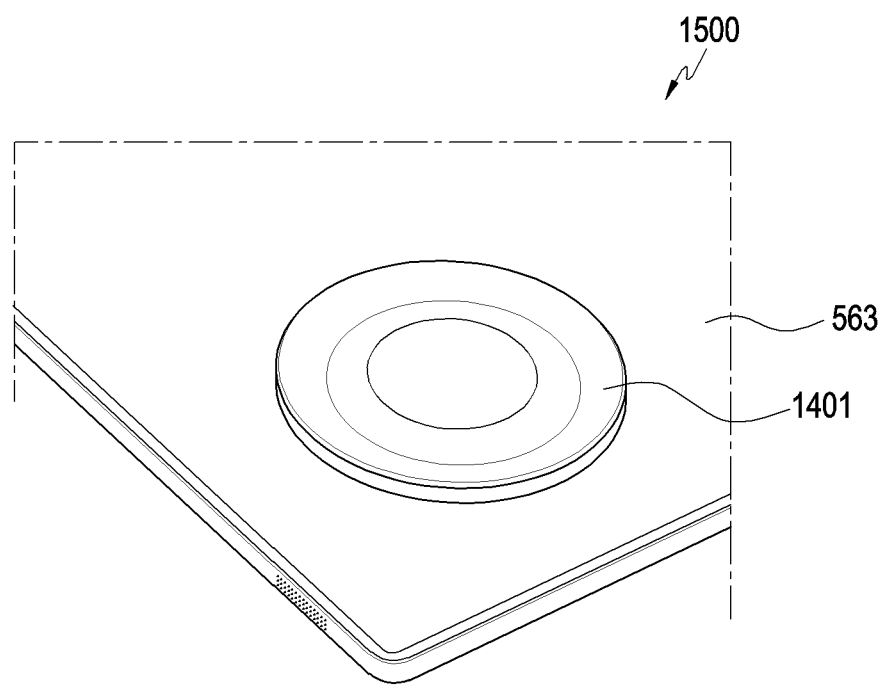
FIGS. 15A and 15B illustrate an operation of an external accessory attached to a display of an electronic device according to an embodiment of the disclosure.
Figure 15B:
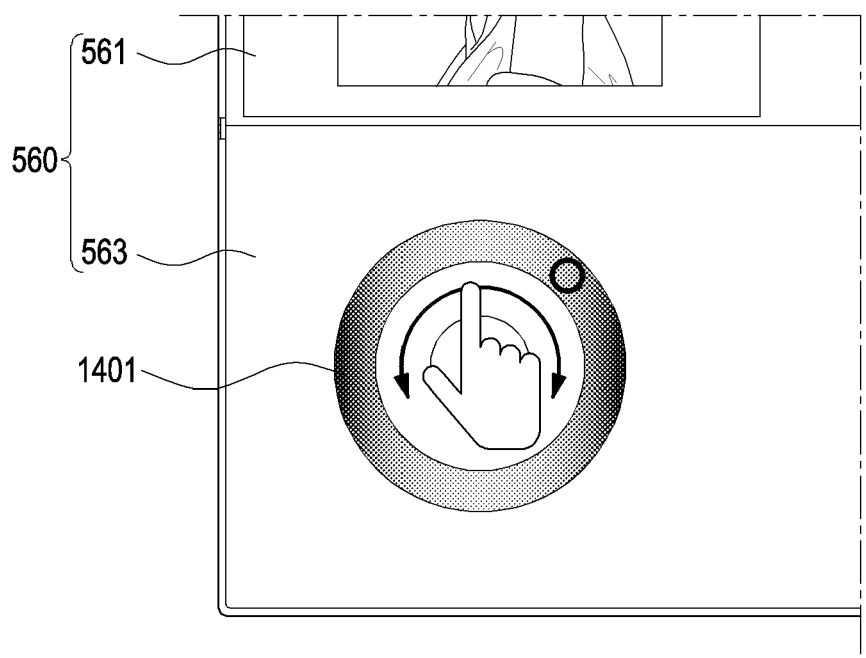

FIGS. 15A and 15B include a diagram 1500 illustrating an operation of an external accessory attached to a display of an electronic device according to an embodiment of the disclosure.

Referring to FIG. 15A, an electronic device (e.g., the electronic device 201 in FIGS. 2A to 2C, 3A to 3C, and 4A to 4D and/or the electronic device 501 in FIG. 5) may detect the attachment of a dial cover 1401, as an external accessory for displaying a user interface, to a second display area 563 (e.g., the second display area 263 in FIGS. 2A to 2C, 3A to 3C, and 4A to 4D) while a hinge (e.g., the hinge 281 in FIG. 2A) of the electronic device is folded. The electronic device may detect the attachment of the dial cover 1401 to the second display area 563 based on a pattern of second capacitance detected by a conductive object disposed in at least a partial area inside the dial cover 1401. The electronic device may determine a position in the second display area 563 at which the dial cover 1401 is attached, based on at least one magnet which is included in the dial cover 1401 attached to the second display area 563 and is brought into contact with one of multiple Hall sensors disposed in the second display area 563. Referring to FIG. 15B, the electronic device may display a rotation scroll function key corresponding to the dial cover 1401 in an area in the second display area to which the dial cover 1401 is attached.

Figure 16A:
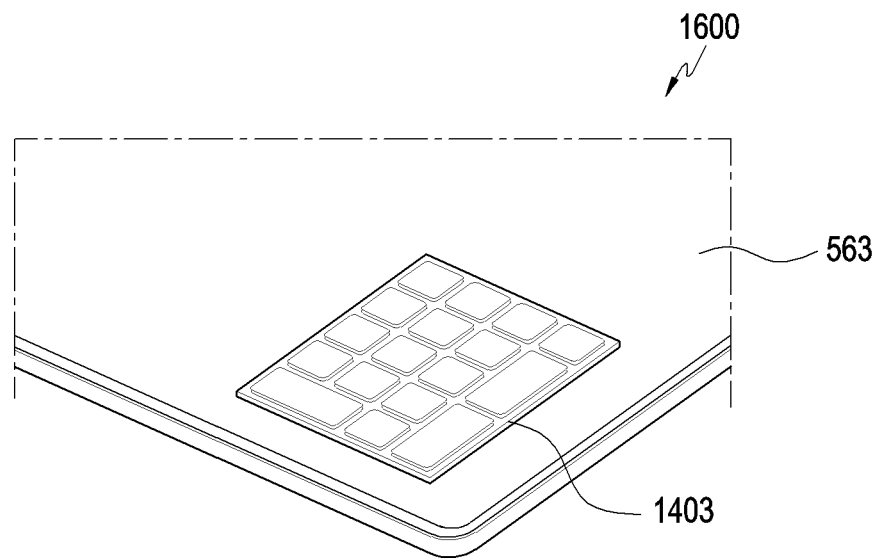
FIGS. 16A and 16B illustrate an operation of an external accessory attached to a display of an electronic device according to an embodiment of the disclosure.
Figure 16B:
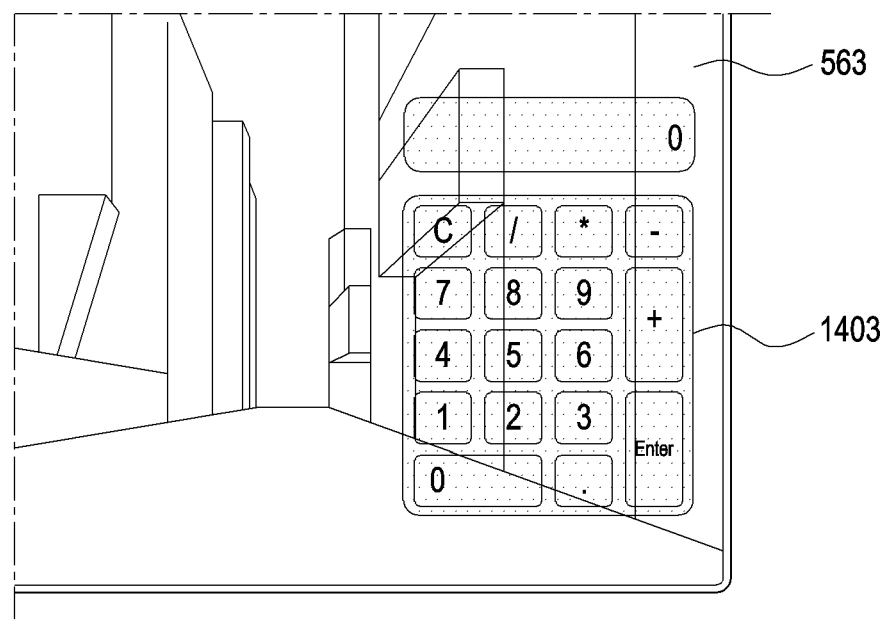

FIGS. 16A and 16B include a diagram 1600 illustrating an operation of an external accessory attached to a display of an electronic device according to an embodiment of the disclosure.

Referring to FIG. 16A, an electronic device (e.g., the electronic device 201 in FIGS. 2A to 2C, 3A to 3C, and 4A to 4D and/or the electronic device 501 in FIG. 5) may detect the attachment of a calculator cover 1403, as an external accessory for displaying a user interface, to a second display area 563 (e.g., the second display area 263 in FIGS. 2A to 2C, 3A to 3C, and 4A to 4D) while a hinge (e.g., the hinge 281 in FIG. 2A) of the electronic device is folded. The electronic device may detect the attachment of the calculator cover 1403 to the second display area 563 based on a pattern of second capacitance detected by a conductive object disposed in at least a partial area inside the calculator cover 1403. The electronic device may determine a position in the second display area 563 at which the calculator cover 1403 is attached, based on at least one magnet which is included in the calculator cover 1403 attached to the second display area 563 and is brought into contact with one of multiple Hall sensors disposed in the second display area 563. As illustrated in FIG. 16B, the electronic device may display function keys for performing calculations corresponding to the calculator cover 1401 in an area in the second display area to which the calculator cover 1403 is attached.

Figure 17A:
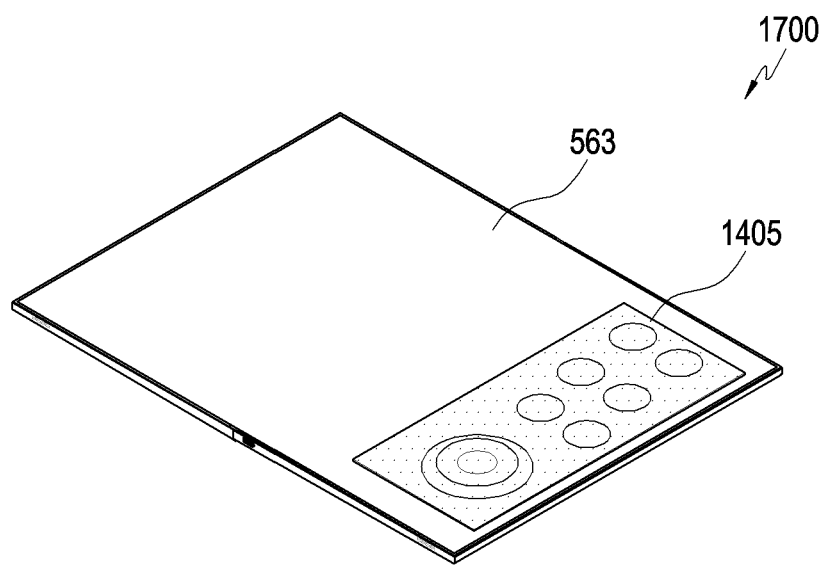
FIGS. 17A and 17B illustrate an operation of an external accessory attached to a display of an electronic device according to an embodiment of the disclosure.
Figure 17B:
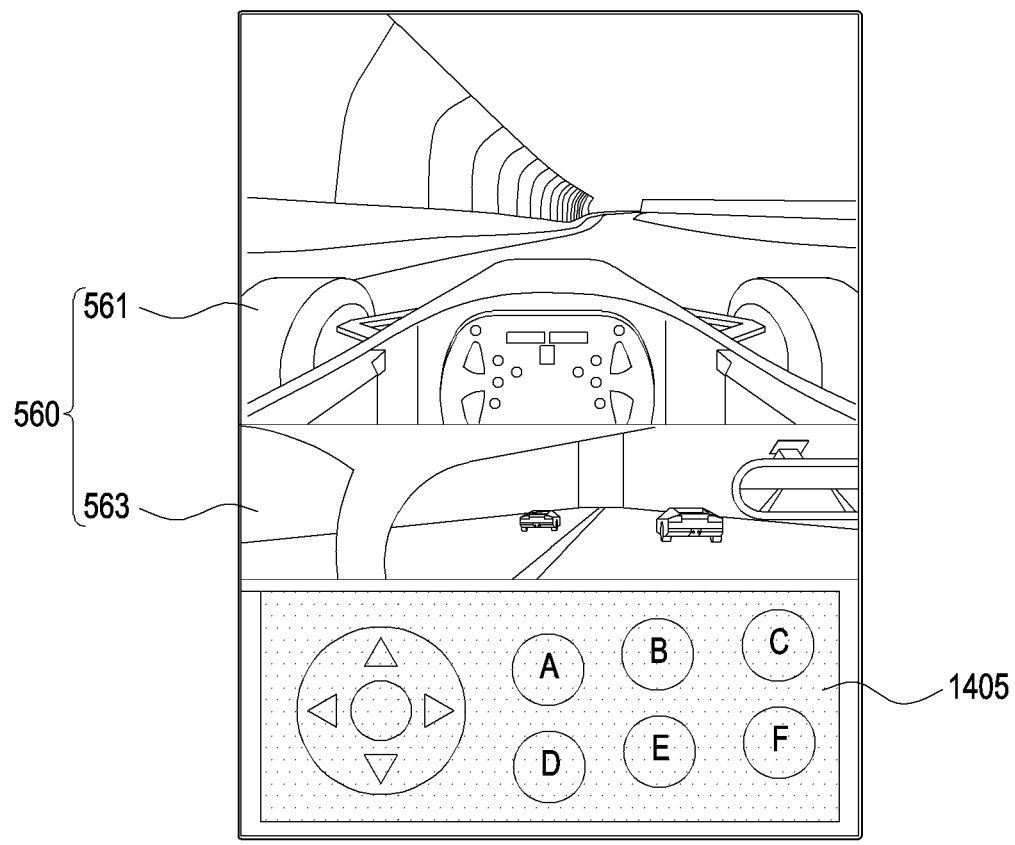

FIGS. 17A and 17B include a diagram 1700 illustrating an operation of an external accessory attached to a display of an electronic device according to an embodiment of the disclosure.

Referring to FIG. 17A, an electronic device (e.g., the electronic device 201 in FIGS. 2A to 2C, 3A to 3C, and 4A to 4D and/or the electronic device 501 in FIG. 5) may detect the attachment of a gamepad cover 1405, as an external accessory for displaying a user interface, to a second display area 563 (e.g., the second display area 263 in FIGS. 2A to 2C, 3A to 3C, and 4A to 4D) while a hinge (e.g., the hinge 281 in FIG. 2A) of the electronic device is folded. The electronic device may detect the attachment of the gamepad cover 1405 to the second display area 563 based on a pattern of second capacitance detected by a conductive object disposed in at least a partial area inside the gamepad cover 1405. The electronic device may determine a position in the second display area 563 at which the gamepad cover 1405 is attached, based on at least one magnet which is included in the gamepad cover 1405 attached to the second display area 563 and is brought into contact with one of multiple Hall sensors disposed in the second display area 563. As illustrated in FIG. 17B, the electronic device may display function keys for performing a game corresponding to the gamepad cover 1401 in an area in the second display area to which the gamepad cover 1405 is attached.

According to various embodiments, an electronic device (e.g., the electronic device 501 in FIG. 5) may include a first housing (e.g., the first housing 271 in FIG. 2A), a second housing (e.g., the second housing 273 in FIG. 2A), a hinge (e.g., the hinge 281 in FIG. 2A) configured to foldably connect one side of the first housing to one side of the second housing, a display (e.g., the display 260 in FIG. 2A) including a first display area (e.g., the first display area 261 in FIG. 2A) disposed in the first housing and a second display area (e.g., the second display area 263 in FIG. 2A) disposed in the second housing, one or more processors (e.g., the processor 520 in FIG. 5) and, memory storing instructions that, when executed by the one or more processors, cause the electronic device to in case that attachment of an external accessory (e.g., the keyboard cover 310) for displaying a user interface is detected in the second display area while the hinge is folded, display a user interface corresponding to a type of the external accessory in an area of the second display area to which the external accessory is attached.

According to various embodiments, wherein the instructions that, when executed by the one or more processors, cause the electronic device to detect the attachment of the external accessory to the second display area and the type of the external accessory, based on a pattern of capacitance detected by at least one conductive object included in the external accessory attached to the second display area.

According to various embodiments, wherein the instructions that, when executed by the one or more processors, cause the electronic device to determine, based on multiple Hall sensors disposed in the second display and at least one magnet included in the external accessory, a position in the second display area in which the external accessory is attached.

According to various embodiments, wherein the instructions that, when executed by the one or more processors, cause the electronic device to identify, in case that the type of the external accessory attached to the second display area is detected, size and shape information of the accessory corresponding to the type of the accessory, and display a user interface corresponding to the identified size and shape information of the accessory in the area of the second display area to which the external accessory is attached.

According to various embodiments, wherein the instructions that, when executed by the one or more processors, cause the electronic device to perform a function corresponding to a predetermined area of the user interface displayed in the area of the second display area to which the external accessory is attached, in case that a touch input to the predetermined area of the user interface is detected by pressing of a predetermined area of the external accessory attached to the second display area.

According to various embodiments, wherein the instructions that, when executed by the one or more processors, cause the electronic device to determine, based on the position in the second display area in which the external accessory is attached, that at least one remaining area of the second display area, other than the area to which the external accessory is attached, is at least one screen area, and to provide a function set to the each of at least one screen area.

According to various embodiments, wherein the instructions that, when executed by the one or more processors, cause the electronic device to determine that a remaining area in the second display area other than a first area to which the external accessory is attached is a first screen area in a first state in which the external accessory is detected to be attached from a first position corresponding to an upper side of the second display area, and to provide a function set to the first screen area.

According to various embodiments, wherein the instructions that, when executed by the one or more processors, cause the electronic device to determine that two remaining areas in the second display area, other than a first area to which the external accessory is attached, are a second screen area and a third screen area in a second state in which the external accessory is detected to be attached from a second position which is at a first distance away from a first position corresponding to an upper side of the second display area, and to provide a function set to each of the second screen area and the third screen area, wherein the second screen area is located above the first area to which the external accessory is attached, and the third screen area is located below the first area to which the external accessory is attached.

According to various embodiments, wherein the instructions that, when executed by the one or more processors, cause the electronic device to determine that two remaining areas in the second display area, other than the area to which the external accessory is attached, are a fourth screen area and a fifth screen area in a third state in which the external accessory is detected to be attached from a third position which is at a second distance away from a first position corresponding to an upper side of the second display area and longer than a first distance in a second state, and to provide a function set to each of the fourth screen area and the fifth screen area, wherein the fourth screen area includes an area located above a first area to which the external accessory is attached and having a larger size than a second screen area in the second state, and the fifth screen area includes an area located below the first area to which the external accessory is attached and having a smaller size than a third screen area in the second state.

According to various embodiments, wherein the instructions that, when executed by the one or more processors, cause the electronic device to determine that a remaining area in the second display area, other than a first area to which the external accessory is attached, is a sixth screen area in a fourth state in which the external accessory is detected to be attached from a fourth position which is at a third distance away from a first position corresponding to an upper side of the second display area and longer than a second distance in a third state, and to provide a function set to the sixth screen area.

Figure 18:
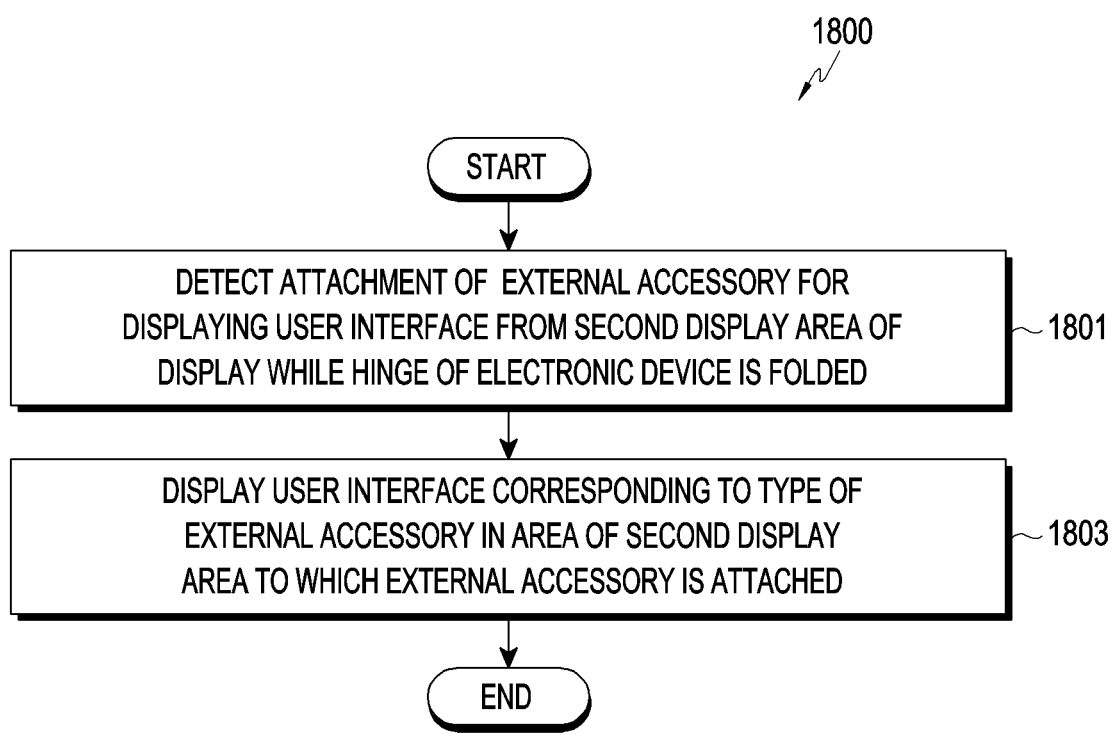
FIG. 18 is a flowchart illustrating operations of detecting the attachment of an external accessory in an electronic device according to an embodiment of the disclosure.

FIG. 18 is a flowchart 1800 illustrating operations of detecting the attachment of an external accessory in an electronic device according to an embodiment of the disclosure.

The operations for detecting the attachment of the external accessory may include operations 1801 to 1803. According to an embodiment, at least one of operations 1801 to 1803 may be omitted, the order of some operations may be changed, or other operations may be added. The operations of detecting the attachment of the external accessory may be performed by the electronic device 101 in FIG. 1, the processor 120 in FIG. 1, the electronic device 501 in FIG. 5, or the processor 520 in FIG. 5.

In operation 1801, the electronic device 501 may detect that an external accessory (e.g., a keyboard cover) for displaying a user interface is attached to a second display area (e.g., the second display area 563 in FIG. 5) of a display (e.g., the display 560 in FIG. 5) while a hinge (e.g., the hinge in FIG. 2A) of the electronic device is folded.

According to an embodiment, the electronic device 501 may detect the attachment of the external accessory to the second display area and the type of the external accessory, based on a pattern of capacitance detected by at least one conductive object included in the external accessory attached to the second display area.

According to an embodiment, the processor 520 may determine the position of an area in the second display area 563 to which the external accessory is attached, based on at least one magnet which is included in the external accessory attached to the second display area 563 and is in contact with one of multiple Hall sensors disposed in the second display area.

According to an embodiment, the electronic device 501 may include multiple Hall sensors (e.g., the multiple Hall sensors 811 in FIGS. 8A to 8D) capable of detecting at least one magnet (e.g., the magnets 613a and 613b in FIG. 7A and/or the magnet 613b in FIGS. 8A to 8D) included in the external accessory (e.g., the keyboard cover), and may determine a position of an area in the second display area to which the external accessory is attached, based on the position of a Hall sensor, among the multiple Hall sensors, which is disposed to detect a magnetic field caused by the at least one magnet included in the external accessory.

According to an embodiment, the electronic device 501 may determine, based on Equation 1, a position of the area in the second display area to which the external accessory is attached.

In operation 1803, the electronic device 501 may display a user interface (e.g., a keyboard) corresponding to the type of external accessory (e.g., the keyboard cover) on an area in the second display area (e.g., the second display area 563 in FIG. 5) to which the external is attached.

According to an embodiment, when the attachment and type of the external accessory attached to the second display area are detected, the electronic device 501 may identify size information and/or shape information of the external accessory, based on information about the external accessory stored in memory (e.g., the memory 530 in FIG. 5).

According to an embodiment, the electronic device 501 may display a user interface corresponding to the type and/or shape of the external accessory in a first area (e.g., the first area 410 in FIGS. 4A to 4D) of the second display area to which the external accessory is attached.

According to an embodiment, the electronic device 501 may display, based on a user selection, another user interface corresponding to the type and/or shape of the external accessory in the first area (e.g., the first area 410 in FIGS. 4A to 4D) of the second display area to which the external accessory is attached. For example, while a keyboard cover for displaying a keyboard is displayed in the first area (e.g., the first area 410 in FIGS. 4A to 4D) of the second display area to which the external accessory is attached, the electronic device 501 may change text on the keyboard based on a user selection.

According to an embodiment, while a user interface corresponding to the type and/or shape of the external accessory is displayed in the first area (e.g., the first area 410 in FIGS. 4A to 4D) of the second display area to which the external accessory is attached, the electronic device 501 may detect, by pressing of a predetermined area of the external accessory, a touch input to a predetermined area of the user interface displayed in the first area of the second display area to which the external accessory is attached. The electronic device 501 may perform a function corresponding to the predetermined area of the user interface in response to the touch input.

According to an embodiment, in a state in which the external accessory is attached to the second display area, when the external accessory is removed, the electronic device 501 may remove the display of the user interface on the second display area.

Figure 19A:
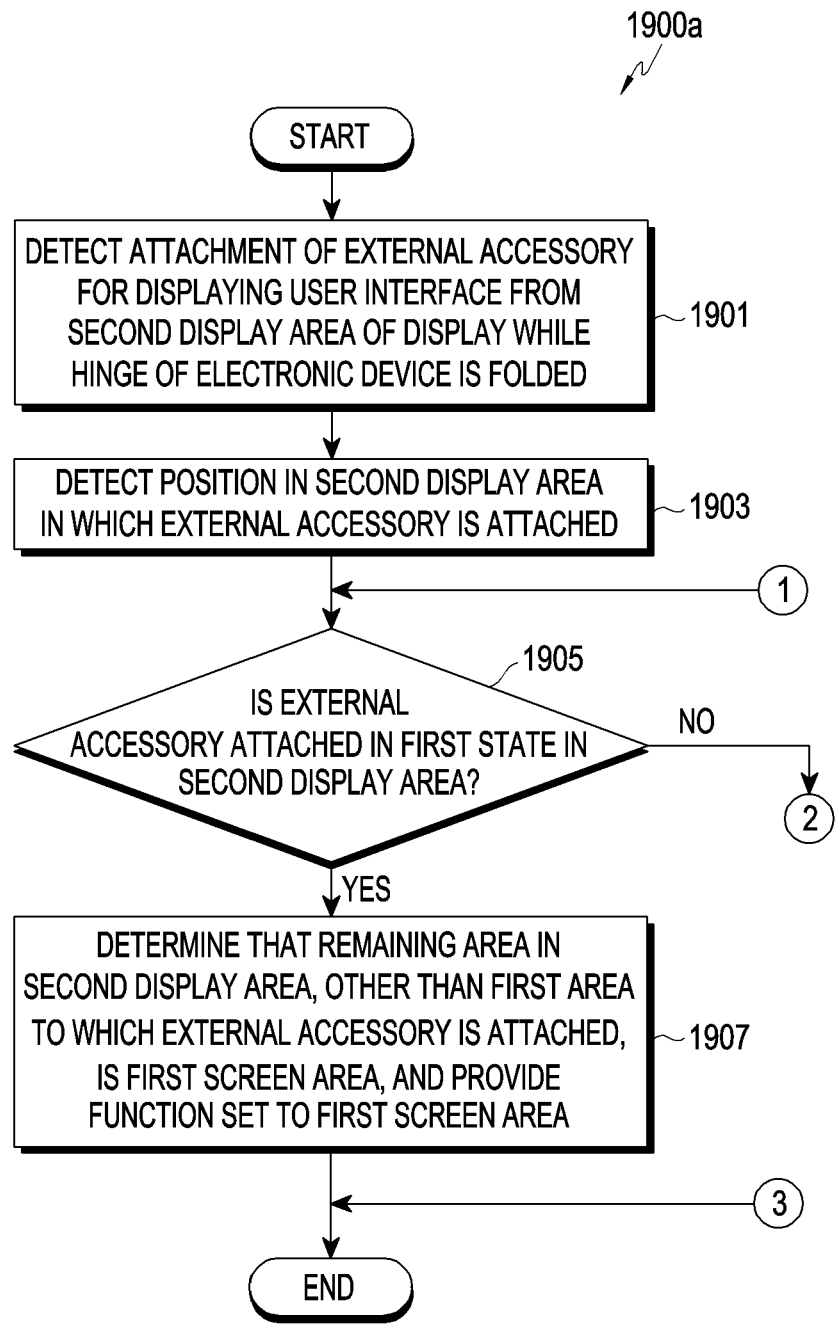
FIGS. 19A and 19B illustrate operations of providing a screen area based on the position of an external accessory attached to a display in an electronic device according to various embodiments of the disclosure.
Figure 19B:
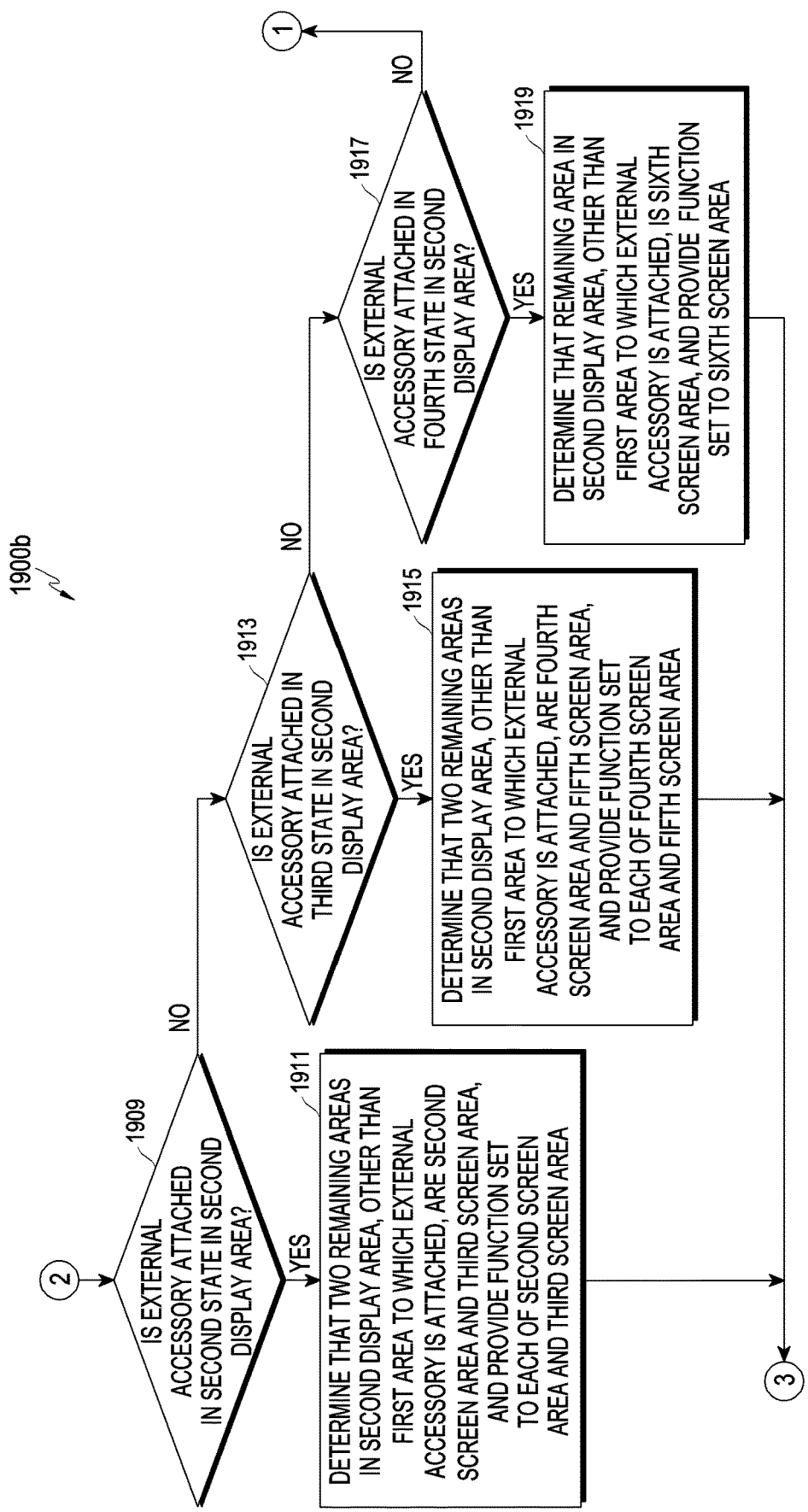

FIGS. 19A and 19B are diagrams 1900a and 1900b illustrating operations of providing a screen area based on the position of an external accessory attached to a display in an electronic device according to various embodiments of the disclosure.

The operations of providing a screen area based on the position of an external accessory attached to the display may include operations 1901 to 1919. According to an embodiment, at least one of operations 1901 to 1919 may be omitted, the order of some operations may be changed, or other operations may be added. The operations of providing a screen area based on the position of an external accessory attached to the display may be performed by the electronic device 101 in FIG. 1, the processor 120 in FIG. 1, the electronic device 501 in FIG. 5, or the processor 520 in FIG. 5.

In operation 1901, the electronic device 501 may detect that an external accessory (e.g., a keyboard cover) for displaying a user interface is attached to a second display area (e.g., the second display area 563 in FIG. 5) of a display (e.g., the display 560 in FIG. 5) while a hinge (e.g., the hinge in FIG. 2A) of the electronic device folded.

According to an embodiment, the electronic device 501 may detect the attachment of the external accessory to the second display area and the type of the external accessory, based on a pattern of capacitance detected by at least one conductive object included in the external accessory attached to the second display area.

In operation 1903, the electronic device 501 may detect a position in the second display area (e.g., the second display area 563 in FIG. 5) where the external accessory (e.g., the keyboard cover) is attached.

According to an embodiment, the electronic device 501 may determine the position of an area in the second display area 563 to which the external accessory is attached, based on at least one magnet which is included in the external accessory attached to the second display area and is in contact with one of multiple Hall sensors disposed in the second display area.

According to an embodiment, the electronic device 501 may include multiple Hall sensors (e.g., the multiple Hall sensors 811 in FIGS. 8A to 8D) capable of detecting at least one magnet (e.g., the magnets 613a and 613b in FIG. 7A and/or the magnet 613b in FIGS. 8A to 8D) included in the external accessory, and may determine the position of an area in the second display area to which the external accessory is attached, based on the position of a Hall sensor, among the multiple Hall sensors, which is disposed to detect a magnetic field caused by the at least one magnet included in the external accessory.

According to an embodiment, the electronic device 501 may determine, based on Equation 1, the position of an area in the second display area to which the external accessory is attached.

In operation 1905, the electronic device 501 may determine whether the external accessory (e.g., the keyboard cover) is attached in a first state in the second display area (e.g., the second display area 563 in FIG. 5).

According to an embodiment, when sensing signal information about a magnetic field is received from a first Hall sensor (e.g., the first Hall sensor 811a in FIG. 8A) among the multiple Hall sensors (e.g., the multiple Hall sensors 811 in FIGS. 8A to 8D), the electronic device 501 may detect that the external accessory is in a first state (e.g., the first state in FIG. 4A) in which the external accessory is attached from a first position corresponding to the upper side of the second display area.

According to an embodiment, when a first condition is satisfied based on Equation 1, the electronic device 501 may detect that the external accessory is in the first state (e.g., the first state in FIG. 4A) in which the external accessory is attached from the first position corresponding to the upper side of the second display area.

When the electronic device 501 determines, in operation 1905, that the external accessory (e.g., the keyboard cover) is attached in the first state in the second display area (e.g., the second display area 563 in FIG. 5), the electronic device 501, in operation 1907, may determine that the remaining area of the second display area (e.g., the second display area 563 in FIG. 5), other than a first area (e.g., the first area 410 in FIG. 4A) to which the external accessory (e.g., the keyboard cover) is attached, is a first screen area (e.g., the first screen area 411 in FIG. 4A), and may display a GUI for providing a function set to the first screen area, for example, a touchpad function.

In operation 1909, the electronic device 501 may determine whether the external accessory (e.g., the keyboard cover) is attached in a second state in the second display area (e.g., the second display area 563 in FIG. 5).

According to an embodiment, when sensing signal information about a magnetic field is received from a second Hall sensor (e.g., the second Hall sensor 811b in FIG. 8B) among the multiple Hall sensors (e.g., the multiple Hall sensors 811 in FIGS. 8A through 8D), the electronic device 501 may detect that the external accessory is in a second state (e.g., the second state in FIG. 4B) in which the external accessory is attached from a second position which is at a first distance away from a first position corresponding to the upper side of the second display area.

According to an embodiment, when a second condition is satisfied based on Equation 1, and when the length between a top coordinate y-value SA(y) of the second display area and a top coordinate y-value KA(y) of the keyboard cover 310 attached to the second display area 563 is equal to the vertical length of a second screen area (e.g., the second screen area 413 in FIG. 4B) in the second state, the electronic device 501 may detect that the external accessory is in the second state (e.g., the second state in FIG. 4B) in which the external accessory is attached from the second position which is at the first distance away from the first position corresponding to the upper side of the second display area.

When the electronic device 501 determines, in operation 1909, that the external accessory (e.g., the keyboard cover) is attached in the second state in the second display area (e.g., the second display area 563 in FIG. 5), the electronic device 501, in operation 1911, may determine that two remaining areas of the second display area (e.g., the second display area 563 in FIG. 5), other than a first area (e.g., the first area 410 in FIG. 4A) to which the external accessory (e.g., the keyboard cover) is attached, are a second screen area (e.g., the second screen area 413 in FIG. 4B) and a third screen area (e.g., the third screen area 415 in FIG. 4B), and may provide a function set to each of the second screen area and the third screen area.

According to an embodiment, the electronic device 501 may display a function set to the second screen area located above the first area to which the external accessory is attached, for example, at least one of a function key (e.g., an Fn key) on a keyboard or a function key for performing an operation related to an application displayed in the first display area 561. The electronic device 501 may display a GUI for providing a function set to the third screen area located below the first area to which the external accessory is attached, for example, a touchpad function. The electronic device 501 may display a GUI for providing a function set to the third screen area having a smaller size than the first screen area displaying a GUI for providing a touchpad function in the first state, for example, a touchpad function. For example, based on an up-and-down scrolling motion or an input of a specific key detected in the second screen area while a function key of the keyboard is displayed in the second screen area, the electronic device 501 may change and display the type of function key displayed in the second screen area.

In operation 1913, the electronic device 501 may determine whether the external accessory (e.g., the keyboard cover) is attached in a third state in the second display area (e.g., the second display area 563 in FIG. 5).

According to an embodiment, when sensing signal information about a magnetic field is received from a third Hall sensor (e.g., the third Hall sensor 811c in FIG. 8C) among the multiple Hall sensors (e.g., the multiple Hall sensors 811 in FIGS. 8A to 8D), the electronic device 501 may detect that the external accessory is in a state (e.g., the third state in FIG. 4C) wherein the external accessory is attached from a third position which is at a second distance away from a first position corresponding to the upper side of the second display area and longer than a first distance in a second state.

According to an embodiment, when the second condition is satisfied based on Equation 1, and when the length between the top coordinate y-value SA(y) of the second display area and the top coordinate y-value KA(y) of the keyboard cover 310 attached to the second display area 563 is equal to the vertical length of a fourth screen area (e.g., the fourth screen area 417 in FIG. 4C) in the third state, the electronic device 501 may detect that the external accessory is in the third state (e.g., the third state in FIG. 4C) in which the external accessory is attached from the third position which is at the second distance away from the first position corresponding to the upper side of the second display area 563 and longer than the first distance in the second state (e.g., the second state in FIG. 4B).

When the electronic device 501 determines, in operation 1913, that the external accessory (e.g., the keyboard cover) is attached in the third state in the second display area (e.g., the second display area 563 in FIG. 5), the electronic device 501, in operation 1915, may determine that two remaining areas in the second display area (e.g., the second display area 563 in FIG. 5), other than a first area (e.g., the first area 410 in FIG. 4A) to which the external accessory (e.g., the keyboard cover) is attached, are a fourth screen area (e.g., the fourth screen area 417 in FIG. 4C) and a fifth screen area (e.g., the fifth screen area 419 in FIG. 4C), and may provide a function set to each of the fourth screen area and the fifth screen area.

According to an embodiment, the electronic device 501 may display a function set to the fourth screen area located above a first area to which the external accessory is attached, for example, at least one of a function key (e.g., an Fn key) on a keyboard, a preview screen corresponding to a recently used application, or a preview screen corresponding to a frequently used application. The electronic device 501 may display a GUI for providing a function set to the fifth screen area located below the first area to which the external accessory is attached, for example, a touchpad function. The electronic device 501 may display a GUI for providing a touchpad function in the fifth screen area having a smaller than the third screen area in which a GUI for providing a touchpad function is displayed in the second state. For example, when, while a function key of a keyboard and a preview screen are respectively displayed in two subareas of the fourth screen area, a swipe out motion is detected on the subarea displaying the function key, the electronic device 501 may not display the function key in the fourth screen area, but may display the preview screen in an enlarged size.

In operation 1917, the electronic device 501 may determine whether the external accessory (e.g., the keyboard cover) is attached in the fourth state in the second display area (e.g., the second display area 563 in FIG. 5).

According to an embodiment, when sensing signal information about a magnetic field is received from a fourth Hall sensor (e.g., the fourth Hall sensor 811*d* in FIG. 8D) among the multiple Hall sensors (e.g., the multiple Hall sensors 811 in FIGS. 8A to 8D), the electronic device 501 may detect that the external accessory is in a state (e.g., in the fourth state in FIG. 4D) in which the external accessory is attached from a fourth position, which is at a third distance away from a first position corresponding to the upper side of the second display area and longer than the second distance in the third state, to a fifth position corresponding to the lower side of the second display area.

According to an embodiment, when a third condition is satisfied based on Equation 1, the electronic device 501 may detect that the external accessory is in the state (e.g., the fourth state in FIG. 4D) in which the external accessory is attached from the fourth position, which is at the third distance away from the first position corresponding to the upper side of the second display area and longer than the second distance in the third state, to the fifth position corresponding to the lower side of the second display area.

When the electronic device 501 determines, in operation 1917, that the external accessory (e.g., the keyboard cover) is attached in the fourth state in the second display area (e.g., the second display area 563 in FIG. 5), the electronic device 501, in operation 1919, may determine that the remaining area in the second display area (e.g., the second display area 563 in FIG. 5), other than a first area (e.g., the first area 410 in FIG. 4A) to which the external accessory (e.g., the keyboard cover) is attached, is a sixth screen area (e.g., the sixth screen area 421 in FIG. 4D), and may provide a function set to the sixth screen area.

According to an embodiment, the electronic device 501 may display a function set to the sixth display area located above the first area to which the external accessory is attached, for example, at least one of a preview screen corresponding to a recently used application, a preview screen corresponding to a frequently used application, or a function window related to a running application that is being displayed in a first display area (e.g., the first display area 561 in FIG. 5).

According to an embodiment, when an up-and-down scrolling motion is detected in one of multiple subareas included in the sixth screen area while the multiple preview screens are displayed in each of the multiple subareas, the electronic device 501 may, in response to the up-and-down scrolling motion, sequentially display other preview screens that are not being displayed in the subarea in which the up-and-down scrolling motion has been detected.

According to an embodiment, in the fourth state, when a downward dragging motion is detected on a boundary between the first display area and the second display area, the electronic device 501 may extend an image screen displayed in the first display area to the sixth screen area of the second display area and display the image screen. When a long touch is detected at the boundary of the image screen and a first area in the second display area, in which a user interface (e.g., a keyboard) corresponding to the external accessory is displayed, while the image screen is being displayed including the first display area and the sixth screen area of the second display area, the electronic device 501 may display the image screen throughout the first display area and the second display area. The electronic device 501 may adjust the transparency of the first area of the second display area to display the user interface (e.g., the keyboard) displayed in the first area, thereby overlapping and displaying a portion of the image screen and the user interface (e.g., the keyboard).

According to various embodiments, a method performed by an electronic device for detecting attachment of an external accessory for displaying a user interface in the electronic device may include detecting, while a hinge configured to foldably connect one side of a first housing of the electronic device to one side of a second housing of the electronic device is folded, attachment of an external accessory for displaying a user interface from a second display area disposed in the second housing, and displaying a user interface corresponding to a type of the external accessory in an area of the second display area to which the external accessory is attached.

According to various embodiments, the method may further include detecting the attachment of the external accessory to the second display area and the type of the external accessory, based on a pattern of capacitance detected by at least one conductive object included in the external accessory attached to the second display area.

According to various embodiments, the method may further include determining, based on multiple Hall sensors disposed in the second display area and at least one magnet included in the external accessory, a position in the second display area in which the external accessory is attached.

According to various embodiments, the method may further include identifying, in case that the type of the external accessory attached to the second display area is detected, size and shape information of an accessory corresponding to the type of the external accessory, and displaying a user interface corresponding to the identified size and shape information in the area of the second display area to which the external accessory is attached.

According to various embodiments, the method may further include performing a function corresponding to a predetermined area of the user interface displayed in the area of the second display area to which the external accessory is attached, in case that a touch input to the predetermined area of the user interface is detected by pressing of a predetermined area of the external accessory attached to the second display area.

According to various embodiments, the method may further include determining, based on the position in the second display area in which the external accessory is attached, that at least one remaining area of the second display area, other than the area to which the external accessory is attached, is at least one screen area, and providing a function set to each of the at least one screen area.

According to various embodiments, the method may further include determining that a remaining area in the second display area, other than a first area to which the external accessory is attached, is a first screen area in a first state in which the external accessory is detected to be attached from a first position corresponding to an upper side of the second display area, and providing a function set to the first screen area.

According to various embodiments, the method may further include determining that two remaining areas in the second display area, other than a first area to which the external accessory is attached, are a second screen area and a third screen area in a second state in which the external accessory is detected to be attached from a second position which is at a first distance away from a first position corresponding to an upper side of the second display area, and providing a function set to each of the second screen area and the third screen area, wherein the second screen area is located above the first area to which the external accessory is attached, and the third screen area is located below the first area to which the external accessory is attached.

According to various embodiments, the method may further include determining that two remaining areas in the second display area, other than the area to which the external accessory is attached, are a fourth screen area and a fifth screen area in a third state in which the external accessory is detected to be attached from a third position which is at a second distance away from a first position corresponding to an upper side of the second display area and longer than a first distance in a second state, and providing a function set to each of the fourth screen area and the fifth screen area, wherein the fourth screen area includes an area located above a first area to which the external accessory is attached and having a larger size than a second screen area in the second state, and the fifth screen area includes an area located below the first area to which the external accessory is attached and having a smaller size than a third screen area in the second state.

According to various embodiments, the method may further include determining that a remaining area in the second display area, other than a first area to which the external accessory is attached, is a sixth screen area in a fourth state in which the external accessory is detected to be attached from a fourth position, which is at a third distance away from a first position corresponding to an upper side of the second display area and longer than a second distance in a third state, to the lower side of the second display area, and providing a function set to the sixth screen area.

According to various embodiments, one or more non-transitory computer-readable storage media storing one or more computer programs including computer-executable instructions that, when executed by one or more processors of an electronic device, cause the electronic device to perform operations, the operations include detecting, while a hinge configured to foldably connect one side of a first housing of the electronic device to one side of a second housing of the electronic device is folded, attachment of an external accessory for displaying a user interface from a second display area disposed in the second housing, and displaying a user interface corresponding to a type of the external accessory in an area of the second display area to which the external accessory is attached.

According to various embodiments, the operations may further include detecting the attachment of the external accessory to the second display area and the type of the external accessory, based on a pattern of capacitance detected by at least one conductive object included in the external accessory attached to the second display area.

According to various embodiments, the operations may further include determining, based on multiple Hall sensors disposed in the second display area and at least one magnet included in the external accessory, a position in the second display area in which the external accessory is attached.

According to various embodiments, the operations may further include identifying, in case that the type of the external accessory attached to the second display area is detected, size and shape information of an accessory corresponding to the type of the external accessory and displaying a user interface corresponding to the identified size and shape information in the area of the second display area to which the external accessory is attached.

According to various embodiments, the operations may further include performing a function corresponding to a predetermined area of the user interface displayed in the area of the second display area to which the external accessory is attached, in case that a touch input to the predetermined area of the user interface is detected by pressing of a predetermined area of the external accessory attached to the second display area.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing;
a second housing;
a hinge configured to foldably connect one side of the first housing to one side of the second housing;
a display including a first display area disposed in the first housing and a second display area disposed in the second housing;
one or more processors; and
memory storing instructions that, when executed by the one or more processors, cause the electronic device to:
in case that attachment of an external accessory for displaying a user interface is detected in the second display area, display a user interface corresponding to a type of the external accessory in an area of the second display area to which the external accessory is attached.

2. The electronic device of claim 1,
wherein the instructions that, when executed by the one or more processors, cause the electronic device to:
detect the attachment of the external accessory to the second display area and the type of the external accessory, based on a pattern of capacitance detected by at least one conductive object included in the external accessory attached to the second display area.

3. The electronic device of claim 1,
wherein the instructions that, when executed by the one or more processors, cause the electronic device to:
determine, based on multiple Hall sensors disposed in the second display area and at least one magnet included in the external accessory, a position in the second display area in which the external accessory is attached.

4. The electronic device of claim 1, wherein the instructions that, when executed by the one or more processors, cause the electronic device to:
identify, in case that the type of the external accessory attached to the second display area is detected, size and shape information of an accessory corresponding to the type of the external accessory, and
display a user interface corresponding to the identified size and shape information in the area of the second display area to which the external accessory is attached.

5. The electronic device of claim 1, wherein the instructions that, when executed by the one or more processors, cause the electronic device to:
perform a function corresponding to a predetermined area of the user interface displayed in the area of the second display area to which the external accessory is attached, in case that a touch input to the predetermined area of the user interface is detected by pressing of a predetermined area of the external accessory attached to the second display area.

6. The electronic device of claim 1,
wherein the instructions that, when executed by the one or more processors, cause the electronic device to:
determine, based on a position in the second display area in which the external accessory is attached, that at least one remaining area in the second display area, other than the area to which the external accessory is attached, is at least one screen area, and
provide a function set to each of the at least one screen area.

7. The electronic device of claim 6, wherein the instructions that, when executed by the one or more processors, cause the electronic device to:
determine that a remaining area in the second display area, other than a first area to which the external accessory is attached, is a first screen area in a first state in which the external accessory is detected to be attached from a first position corresponding to an upper side of the second display area, and provide a function set to the first screen area.

8. The electronic device of claim 6, wherein the instructions that, when executed by the one or more processors, cause the electronic device to:

determine that two remaining areas in the second display area, other than a first area to which the external accessory is attached, are a second screen area and a third screen area in a second state in which the external accessory is detected to be attached from a second position which is at a first distance away from a first position corresponding to an upper side of the second display area, and provide a function set to each of the second screen area and the third screen area, wherein the second screen area is located above the first area to which the external accessory is attached, and wherein the third screen area is located below the first area to which the external accessory is attached.

9. The electronic device of claim 6, wherein the instructions that, when executed by the one or more processors, cause the electronic device to:

determine that two remaining areas in the second display area, other than the area to which the external accessory is attached, are a fourth screen area and a fifth screen area in a third state in which the external accessory is detected to be attached from a third position which is at a second distance away from a first position corresponding to an upper side of the second display area and longer than a first distance in a second state, and provide a function set to each of the fourth screen area and the fifth screen area, wherein the fourth screen area comprises an area located above a first area to which the external accessory is attached and having a larger size than a second screen area in the second state, and wherein the fifth screen area comprises an area located below the first area to which the external accessory is attached and having a smaller size than a third screen area in the second state.

10. The electronic device of claim 6, wherein the instructions that, when executed by the one or more processors, cause the electronic device to:

determine that a remaining area in the second display area, other than a first area to which the external accessory is attached, is a sixth screen area in a fourth state in which the external accessory is detected to be attached from a fourth position which is at a third distance away from a first position corresponding to an upper side of the second display area and longer than a second distance in a third state, and provide a function set to the sixth screen area.

11. A method performed by an electronic device for detecting attachment of an external accessory for displaying a user interface in the electronic device, the method comprising:

detecting, by the electronic device, attachment of an external accessory for displaying a user interface from a second display area disposed in a second housing of the electronic device; and displaying, by the electronic device, a user interface corresponding to a type of the external accessory in an area of the second display area to which the external accessory is attached.

12. The method of claim 11, further comprising:

detecting the attachment of the external accessory to the second display area and the type of the external accessory, based on a pattern of capacitance detected by at least one conductive object included in the external accessory attached to the second display area.

13. The method of claim 11, further comprising:

determining, based on multiple Hall sensors disposed in the second display area and at least one magnet included in the external accessory, a position in the second display area in which the external accessory is attached.

14. The method of claim 11, further comprising:

identifying, in case that the type of the external accessory attached to the second display area is detected, size and shape information of an accessory corresponding to the type of the external accessory; and displaying a user interface corresponding to the identified size and shape information in the area of the second display area to which the external accessory is attached.

15. The method of claim 11, further comprising:

performing a function corresponding to a predetermined area of the user interface displayed in the area of the second display area to which the external accessory is attached, in case that a touch input to the predetermined area of the user interface is detected by pressing of a predetermined area of the external accessory attached to the second display area.

16. One or more non-transitory computer-readable storage media storing one or more computer programs including computer-executable instructions that, when executed by one or more processors of an electronic device, cause the electronic device to perform operations, the operations comprising:

detecting, by the electronic device, while a hinge configured to foldably connect one side of a first housing of the electronic device to one side of a second housing of the electronic device is folded, attachment of an external accessory for displaying a user interface from a second display area disposed in the second housing; and displaying, by the electronic device, a user interface corresponding to a type of the external accessory in an area of the second display area to which the external accessory is attached.

17. The one or more non-transitory computer-readable storage media of claim 16, the operations further comprising:

detecting the attachment of the external accessory to the second display area and the type of the external accessory, based on a pattern of capacitance detected by at least one conductive object included in the external accessory attached to the second display area.

18. The one or more non-transitory computer-readable storage media of claim 16, the operations further comprising:

determining, based on multiple Hall sensors disposed in the second display area and at least one magnet included in the external accessory, a position in the second display area in which the external accessory is attached.

19. The one or more non-transitory computer-readable storage media of claim 16, the operations further comprising:

identifying, in case that the type of the external accessory attached to the second display area is detected, size and shape information of an accessory corresponding to the type of the external accessory; and displaying a user interface corresponding to the identified size and shape information in the area of the second display area to which the external accessory is attached.

20. The one or more non-transitory computer-readable storage media of claim 16, the operations further comprising:

performing a function corresponding to a predetermined area of the user interface displayed in the area of the second display area to which the external accessory is attached, in case that a touch input to the predetermined area of the user interface is detected by pressing of a predetermined area of the external accessory attached to the second display area.

* * * * *